US012734829B2

(12) United States Patent
Akagi et al.

(10) Patent No.: US 12,734,829 B2
(45) Date of Patent: Sep. 15, 2026

(54) IMAGE FORMING APPARATUS

(71) Applicant: CANON KABUSHIKI KAISHA, Tokyo (JP)

(72) Inventors: Daisuke Akagi, Tokyo (JP); Hirotaka Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 18/452,462

(22) Filed: Aug. 18, 2023

(65) Prior Publication Data

US 2024/0069462 A1 Feb. 29, 2024

(30) Foreign Application Priority Data

Aug. 23, 2022 (JP) ................................ 2022-132721
Aug. 23, 2022 (JP) ................................ 2022-132722
Aug. 4, 2023 (JP) ................................ 2023-128001

(51) Int. Cl.
*G06K 15/12* (2006.01)
*B41J 2/45* (2006.01)
*G06K 15/02* (2006.01)

(52) U.S. Cl.
CPC ............ *B41J 2/45* (2013.01); *G06K 15/1247* (2013.01); *G06K 15/1261* (2013.01);
(Continued)

(58) Field of Classification Search
CPC ........... G06K 15/1242; G06K 15/1247; G06K 15/1257; G06K 15/1261; G06K 15/1801; G06K 15/1825; G06K 15/1842; G06K 15/1843; G06K 15/18; G06K 15/1894; B41J 2/447; B41J 2/45
See application file for complete search history.

(56) References Cited

U.S. PATENT DOCUMENTS

2001/0021027 A1 9/2001 Ueno
2009/0201357 A1 8/2009 Sakurai
(Continued)

FOREIGN PATENT DOCUMENTS

EP 2481597 A1 8/2012
JP 2019-217653 A 12/2019
(Continued)

OTHER PUBLICATIONS

European Patent Office, Extended Search Report for Application No. 23192118.0, Jun. 2024.

*Primary Examiner* — Douglas X Rodriguez
*Assistant Examiner* — Kendrick X Liu
(74) *Attorney, Agent, or Firm* — Canon U.S.A., Inc. IP Division

(57) ABSTRACT

There is provided an image forming apparatus including: a photosensitive member that is driven to rotate; an exposure head that includes a plurality of light-emitting portions arranged at different positions in an axial direction of the photosensitive member, wherein each of pixels of an image corresponding to an output resolution of the image forming apparatus is formed by multiple light-emitting portions of the plurality of light-emitting portions, and a control unit configured to control the number of light-emitting portions to be driven to form each of the pixels of the image based on correction data.

17 Claims, 46 Drawing Sheets

(52) U.S. Cl.
CPC ..... *G06K 15/1825* (2013.01); *G06K 15/1843* (2013.01); *G06K 15/1894* (2013.01)

(56) References Cited

U.S. PATENT DOCUMENTS

| | | | | |
|---|---|---|---|---|
| 2011/0102536 | A1* | 5/2011 | Imai | G03G 15/04054 347/224 |
| 2012/0194629 | A1 | 8/2012 | Tsuchiya | |
| 2014/0063513 | A1 | 3/2014 | Enge et al. | |
| 2020/0166863 | A1 | 5/2020 | Noro | |
| 2021/0055669 | A1* | 2/2021 | Yoshida | G03G 15/04081 |
| 2021/0294240 | A1* | 9/2021 | Watanabe | G03G 15/043 |
| 2022/0171308 | A1 | 6/2022 | Koyama et al. | |
| 2022/0197177 | A1 | 6/2022 | Nakanishi | |
| 2023/0324826 | A1 | 10/2023 | Akagi | |

FOREIGN PATENT DOCUMENTS

| | | | |
|---|---|---|---|
| JP | 2020078918 | A | 5/2020 |
| JP | 2021-035765 | A | 3/2021 |
| JP | 2021030565 | A | 3/2021 |
| JP | 2022-096966 | A | 6/2022 |
| JP | 2022096963 | A | 6/2022 |
| JP | 2022096967 | A | 6/2022 |
| KR | 20090086315 | A | 8/2009 |
| KR | 20120087074 | A | 8/2012 |
| KR | 20140110755 | A | 9/2014 |
| KR | 20200060285 | A | 5/2020 |

* cited by examiner

F I G. 2A
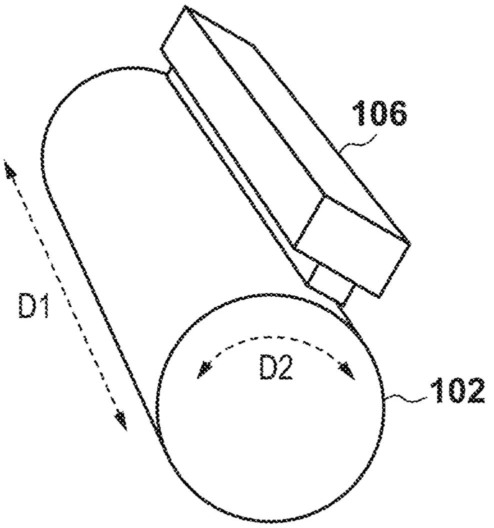
F I G. 2B
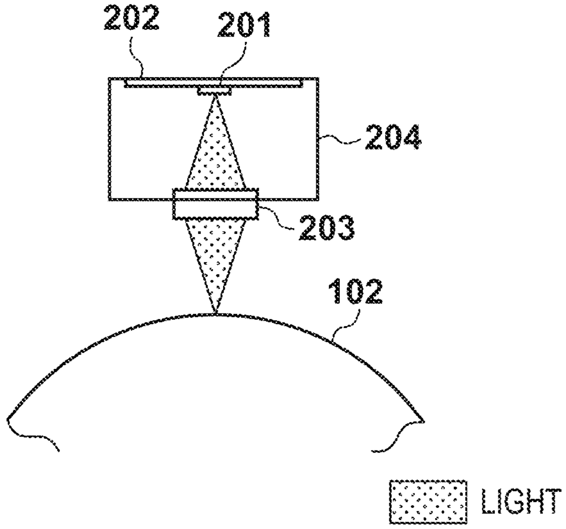

202
400-1
400-2
400-19
400-20
LIGHT-EMITTING CHIP
PRINTED CIRCUIT BOARD
SYNC
CLK
DATA1
DATA2
DATA19
DATA20
EN
WRITE1
WRITE2
WRITE19
WRITE20
700
VCC
702
CLOCK GENERATION UNIT
705
703
IMAGE DATA PROCESSING UNIT
LIGHT EMISSION CONTROL UNIT
704
REGISTER ACCESS UNIT
CPU
701 IMAGE CONTROLLER

VCC
408-1
408-2
400
406
CIRCUIT UNIT
CLK
SYNC
DATAn
EN
WRITEn
408-5
408-6
408-7
408-8
408-9
TRANS-FER UNIT
DATA-1
DATA-2
DATA-3
DATA-4
1102
REGISTER
1003
LAT1
LAT3
LAT747
LATCH UNIT
LATCH UNIT
LATCH UNIT
LATCH UNIT
1004-001
1004-002
1004-747
1004-748
1104
CURRENT DRIVING UNIT
504
506
LIGHT-EMITTING LAYER
508
UPPER ELECTRODE
408-3
408-4

400-1
LINE PERIOD: $t_0$
R1_0
R0_0
R0_1
R0_2
R0_3
L0
ELECTROSTATIC LATENT IMAGE (LINE 0)
RD
DL0
IM1
INPUT IMAGE DATA

RD

| (0,-2) | (1,-2) | (2,-2) | (3,-2) | (4,-2) | (5,-2) | (6,-2) | (7,-2) |
|---|---|---|---|---|---|---|---|
| (0,-1) | (1,-1) | (2,-1) | (3,-1) | (4,-1) | (5,-1) | (6,-1) | (7,-1) |
| (0,0) | (1,0) | (2,0) | (3,0) | (4,0) | (5,0) | (6,0) | (7,0) |
| (0,1) | (1,1) | (2,1) | (3,1) | (4,1) | (5,1) | (6,1) | (7,1) |
| (0,2) | (1,2) | (2,2) | (3,2) | (4,2) | (5,2) | (6,2) | (7,2) |
| (0,3) | (1,3) | (2,3) | (3,3) | (4,3) | (5,3) | (6,3) | (7,3) |
| (0,4) | (1,4) | (2,4) | (3,4) | (4,4) | (5,4) | (6,4) | (7,4) |

$DL_0$

IM1

INPUT IMAGE DATA

LINE PERIOD: $t_0 + 1$ 400-1

$R1_0$

| Ro_0 | (0,-2) | (1,-2) | (2,-2) | (3,-2) | (4,-2) | (5,-2) | (6,-2) | (7,-2) |
|---|---|---|---|---|---|---|---|---|
| Ro_1 | (0,-1) | (1,-1) | (2,-1) | (3,-1) | (4,-1) | (5,-1) | (6,-1) | (7,-1) |
| Ro_2 | (0,0) | (1,0) | (2,0) | (3,0) | (4,0) | (5,0) | (6,0) | (7,0) |
| Ro_3 | (0,1) | (1,1) | (2,1) | (3,1) | (4,1) | (5,1) | (6,1) | (7,1) |

$L_0$

ELECTROSTATIC LATENT IMAGE (LINE 0)

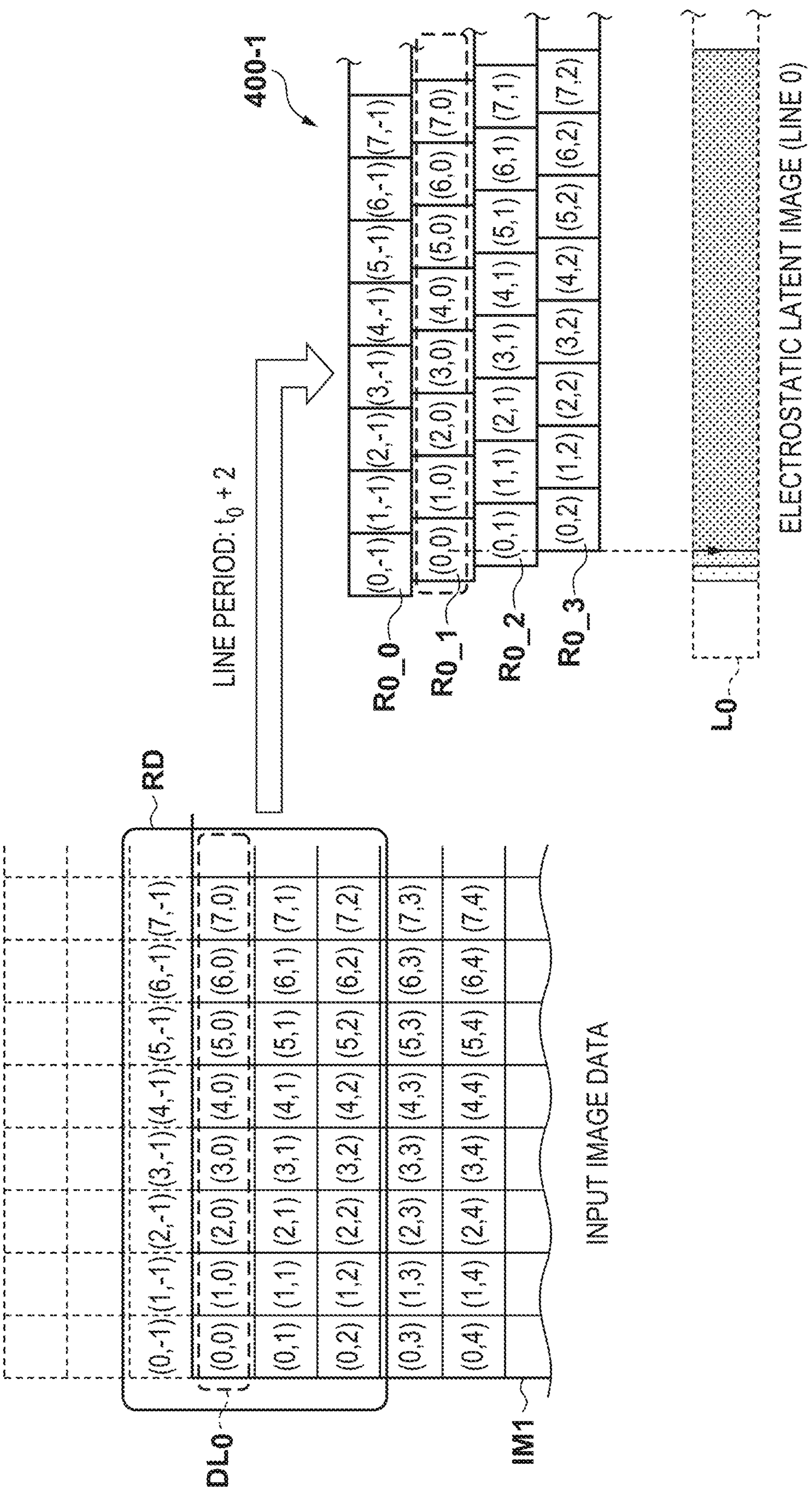
F I G. 12C
400-1
LINE PERIOD: $t_0$ + 2
RD
DL0
IM1
INPUT IMAGE DATA
Ro_0
Ro_1
Ro_2
Ro_3
L0
ELECTROSTATIC LATENT IMAGE (LINE 0)
(0,-1) (1,-1) (2,-1) (3,-1) (4,-1) (5,-1) (6,-1) (7,-1)
(0,0) (1,0) (2,0) (3,0) (4,0) (5,0) (6,0) (7,0)
(0,1) (1,1) (2,1) (3,1) (4,1) (5,1) (6,1) (7,1)
(0,2) (1,2) (2,2) (3,2) (4,2) (5,2) (6,2) (7,2)
(0,3) (1,3) (2,3) (3,3) (4,3) (5,3) (6,3) (7,3)
(0,4) (1,4) (2,4) (3,4) (4,4) (5,4) (6,4) (7,4)

LINE PERIOD: $t_0 + 2$
400-1
PG3
PG4
$DL_0$
RD
IM1
$R_{0\_0}$
$R_{0\_1}$
(0,-1) (1,-1) (2,-1) (3,-1) (4,-1) (5,-1) (6,-1)
(0,0) (1,0) (2,0) (3,0) (4,0) (5,0) (6,0)
(0,1) (1,1) (2,1) (3,1) (4,1) (5,1) (6,1) (7,1)
(0,2) (1,2) (2,2) (3,2) (4,2) (5,2) (6,2) (7,2)
(0,3) (1,3) (2,3) (3,3) (4,3) (5,3) (6,3) (7,3)
(0,4) (1,4) (2,4) (3,4) (4,4) (5,4) (6,4) (7,4)

400-1
LINE PERIOD: $t_0$
$R_{1\_0}$
$R_{2\_0}$
$R_{0\_0}$
$R_{0\_1}$
$R_{0\_2}$
$R_{0\_3}$
PG1
PG2
PG3
PG4
RD
IM1

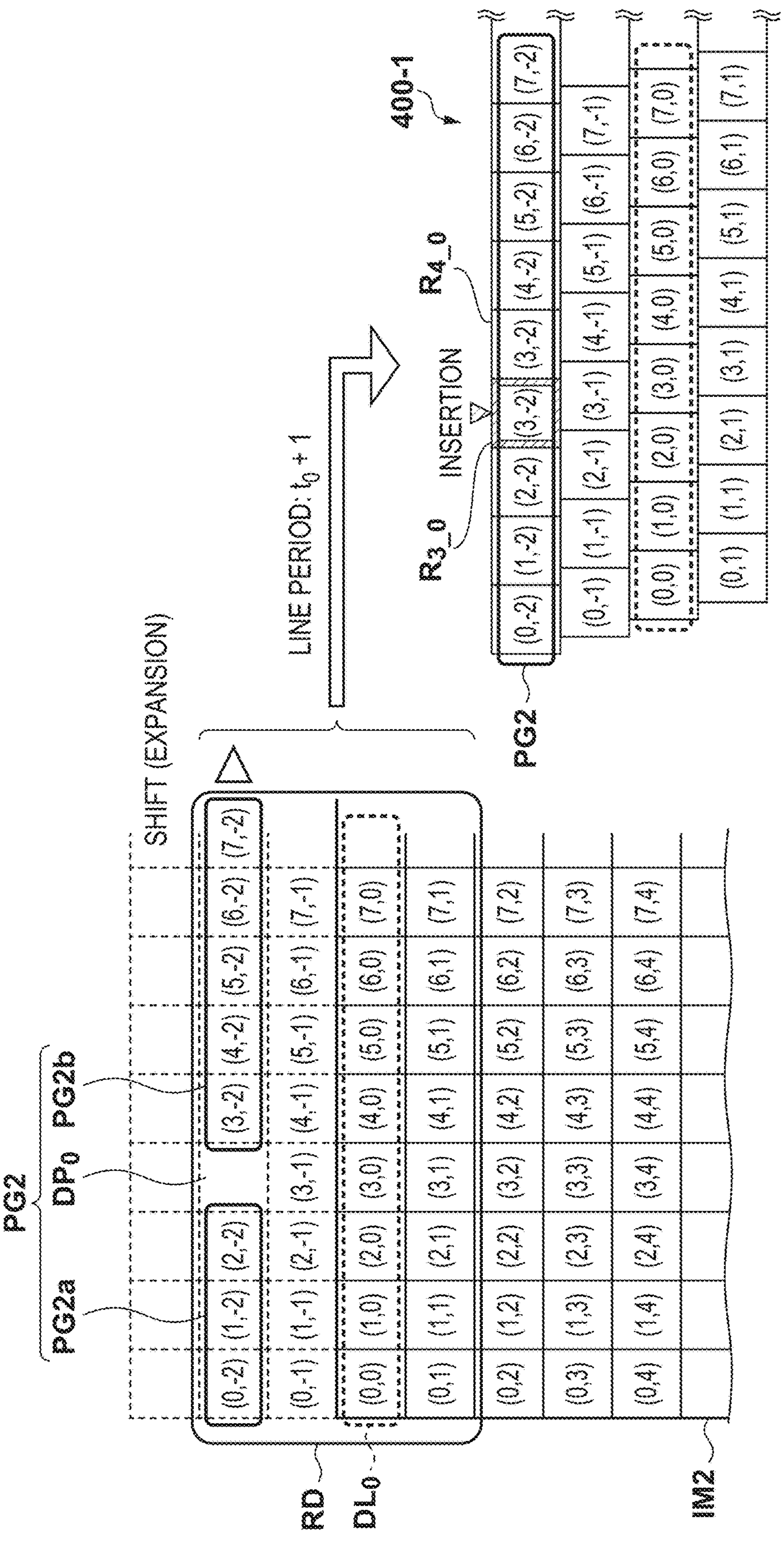
F I G. 16B
PG2
PG2a
$DP_0$
PG2b
SHIFT (EXPANSION)
RD
$DL_0$
IM2
(0,-2) (1,-2) (2,-2) (3,-2) (4,-2) (5,-2) (6,-2) (7,-2)
(0,-1) (1,-1) (2,-1) (3,-1) (4,-1) (5,-1) (6,-1) (7,-1)
(0,0) (1,0) (2,0) (3,0) (4,0) (5,0) (6,0) (7,0)
(0,1) (1,1) (2,1) (3,1) (4,1) (5,1) (6,1) (7,1)
(0,2) (1,2) (2,2) (3,2) (4,2) (5,2) (6,2) (7,2)
(0,3) (1,3) (2,3) (3,3) (4,3) (5,3) (6,3) (7,3)
(0,4) (1,4) (2,4) (3,4) (4,4) (5,4) (6,4) (7,4)
LINE PERIOD: $t_0 + 1$
400-1
$R_{3}_0$
INSERTION
$R_{4}_0$
PG2
(0,-2) (1,-2) (2,-2) (3,-2) (3,-2) (4,-2) (5,-2) (6,-2) (7,-2)
(0,-1) (1,-1) (2,-1) (3,-1) (4,-1) (5,-1) (6,-1) (7,-1)
(0,0) (1,0) (2,0) (3,0) (4,0) (5,0) (6,0) (7,0)
(0,1) (1,1) (2,1) (3,1) (4,1) (5,1) (6,1) (7,1)

PG3
PG3a
DP0
PG3b
SHIFT (REDUCTION)
$DL_0$
RD
IM2
LINE PERIOD: $t_0 + 2$
THINNING OUT
400-1
$R_{0_}0$
$R_{3_}0$
PG3

| (0,-1) | (1,-1) | (2,-1) | (4,-1) | (5,-1) | (6,-1) | (7,-1) |
|---|---|---|---|---|---|---|

| (0,0) | (1,0) | (2,0) | (3,0) | (4,0) | (5,0) | (6,0) | (7,0) |
|---|---|---|---|---|---|---|---|
| (0,1) | (1,1) | (2,1) | (3,1) | (4,1) | (5,1) | (6,1) | (7,1) |
| (0,2) | (1,2) | (2,2) | (3,2) | (4,2) | (5,2) | (6,2) | (7,2) |
| (0,3) | (1,3) | (2,3) | (3,3) | (4,3) | (5,3) | (6,3) | (7,3) |
| (0,4) | (1,4) | (2,4) | (3,4) | (4,4) | (5,4) | (6,4) | (7,4) |

400-1
LIGHT-EMITTING ELEMENT ARRAY
$R_{0\_3}$
READOUT
750
AUXILIARY PIXEL ARRAY
$G_{0,0}$
$Px_1$
$Px_2$
$Px_3$
$Px_4$
(0,0) (0,0) (0,0) (0,0)
STORE (M COPIES)
(0,-3) (1,-3) (2,-3) (3,-3)
(0,-2) (1,-2) (2,-2) (3,-2)
(0,-1) (1,-1) (2,-1) (3,-1)
(0,0) (1,0) (2,0) (3,0)
(0,1) (1,1) (2,1) (3,1)
(0,2) (1,2) (2,2) (3,2)
(0,3) (1,3) (2,3) (3,3)
INPUT IMAGE DATA
IM1

F I G. 20C
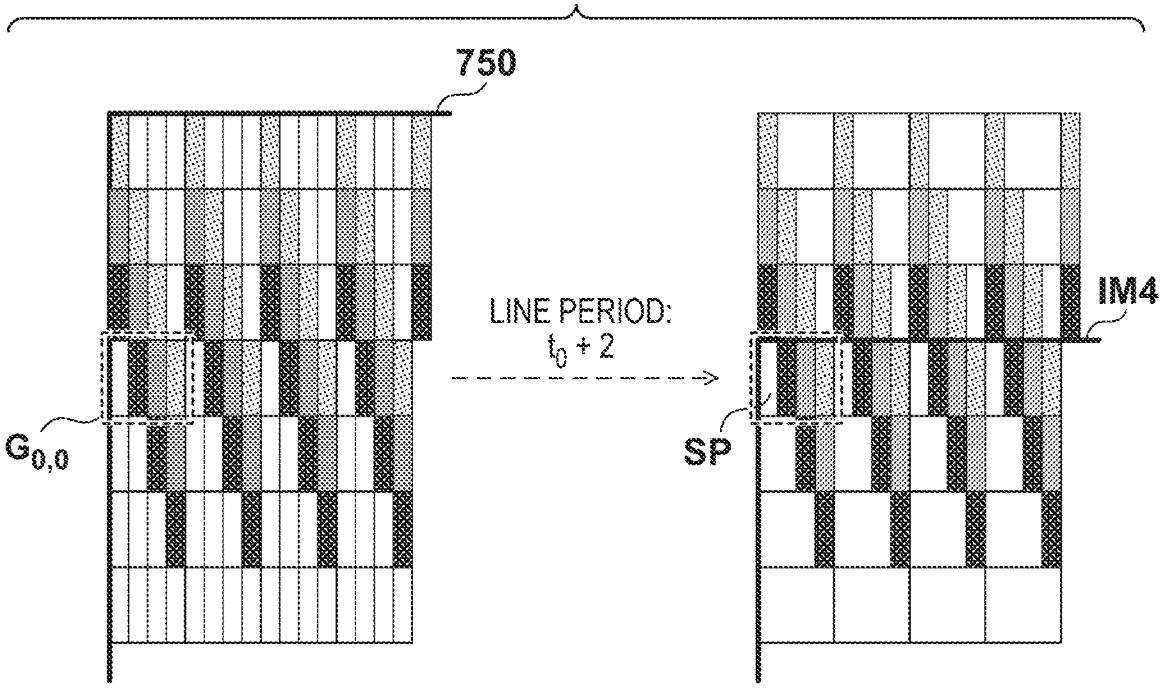
F I G. 20D
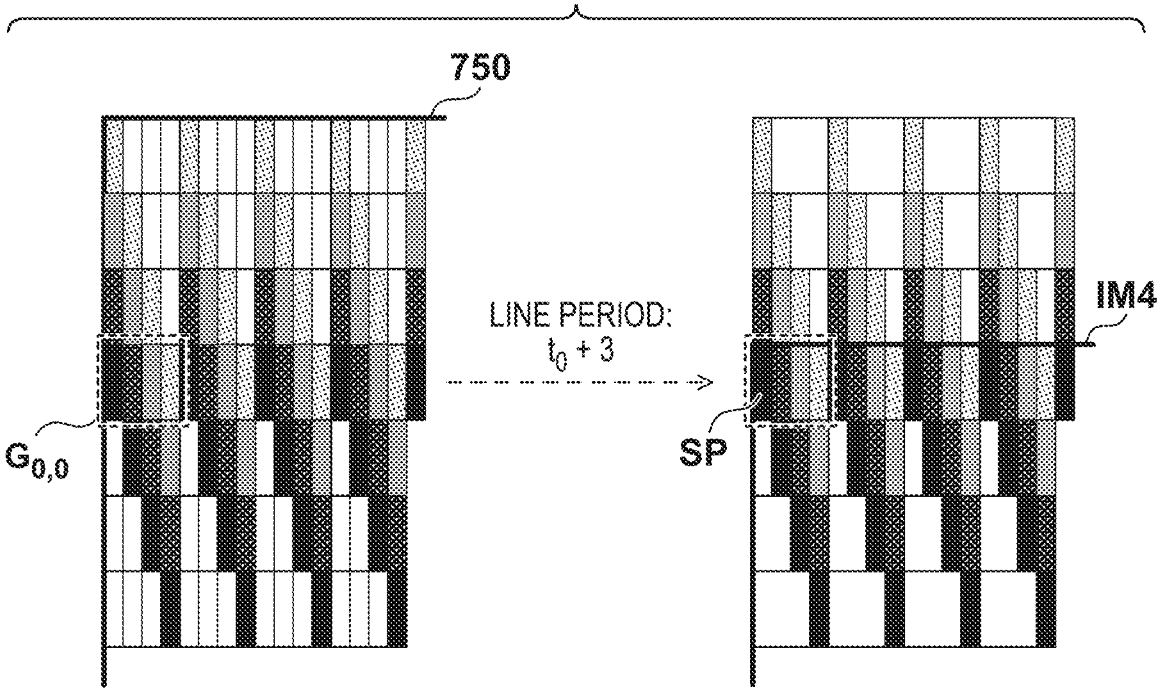

$G_{0,0}$
$Px_1$
$Px_2$
$Px_3$
$Px_4$
$Px_5$
X
(0,0)
750
400-1
$R_{0\_0}$
READOUT
STORE
(M COPIES)
SHIFT
IM1
(0,-3) (1,-3) (2,-3) (3,-3)
(0,-2) (1,-2) (2,-2) (3,-2)
(0,-1) (1,-1) (2,-1) (3,-1)
(0,0) (1,0) (2,0) (3,0)
(0,1) (1,1) (2,1) (3,1)
(0,2) (1,2) (2,2) (3,2)
(0,3) (1,3) (2,3) (3,3)
INPUT IMAGE DATA
AUXILIARY PIXEL ARRAY
LIGHT-EMITTING ELEMENT ARRAY

F I G. 22A
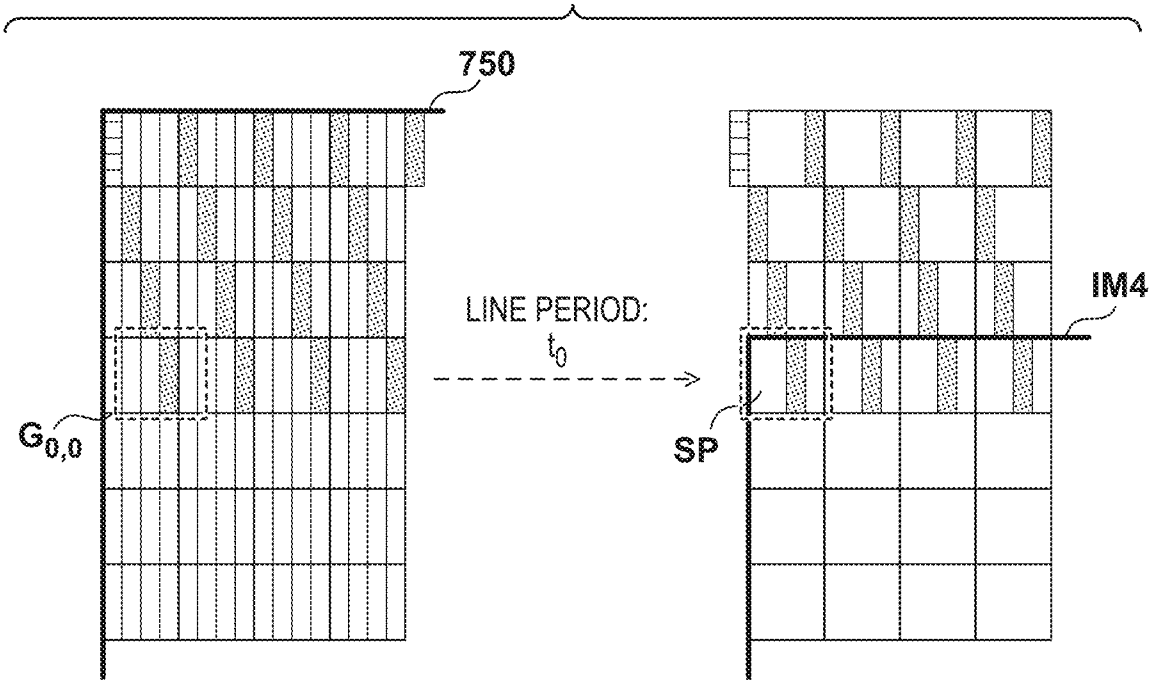
F I G. 22B
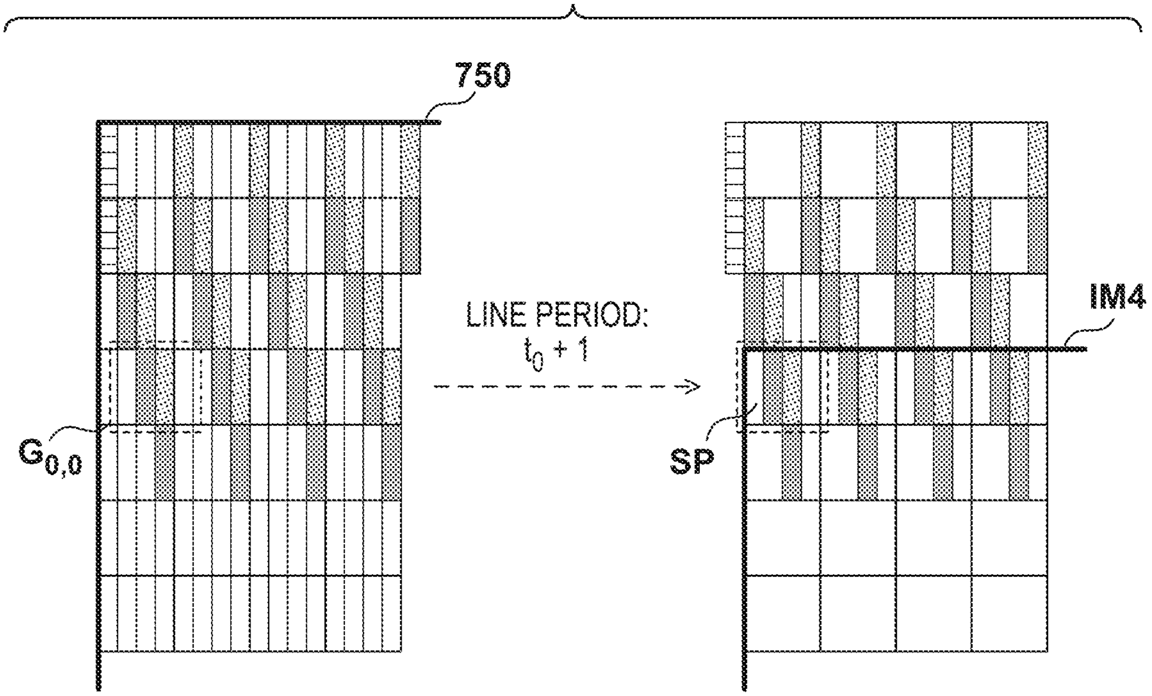

400-1
$R_{1\_0}$
$R_{0\_0}$
$R_{0\_1}$
$R_{0\_2}$
$R_{0\_3}$
LIGHT-EMITTING ELEMENT ARRAY
READOUT
750
INSERTION
AUXILIARY PIXEL ARRAY
$G_{0,0}$
INSERTION
$Px_1$
$Px_2$
$Px_3$
$Px_4$
$Px_5$
(0,0) (0,0) (0,0) (0,0) (0,0)
STORE (M COPIES)
(0,-3) (1,-3) (2,-3) (3,-3)
(0,-2) (1,-2) (2,-2) (3,-2)
(0,-1) (1,-1) (2,-1) (3,-1)
(0,0) (1,0) (2,0) (3,0)
(0,1) (1,1) (2,1) (3,1)
(0,2) (1,2) (2,2) (3,2)
(0,3) (1,3) (2,3) (3,3)
IM1
INPUT IMAGE DATA 400-1
LIGHT-EMITTING ELEMENT ARRAY
R0_0
R0_1
R0_2
R0_3
READOUT
750
THINNING OUT
Px4
G0,0
(0,0) (0,0) (0,0) (1,0)
Px1
Px2
Px3
STORE (M COPIES)
THINNING OUT
AUXILIARY PIXEL ARRAY
(0,-3) (1,-3) (2,-3) (3,-3)
(0,-2) (1,-2) (2,-2) (3,-2)
(0,-1) (1,-1) (2,-1) (3,-1)
(0,0) (1,0) (2,0) (3,0)
(0,1) (1,1) (2,1) (3,1)
(0,2) (1,2) (2,2) (3,2)
(0,3) (1,3) (2,3) (3,3)
IM1
INPUT IMAGE DATA

IMAGE FORMING APPARATUS

BACKGROUND

Field of the Disclosure

The present disclosure relates to an image forming apparatus and an exposure apparatus.

Description of the Related Art

An electrophotographic image forming apparatus forms an image by forming an electrostatic latent image on a photosensitive member that is rotationally driven by exposing the photosensitive member, and then developing the electrostatic latent image using toner. Among such apparatuses, organic electroluminescence-type exposure apparatuses that use an organic electroluminescent element for exposure have been garnering attention in recent years for being easier to make smaller, quieter, and cheaper than laser scanning-type exposure apparatuses which use laser light.

Japanese Patent Laid-Open No. 2021-35765 discloses a technique which provides an array of light-emitting elements and driving circuitry on the same silicon substrate in the exposure head of an organic electroluminescence-type exposure apparatus to help reduce the size of the apparatus.

Japanese Patent Laid-Open No. 2019-217653, meanwhile, discloses a technique for correcting image data used to drive a group of light-emitting elements to a higher resolution in order to finely compensate for image positional misalignment caused by variations in the mounting positions of chips on a substrate or thermal expansion of the substrate.

Furthermore, Japanese Patent Laid-Open No. 2022-96966 discloses a technique in which, in a two-dimensional array of organic electroluminescent elements, the light-emitting elements in each column are disposed having been shifted in a stepped form, and each of pixel regions on a photosensitive member are exposed in multiple (what is known as “multiple exposure”) by causing the light-emitting elements to emit light successively. Multiple exposure makes it possible to ensure an exposure amount necessary for forming images at a sufficient density in an organic electroluminescence-type exposure apparatus that uses organic electroluminescent elements, which cannot emit light that is as strong as laser light.

As suggested in Japanese Patent Laid-Open No. 2019-217653, it is difficult to avoid the occurrence of some errors in the arrangement of components when manufacturing an exposure apparatus or an image forming apparatus. Even after manufacture, environmental factors such as temperature changes, or physical forces during transport, installation, or use, can cause misalignment in the components within an apparatus. A laser scanning-type exposure apparatus that scans a photosensitive member one line at a time using laser light can simply adjust the scanning range, change the image forming position, or expand or reduce the image forming range, but such a technique cannot be applied in an exposure apparatus that performs exposure using an LED element, an organic electroluminescent element, or the like. Although the technique disclosed in Japanese Patent Laid-Open No. 2019-217653 enables compensating for extremely fine positional misalignment, the technique also requires relatively high-load processing to convert the image data, such as weighting operations. This tends to increase the circuit scale, and is therefore not necessarily suitable for apparatuses where reduced sizes and costs are desired.

SUMMARY

Aspects of the present disclosure provide an improved mechanism for compensating for errors in an image forming range.

According to an aspect, there is provided an image forming apparatus including a photosensitive member that is driven to rotate, an exposure head that includes a plurality of light-emitting portions arranged at different positions in an axial direction of the photosensitive member, wherein each of pixels of an image corresponding to an output resolution of the image forming apparatus is formed by multiple light-emitting portions of the plurality of light-emitting portions, and a control unit configured to control a number of light-emitting portions of the plurality of light-emitting portions to be driven to form each of the pixels of the image based on correction data.

According to another aspect, there is provided an organic electroluminescence-type exposure apparatus for an image forming apparatus, the exposure apparatus including: an exposure head having a plurality of light-emitting elements arranged two-dimensionally so as to include M rows (where M is an integer of 2 or more) in a circumferential direction of a photosensitive member and N columns (where N is an integer of 2 or more) in an axial direction of the photosensitive member, with any two neighboring light-emitting elements among M light-emitting elements in each column occupying ranges that overlap partially in the axial direction; and a light emission control unit configured to control light emission from the plurality of light-emitting elements of the exposure head such that a spot corresponding to each of pixel positions in input image data is formed on a surface of the photosensitive member, by the M light-emitting elements of a column corresponding to the pixel position successively emitting light while the photosensitive member rotates, wherein in a case where positional misalignment of an image formed by the exposure head in the axial direction is detected, the light emission control unit is configured to shift a pixel value set of the input image data corresponding to at least one row of the plurality of light-emitting elements of the exposure head in a direction which cancels out the detected positional misalignment to cause the plurality of light-emitting elements to emit light. An image forming apparatus that includes the exposure apparatus and the photosensitive member is also provided.

Further features of the present disclosure will become apparent from the following description of embodiments (with reference to the attached drawings).

BRIEF DESCRIPTION OF THE DRAWINGS

FIG. 2A is a first explanatory diagram illustrating the configuration of a photosensitive member and an exposure head according to an embodiment.

FIG. 2B is a second explanatory diagram illustrating the configuration of a photosensitive member and an exposure head according to an embodiment.

FIG. 12C is an explanatory diagram illustrating a light emission control sequence based on input image data.

FIG. 16B is an explanatory diagram illustrating a light emission control sequence that includes scaling error compensation (pixel value insertion).

FIG. 20C is an explanatory diagram illustrating auxiliary pixels from which pixel values are read out in a third line period.

FIG. 20D is an explanatory diagram illustrating auxiliary pixels from which pixel values are read out in a fourth line period.

FIG. 22A is an explanatory diagram illustrating auxiliary pixels from which pixel values are read out in a first line period, when performing positional misalignment compensation.

FIG. 22B is an explanatory diagram illustrating auxiliary pixels from which pixel values are read out in a second line period, when performing positional misalignment compensation.

DESCRIPTION OF THE EMBODIMENTS

Figure 1:
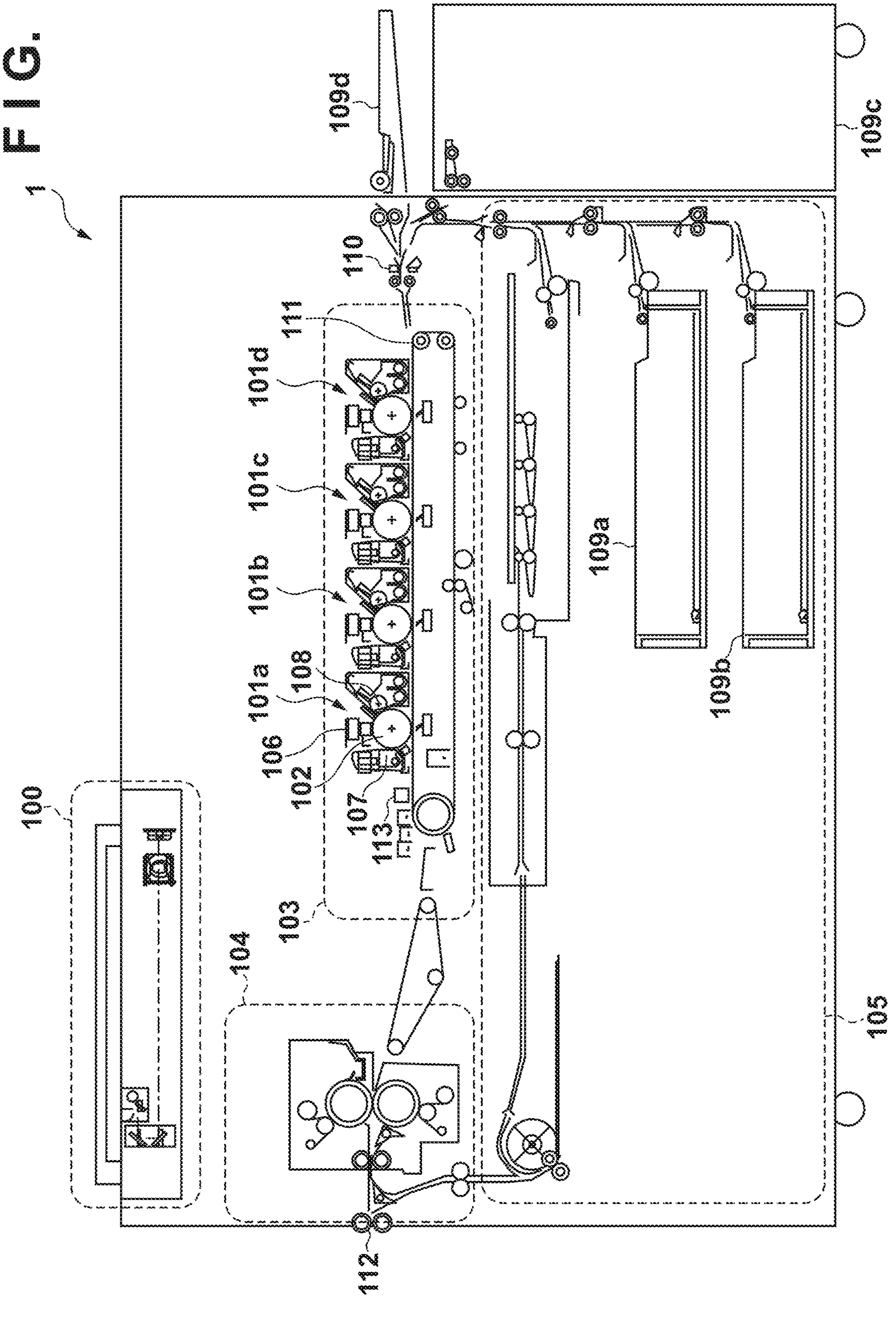
FIG. 1 is a schematic diagram illustrating the overall configuration of an image forming apparatus according to an embodiment.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

1. OVERALL CONFIGURATION OF IMAGE FORMING APPARATUS

FIG. 1 illustrates an example of the overall configuration of an image forming apparatus 1 according to an embodiment. The image forming apparatus 1 includes a reading unit 100, an image generation unit 103, a fixing unit 104, and a transport unit 105. The reading unit 100 optically reads a document placed on a platen and generates read image data. The image generation unit 103 forms an image on a sheet based on, for example, the read image data generated by the reading unit 100, or based on print image data received from an external apparatus over a network.

The image generation unit 103 includes image forming units 101*a*, 101*b*, 101*c*, and 101*d*. The image forming units 101*a*, 101*b*, 101*c*, and 101*d* form black, yellow, magenta, and cyan toner images, respectively. The image forming units 101*a*, 101*b*, 101*c*, and 101*d* have the same configuration, and may be collectively referred to as "image forming units 101" hereinafter. During image formation, a photosensitive member 102 of the image forming unit 101 is rotationally driven in the clockwise direction in the drawing. A charger 107 charges the photosensitive member 102. An exposure head 106 forms an electrostatic latent image on the surface of the photosensitive member 102 by exposing the photosensitive member 102. A developer 108 forms a toner image by developing the electrostatic latent image on the photosensitive member 102 using toner. The toner image formed on the surface of the photosensitive member 102 is transferred onto a sheet transported on a transfer belt 111. A color image including four color components, namely black, yellow, magenta, and cyan, can be formed by transferring the toner images from the four photosensitive members 102 onto a sheet in an overlapping manner.

The transport unit 105 controls the feeding and transport of sheets. Specifically, the transport unit 105 feeds a sheet to a transport path in the image forming apparatus 1 from a designated unit among internal storage units 109*a* and 109*b*, an external storage unit 109*c*, and a manual feed unit 109*d*. The sheet which has been fed is transported to registration rollers 110. The registration rollers 110 transport the sheet onto the transfer belt 111 at an appropriate timing such that the toner image from each photosensitive member 102 is transferred onto the sheet. As described above, the toner images are transferred onto the sheet while the sheet is being transported on the transfer belt 111. The fixing unit 104 fixes the toner images onto the sheet by heating and compressing the sheet onto which the toner images have been transferred. After the toner images have been fixed, the sheet is discharged to the exterior of the image forming apparatus 1 by discharge rollers 112. An optical sensor 113 is disposed at a position opposite the transfer belt 111. The optical sensor 113 optically reads a test chart formed on the transfer belt 111 by the image forming units 101. If an error in an image forming range has been detected from the test chart read by the optical sensor 113, an image controller 700 (described later) performs control for compensating for the error when executing a subsequent job.

Although an example in which the toner image is transferred directly from each photosensitive member 102 to the sheet on the transfer belt 111 has been described here, the toner image may be transferred from each photosensitive member 102 to the sheet indirectly via an intermediate transfer member. Additionally, although an example in which a color image is formed using toners of a plurality of colors has been described here, the technique according to the present disclosure can also be applied in an image forming apparatus that forms monochromatic images using a single color of toner.

2. EXAMPLE OF CONFIGURATION OF EXPOSURE HEAD

FIGS. 2A and 2B illustrate the photosensitive member 102 and the exposure head 106. The exposure head 106 includes a light-emitting element array 201, a printed circuit board 202 on which the light-emitting element array 201 is mounted, a rod lens array 203, and a housing 204 that supports the printed circuit board 202 and the rod lens array 203. The photosensitive member 102 has a cylindrical shape. The exposure head 106 is arranged such that a longer direction thereof is parallel to an axial direction D1 of the photosensitive member 102, and a surface on which the rod lens array 203 is mounted faces the surface of the photosensitive member 102. While the photosensitive member 102 is rotating in a circumferential direction D2, the light-emitting element array 201 of the exposure head 106 emits light, and the rod lens array 203 focuses that light on the surface of the photosensitive member 102.

Figure 3A:
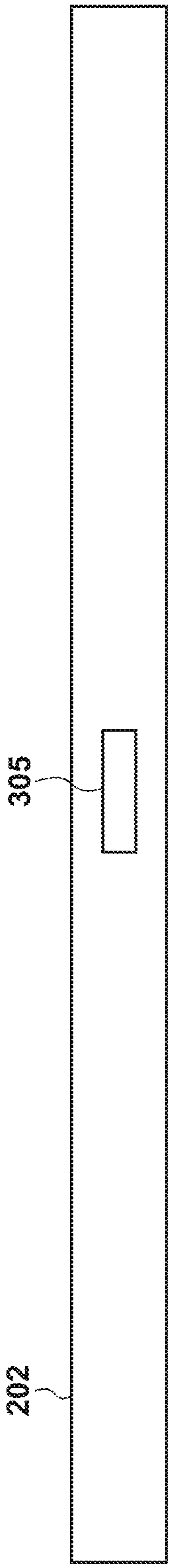
FIG. 3A is a first explanatory diagram illustrating the configuration of a printed circuit board of an exposure head according to an embodiment.
Figure 3B:
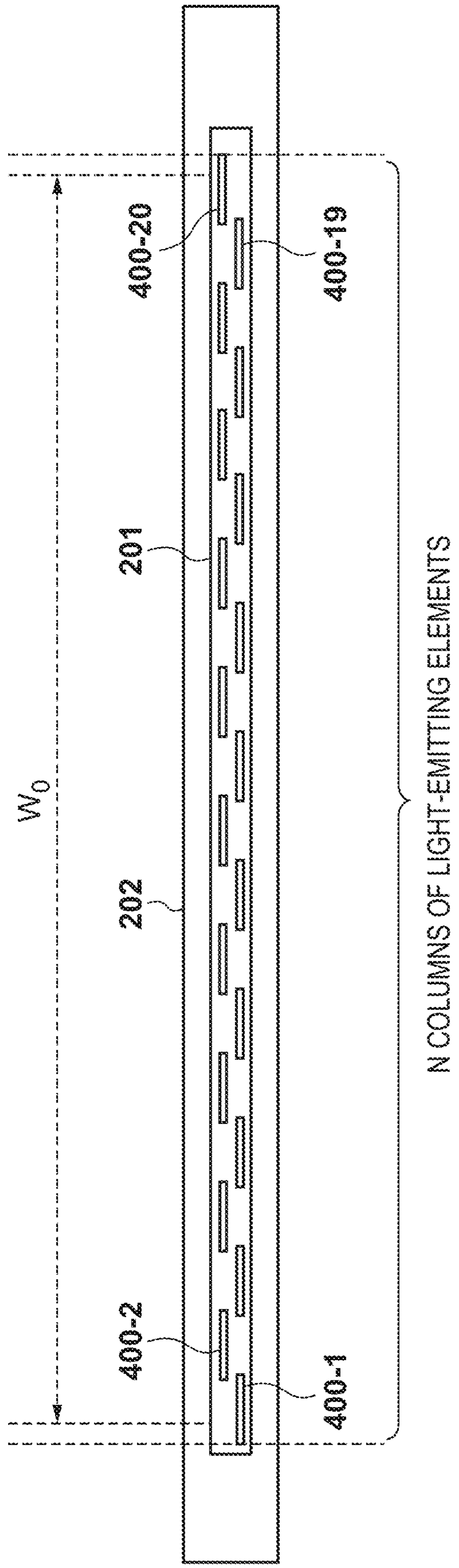
FIG. 3B is a second explanatory diagram illustrating the configuration of a printed circuit board of an exposure head according to an embodiment.
Figure 4:
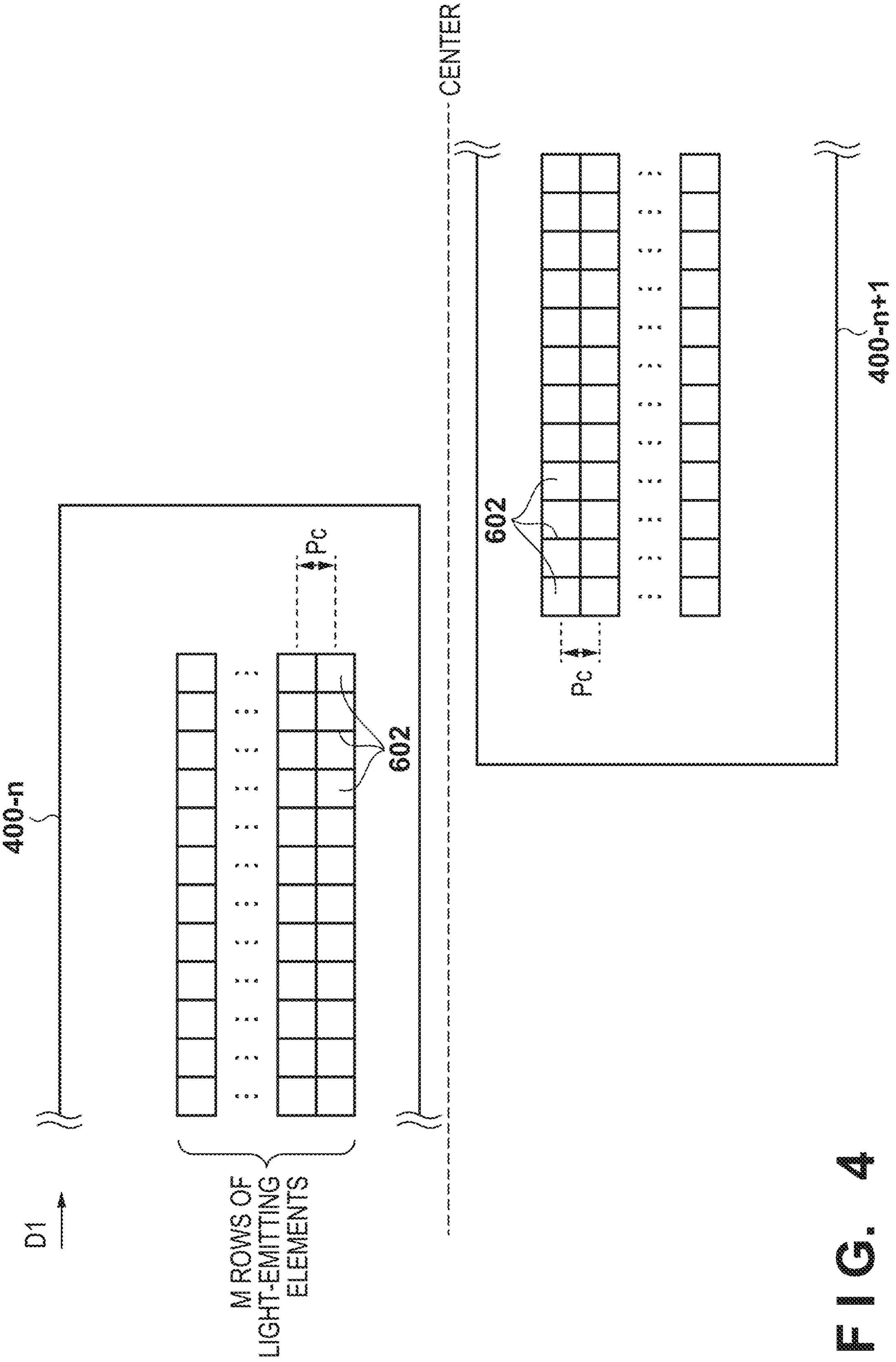
FIG. 4 is an explanatory diagram illustrating light-emitting chips and light-emitting element arrays in the light-emitting chips according to an embodiment.

FIGS. 3A and 3B illustrate an example of the configuration of the printed circuit board 202. Note that FIG. 3A illustrates a surface on which a connector 305 is mounted, and FIG. 3B illustrates a surface on which the light-emitting element array 201 is mounted (the surface on the opposite side from the surface on which the connector 305 is mounted). FIG. 4 schematically illustrates the arrangement of light-emitting chips 400 and light-emitting elements 602 within the light-emitting chips 400.

In the present embodiment, the light-emitting element array 201 includes a plurality of light-emitting elements arranged two-dimensionally. Overall, the light-emitting element array 201 includes N columns in the axial direction D1 of the photosensitive member, and M rows in the circumferential direction D2, of light-emitting elements, where M and N are integers greater than or equal to 2. In the example illustrated in FIG. 3B, the light-emitting element array 201 is constituted by 20 separate light-emitting chips 400-1 to 400-20, each of which includes a subset of the overall plurality of light-emitting elements, with the light-emitting chips 400-1 to 400-20 being arranged in a staggered manner along the axial direction D1. The light-emitting chips 400-1 to 400-20 may also be collectively referred to as "light-emitting chips 400". As illustrated in FIG. 3B, a range occupied by the light-emitting elements in all 20 light-emitting chips in the axial direction D1 is wider than a range occupied by a maximum width $W_0$ of the input image data. Accordingly, several light-emitting elements located at both ends in the axial direction D1 need not be used to expose the photosensitive member 102 unless an error in the image forming range is detected. Each light-emitting chip 400 of the printed circuit board 202 is connected to the image controller 700 (FIG. 7) by a connector 305. Hereinafter, for descriptive purposes, the lower of the numbers appended to the light-emitting chips 400-1 to 400-20 arranged along the axial direction D1 may be referred to as being on the left, and the higher as being on the right. For example, the light-emitting chip 400-1 is the light-emitting chip 400 at the left end, and the light-emitting chip 400-20 is the light-emitting chip at the right end.

A total number J (where J=N/20) of the light-emitting elements 602 arranged in each row of a single light-emitting chip 400 may be equal to 748, for example (J=748). On the other hand, a total number M of the light-emitting elements 602 arranged in each column of a single light-emitting chip 400 may be equal to 4, for example (M=4). In other words, in the embodiment, each light-emitting chip 400 includes 748 light-emitting elements 602 in the axial direction D1 and 4 in the circumferential direction D2, for a total of 2,992 (=748×4). An interval $P_C$ between center points of adjacent light-emitting elements 602 in the circumferential direction D2 may be, for example, about 21.16 μm, which corresponds to a resolution of 1,200 dpi. The interval between center points of adjacent light-emitting elements 602 in the axial direction D1 may also be about 21.16 m, and in this case, the 748 light-emitting elements 602 occupy a length of about 15.8 mm in the axial direction D1. Although FIG. 4 illustrates an example in which the light-emitting elements 602 are perfectly grid-shaped in each light-emitting chip 400 for descriptive purposes, in reality, the M (M=4) light-emitting elements 602 in each column are arranged in a stepped form. This point will be described in further detail later.

Figure 5:
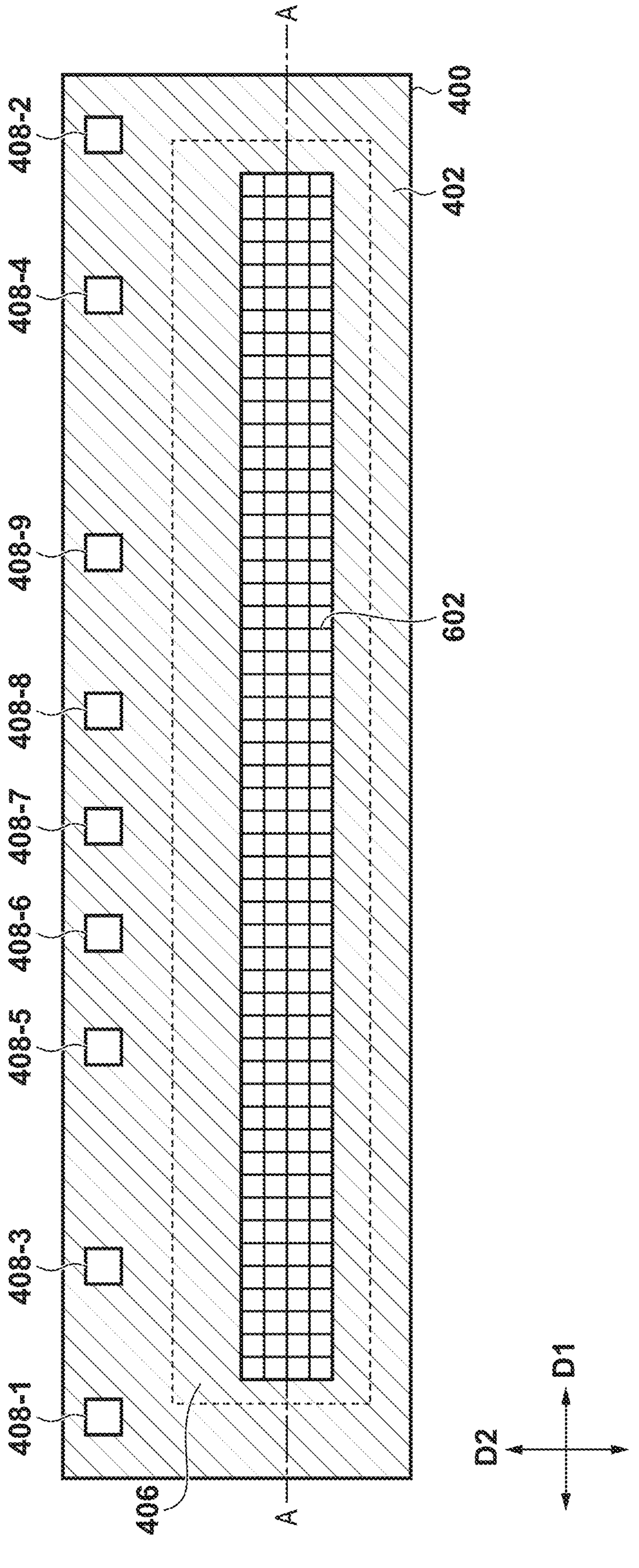
FIG. 5 is a plan view illustrating the overall configuration of a light-emitting chip according to an embodiment.

FIG. 5 is a plan view illustrating the overall configuration of the light-emitting chip 400. The plurality of light-emitting elements 602 of each light-emitting chip 400 are formed on a light-emitting substrate 402, which is a silicon substrate, for example. The light-emitting substrate 402 is also provided with a circuit unit 406 for driving the plurality of light-emitting elements 602. Pads 408-1 to 408-9 are connected to signal lines for communicating with the image controller 700, power lines for connecting to a power source, ground lines for grounding, and the like. The signal lines, the power lines, the ground lines, and the like may be, for example, wires made of gold.

Figure 6:
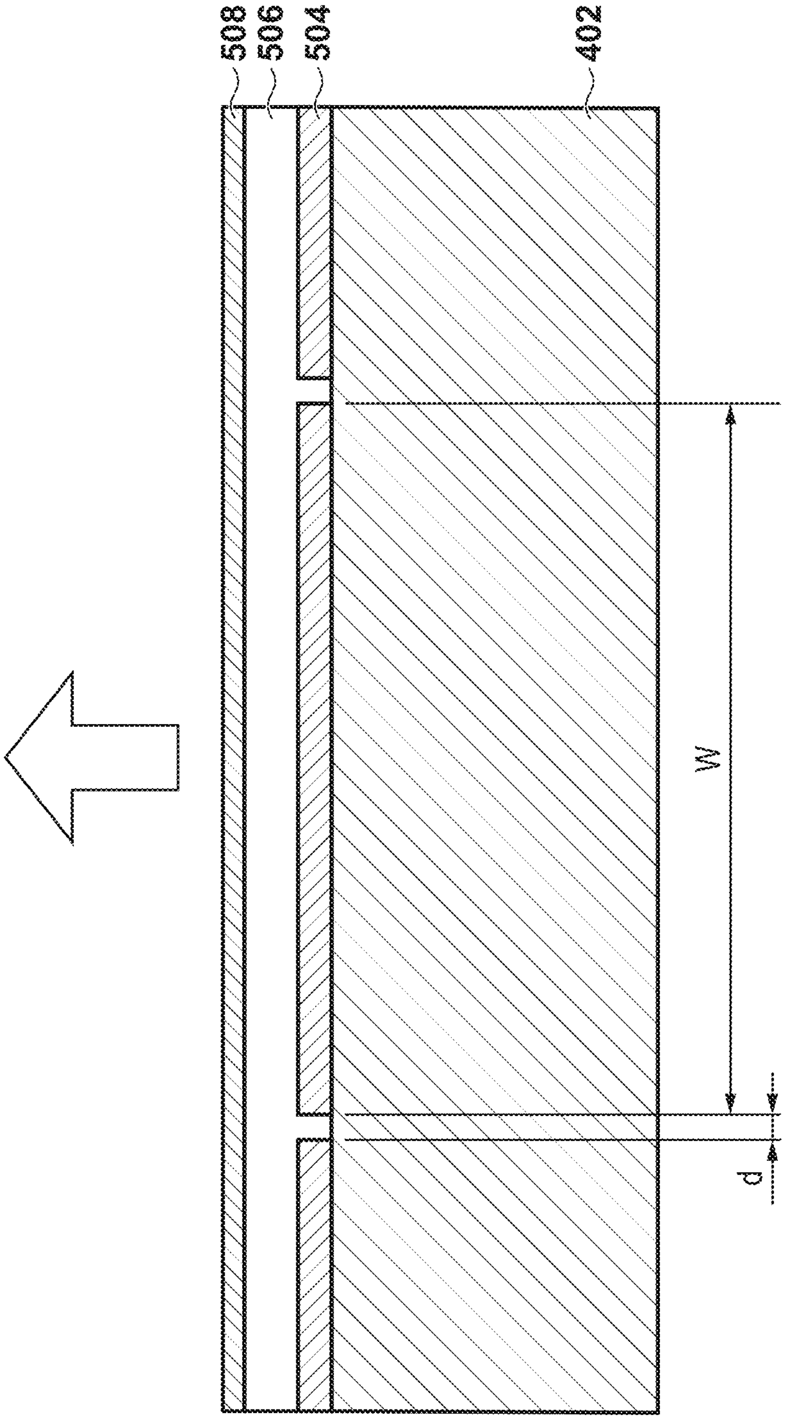
FIG. 6 is a cross-sectional view illustrating the overall configuration of a light-emitting chip according to an embodiment.

FIG. 6 illustrates part of a cross-section taken along a line A-A in FIG. 5. A plurality of lower electrodes 504 are formed on the light-emitting substrate 402. A gap of a length d is provided between two neighboring lower electrodes 504. A light-emitting layer 506 is provided above the lower electrodes 504, and an upper electrode 508 is provided above the light-emitting layer 506. The upper electrode 508 is a single common electrode for the plurality of lower electrodes 504. When a voltage is applied between the lower electrodes 504 and the upper electrode 508, the light-emitting layer 506 emits light as a result of current flowing from the lower electrodes 504 to the upper electrode 508. Accordingly, a single light-emitting element 602 is constituted by (i) a single lower electrode 504 and (ii) a partial region of the light-emitting layer 506 and the upper electrode 508 corresponding to that lower electrode 504. In other words, in the present embodiment, the light-emitting substrate 402 includes a plurality of light-emitting elements 602.

For example, an organic electroluminescent film can be used for the light-emitting layer 506. The upper electrode 508 is constituted by a transparent electrode, such as indium tin oxide (ITO), for example, so as to transmit the light emission wavelength of the light-emitting layer 506. Although the entire upper electrode 508 transmits the light emission wavelength of the light-emitting layer 506 in the present embodiment, it is not necessary for the entire upper electrode 508 to transmit the light emission wavelength. Specifically, a partial region through which light passes from each light-emitting element 602 may transmit the light emission wavelength.

Although a single continuous light-emitting layer 506 is illustrated as being formed in FIG. 6, a plurality of light-emitting layers 506 each having a width equal to a width W of a single lower electrode 504 may be formed above corresponding ones of the lower electrodes 504. Additionally, although the upper electrode 508 is illustrated as being formed as a single common electrode for the plurality of lower electrodes 504 in FIG. 6, a plurality of upper electrodes 508, each having a width equal to the width W of a single lower electrode 504, may be formed corresponding to respective ones of the lower electrodes 504. Of the lower electrodes 504 of each light-emitting chip 400, a first plurality of lower electrodes 504 may be covered by a first light-emitting layer 506, and a second plurality of lower electrodes 504 may be covered by a second light-emitting layer 506. Likewise, of the lower electrodes 504 of each light-emitting chip 400, a first upper electrode 508 may be formed in common corresponding to the first plurality of lower electrodes 504, and a second upper electrode 508 may be formed in common corresponding to the second plurality of lower electrodes 504. In such a configuration too, a single light-emitting element 602 is constituted by (i) a single lower electrode 504 and (ii) a region of the light-emitting layer 506 and the upper electrode 508 corresponding to that lower electrode 504.

Figure 7:
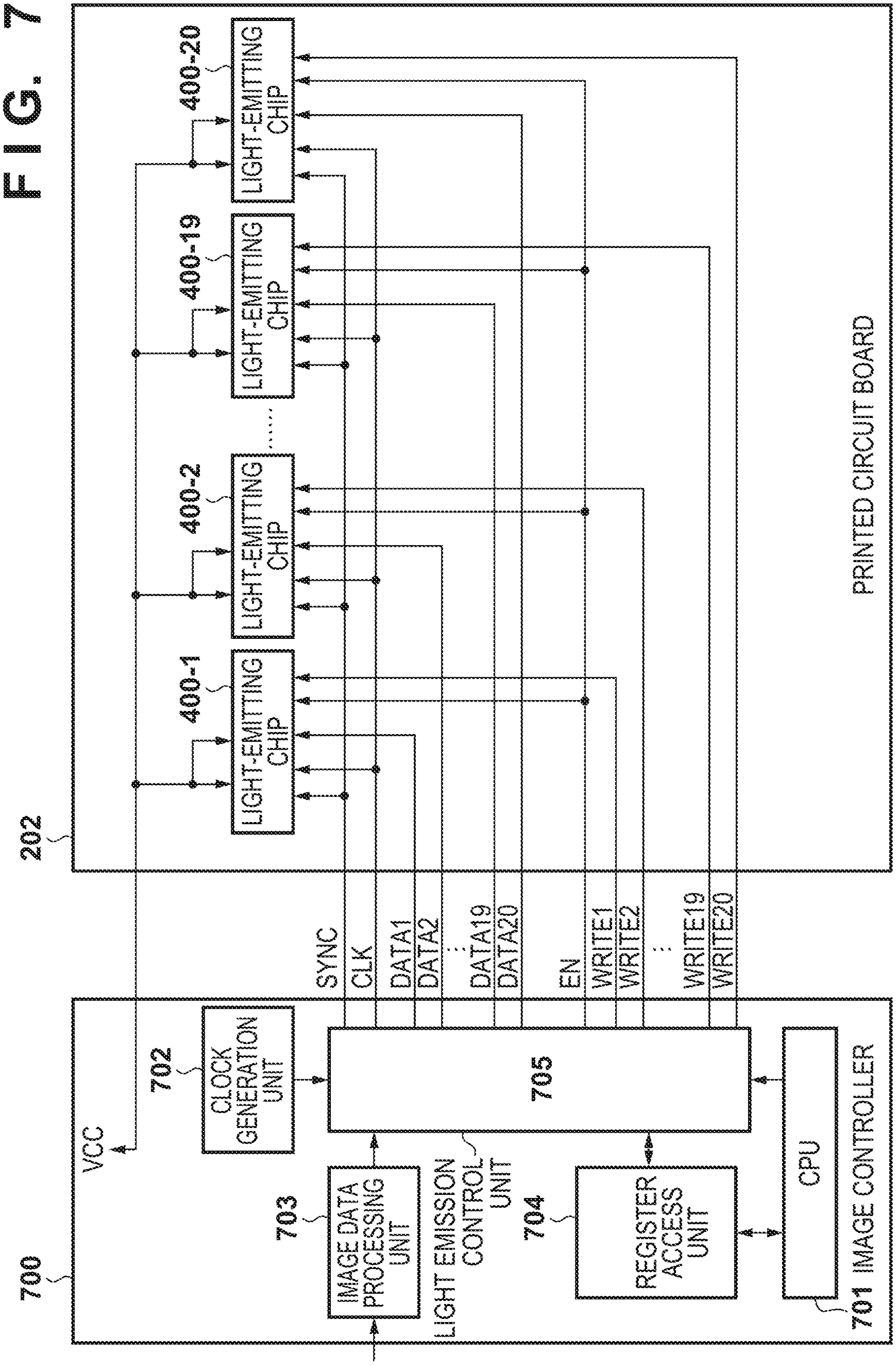
FIG. 7 is a circuit diagram illustrating a control configuration of an exposure apparatus according to an embodiment.

FIG. 7 is a circuit diagram pertaining to a control configuration for controlling the light-emitting chip 400. The image controller 700 is a control circuit that communicates with the printed circuit board 202 through a plurality of signal lines (wires). The image controller 700 includes a CPU 701, a clock generation unit 702, an image data processing unit 703, a register access unit 704, and a light emission control unit 705. The light emission control unit 705 is a constituent element that constitutes the exposure apparatus along with the exposure head 106. The light emission control unit 705 terminates the signal lines from the printed circuit board 202. An nth light-emitting chip 400-*n* (where n is an integer from 1 to 20) on the printed circuit board 202 is connected to the light emission control unit 705 via a signal line DATAn and a signal line WRITEn.

The signal line DATAn is used to transmit image data from the image controller 700 to the light-emitting chip 400-*n*. The signal line WRITEn is used by the image controller 700 to write control data to a register of the light-emitting chip 400-*n*.

A single signal line CLK, a single signal line SYNC, and a single signal line EN are further provided between the light emission control unit 705 and the respective light-emitting chips 400. The signal line CLK is used to transmit clock signals for transmitting data on the signal lines DATAn and WRITEn. The light emission control unit 705 outputs, to the signal line CLK, a clock signal generated based on a reference clock signal from the clock generation unit 702. The signals transmitted on the signal line SYNC and the signal line EN will be described later.

The CPU 701 controls the image forming apparatus 1 as a whole. The image data processing unit 703 performs image processing on image data received from the reading unit 100 or the external apparatus, and generates image data in a binary bitmap format for controlling the emission of light from the light-emitting elements 602 of the light-emitting chips 400 on the printed circuit board 202 to turn on and off. The image processing here can include, for example, raster conversion, tone correction, color conversion, and halftone processing. The image data processing unit 703 transmits the generated image data to the light emission control unit 705 as the input image data. The register access unit 704 receives the control data to be written into the registers in the respective light-emitting chips 400 from the CPU 701 and transmits that control data to the light emission control unit 705.

Figure 8:
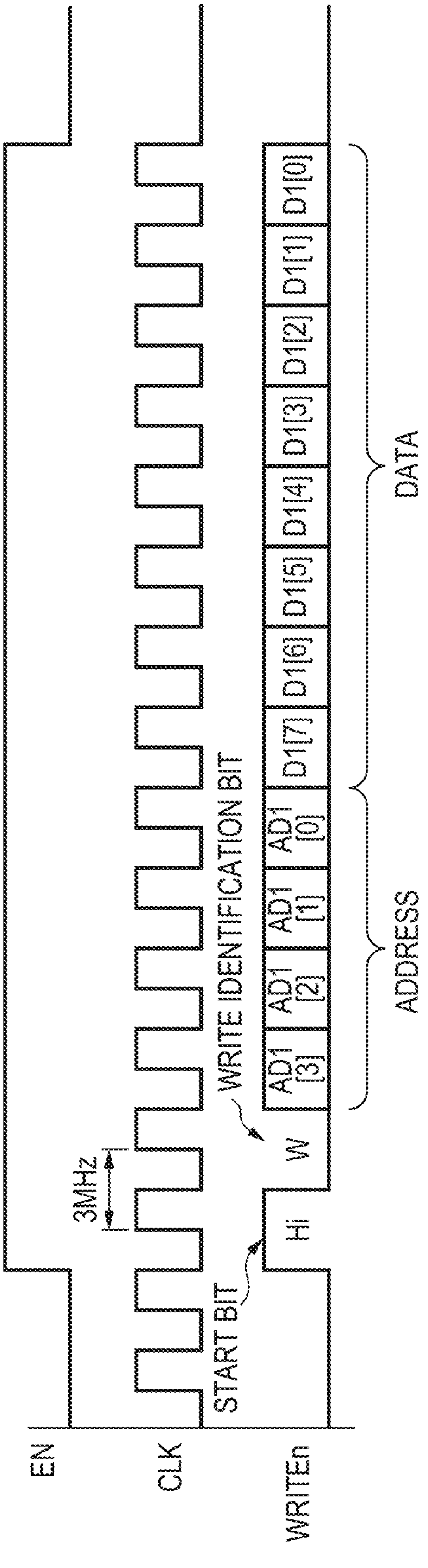
FIG. 8 is a signal chart pertaining to accessing a register of a light-emitting chip according to an embodiment.

FIG. 8 illustrates transitions in the signal level on each signal line when the control data is written into the register of the light-emitting chip 400. An enable signal which goes to high level during communication to indicate that communication is underway is output to the signal line EN. The light emission control unit 705 transmits a start bit to the signal line WRITEn in synchronization with the rise of the enable signal. The light emission control unit 705 then transmits a write identification bit indicating a write operation, and then transmits the address in the register to which the control data is to be written (4 bits, in this example) and the control data (8 bits, in this example). The light emission control unit 705 sets the frequency of the clock signal transmitted to the signal line CLK to 3 MHz, for example, when writing to the register.

Figure 9:
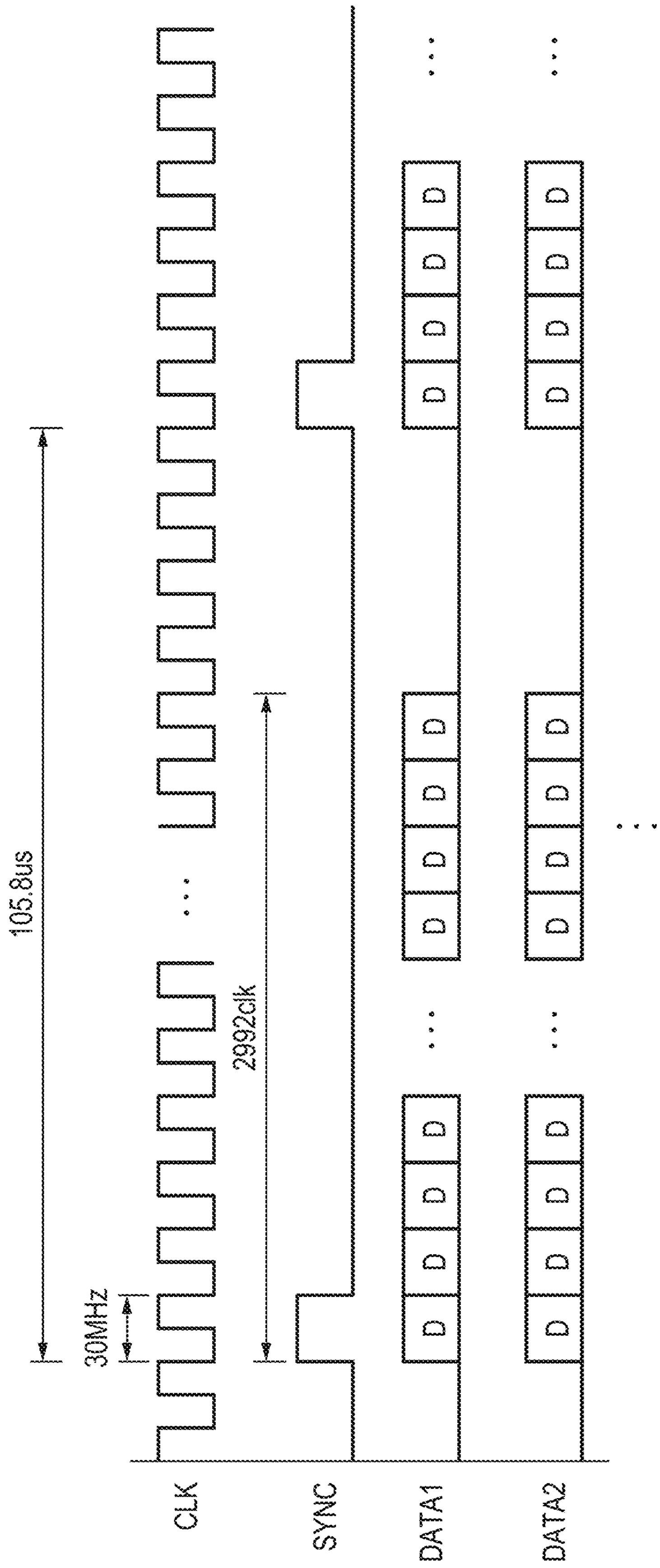
FIG. 9 is a signal chart pertaining to the transmission of image data to a light-emitting chip according to an embodiment.

FIG. 9 illustrates transitions in the signal level of each signal line when the image data is transmitted to each light-emitting chip 400. A periodic line synchronization signal indicating the exposure timing of each line in the photosensitive member 102 is output to the signal line SYNC. Assuming that the circumferential speed of the photosensitive member 102 is 200 mm/s and the resolution in the circumferential direction is 1,200 dpi (about 21.16 m), the line synchronization signal is output at a period of about 105.8 s. The light emission control unit 705 transmits the image data to the signal lines DATA1 to DATA20 in synchronization with the rise of the line synchronization signal. In the present embodiment, each light-emitting chip 400 includes 2,992 light-emitting elements 602, and thus it is necessary to transmit, to each light-emitting chip 400, image data indicating light emission or non-light emission for each of the total of 2,992 light-emitting elements 602 within a period of about 105.8 s. Accordingly, in this example, when transmitting the image data, the light emission control unit 705 sets the frequency of the clock signal transmitted to the signal line CLK to 30 MHz, as illustrated in FIG. 9.

Figure 10:
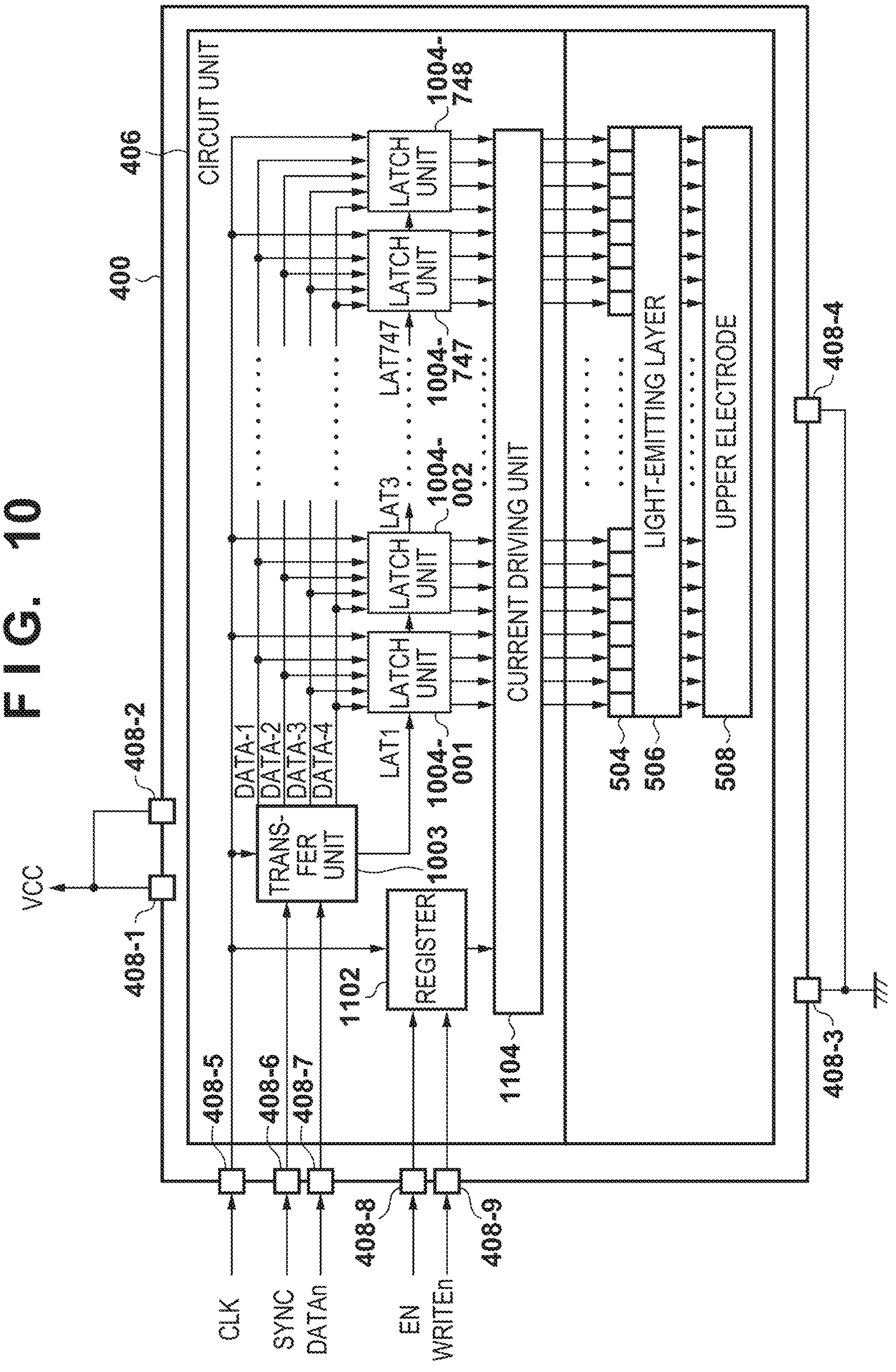
FIG. 10 is a function block diagram illustrating, in detail, the configuration of a light-emitting chip according to an embodiment.

FIG. 10 is a function block diagram illustrating, in detail, the configuration of a single light-emitting chip 400 (the nth light-emitting chip 400-*n*). As illustrated in FIG. 5 as well, the light-emitting chip 400 includes nine pads (input terminals) 408-1 to 408-9. The pad 408-1 and the pad 408-2 are connected to a source voltage VCC by power lines. Each circuit in the circuit unit 406 of the light-emitting chip 400 is supplied with power by this source voltage VCC. The pad 408-3 and the pad 408-4 are grounded by ground lines. Each circuit in the circuit unit 406 and the upper electrode 508 are grounded through the pad 408-3 and the pad 408-4. The signal line CLK is connected to a transfer unit 1003, a register 1102, and latch units 1004-001 to 748 through the pad 408-5. The signal lines SYNC and DATAn are connected to the transfer unit 1003 through the pads 408-6 and 408-7. The signal lines EN and WRITEn are connected to the register 1102 through the pads 408-8 and 408-9. The register 1102 stores control data indicating, for example, a desired light emission intensity of the light-emitting elements 602.

Using the line synchronization signal from the signal line SYNC, the transfer unit 1003 receives the input image data, which includes a series of pixel values indicating light emission or non-light emission for each of the light-emitting elements 602, from the signal line DATAn, in synchronization with the clock signal from the signal line CLK. The transfer unit 1003 performs serial-parallel conversion on the series of pixel values received serially from the signal line DATAn in units of M pixel values (e.g., M=4). For example, the transfer unit 1003 has four cascade-connected D-flip flops, and outputs pixel values DATA-1, DATA-2, DATA-3, and DATA-4, which are input across four clocks, in parallel, to the latch units 1004-001 to 1004-748. The transfer unit 1003 further has four D-flip flops for delaying the line synchronization signal, and outputs a first latch signal to the latch unit 1004-001 through a signal line LAT1 at a timing that is four clocks after the input of the line synchronization signal.

A k-th latch unit (data holding unit) 1004-*k* (where k is an integer from 1 to 748) holds, using a latch circuit, the four pixel values DATA-1, DATA-2, DATA-3, and DATA-4 that are input from the transfer unit 1003 simultaneously with the input of the k-th latch signal. With the exception of the final latch unit 1004-748, the k-th latch unit 1004-*k* delays the k-th latch signal by four clocks and outputs a (k+1)-th latch signal to a latch unit 1004-(*k*+1) through a signal line LAT (k+1). The k-th latch unit 1004-*k* then continues to output a drive signal based on the four pixel values held by the latch circuit to a current driving unit 1104 during the signal period of the k-th latch signal. For example, there is a delay equivalent to four clocks between the timing at which the first latch signal is input to the latch unit 1004-1 and the timing at which a second latch signal is input to the latch unit 1004-2. Accordingly, the latch unit 1004-1 outputs drive signals based on the first, second, third, and fourth pixel values to the current driving unit 1104, whereas the latch unit 1004-2 outputs drive signals based on the fifth, sixth, seventh, and eighth pixel values to the current driving unit 1104. Generally speaking, the latch unit 1004-*k* outputs a drive signal based on the pixel values of (4 k−3), (4 k−2), (4 k−1), and (4 k) to the current driving unit 1104. Accordingly, in the embodiment illustrated in FIG. 10, 2,992 (=748×4) drive signals for controlling the driving of the 2,992 light-emitting elements 602 are output roughly in parallel to the current driving unit 1104 by the 748 latch units 1004-001 to 1004-748. Each drive signal is a binary signal indicating a high level or a low level.

The current driving unit 1104 includes 2,992 light emission driving circuits corresponding to respective ones of the 2,992 light-emitting elements 602, each including a partial region of the light-emitting layer 506. While the corresponding drive signal is at high level, indicating that light emission is turned on, each light emission driving circuit applies, to the light-emitting layer 506 of the corresponding light-emitting element 602, a drive voltage corresponding to the light emission intensity indicated by the control data in the register 1102. As a result, current flows in the light-emitting layer 506, and the light-emitting element 602 emits light. Note that the control data may indicate a single individual light emission intensity for each light-emitting element 602, a single light emission intensity for each of groups of light-emitting elements 602, or a single light emission intensity common to all of the light-emitting elements 602.

3. MULTIPLE EXPOSURE CONTROL

Figure 11:
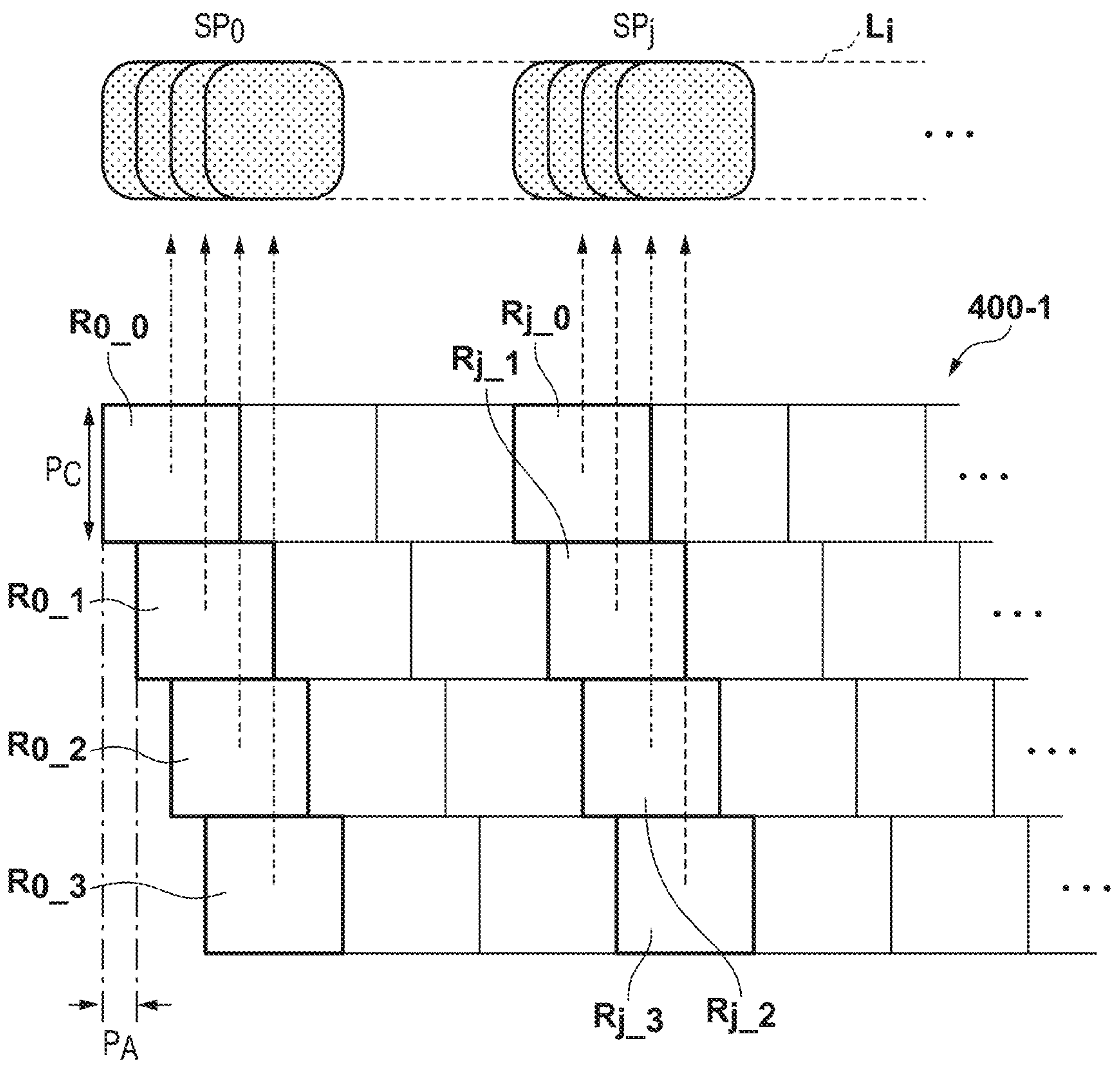
FIG. 11 is an explanatory diagram illustrating multiple exposure by light-emitting elements arranged in stepped form.

Although FIG. 4 illustrates an example in which the light-emitting elements 602 are arranged perfectly in a grid in each light-emitting chip 400, in reality, in the present embodiment, the M light-emitting elements 602 in each column may be arranged in a stepped form at a constant pitch. FIG. 11 is an explanatory diagram illustrating multiple exposure by light-emitting elements arranged in stepped form. Here, a partial illustration is given of an example of the arrangement of the light-emitting elements in the light-emitting chip 400-1 when M=4. In FIG. 11, $R_{j\_m}$ (j={0, 1, . . . , j−1} and m={0, 1, 2, 3}) represents the light-emitting element 602 in the j-th column from the left in the axial direction and in the m-th row from the top in the circumferential direction. As described above, a pitch $P_c$ in the circumferential direction of the light-emitting element may be about 21.16 m. The spacing, in the axial direction, between two adjacent light-emitting elements among the M light-emitting elements in each column, i.e., a pitch $P_A$ in the axial direction of the light-emitting elements, may be about 5 μm, corresponding to a resolution of 4,800 dpi.

By arranging the four light-emitting elements in each column in a stepped form in this manner, any two adjacent light-emitting elements, among the four light-emitting elements, occupy a range in which the light-emitting elements partially overlap in the axial direction. The four light-emitting elements in the columns corresponding to each pixel position in the input image data then successively emit light while the photosensitive member 102 is rotating, which forms a spot corresponding to each pixel position on the surface of the photosensitive member 102. Here, the spots of respective pixel positions correspond to pixels of the image formed on a sheet. In the example in FIG. 11, when the pixel value at the left end of an i-th line of the input image data indicates that light emission is on, the light-emitting elements $R_{0\_0}$, $R_{0\_1}$, $R_{0\_2}$, and $R_{0\_3}$ successively emit light at timings at which those elements oppose a line $L_i$ on the surface of the photosensitive member 102. As a result, the spot region at the left end of the line $L_i$ is exposed multiple times, and a corresponding spot $SP_0$ is formed. Similarly, when the j-th pixel value from the left in the i-th line of the input image data indicates that light emission is on, light-emitting elements $R_{j\_0}$, $R_{j\_1}$, $R_{j\_2}$, and $R_{j\_3}$ successively emit light at timings at which those elements oppose the line $L_i$ on the surface of the photosensitive member 102. As a result, the j-th spot region from the left in the line $L_i$ is exposed multiple times, and a corresponding spot $SP_j$ is formed.

As can be seen from FIG. 11, in the present embodiment, the light-emitting elements of the two neighboring columns in the axial direction also occupy ranges which partially overlap in the axial direction. Similarly, of two neighboring light-emitting chips 400 in the axial direction, the light-emitting elements in the right-end column of the left light-emitting chip 400 and the light-emitting elements in the left-end column of the right light-emitting chip 400 also occupy ranges which partially overlap in the axial direction. Throughout the 20 light-emitting chips 400, the pitch $P_A$ in the axial direction of the light-emitting elements is constant at about 5 μm. By successively emitting light from the four light-emitting elements in each column of the light-emitting chips 400 at an appropriate timing, a smooth electrostatic latent image line, constituted by a series of spots having constant spot intervals and partially overlapping with each other, can be formed on the surface of the photosensitive member 102. Then, a two-dimensional electrostatic latent image is generated as a result of continuously forming such lines in the circumferential direction.

The spot region at the left end of the line $L_i$ has been described here as being exposed to light from the light-emitting elements $R_{0\_0}$, $R_{0\_1}$, $R_{0\_2}$, and $R_{0\_3}$. In reality, the light-emitting elements $R_{0\_0}$, $R_{0\_1}$, $R_{0\_2}$, and $R_{0\_3}$ are not the left-most light-emitting elements of all the light-emitting chips 400, and a column of light-emitting elements that do not normally emit light (unless an error in the image forming range is detected) may be present further to the left thereof. The same can be said for the right end.

Moreover, the technology according to the present disclosure is not limited to the example described above where M light-emitting elements of each column are arranged in a stepped form such that any two adjacent light-emitting elements thereof occupy ranges that overlap partially in the axial direction. For example, M light-emitting elements of each column may be arranged such that at least two adjacent light-emitting elements thereof overlap with each other in the axial direction.

FIGS. 12A to 12D are explanatory diagrams illustrating a light emission control sequence based on input image data. During image formation, the light emission control unit 705 receives input image data IM1 in binary bitmap format from the image data processing unit 703. On the left side in FIG. 12A, the j-th pixel value from the left in the i-th line from the top of the input image data IM1, which is a two-dimensional pixel value array, is denoted as (j,i) (j={0, 1, 2, . . . }, i={0, 1, 2, . . . }). The light emission control unit 705 adds (M−1) lines' worth of dummy pixel values to the beginning of the input image data IM1. If M=4, when the added dummy pixel values are included, the range of an index i of the pixel values is {−3, −2, −1, 0, 1, 2, . . . }. The dummy pixel values may be zero, which means that light emission is turned off, for example. Although the light emission control unit 705 may also add dummy pixel values to the left and right of the input image data IM1 such that the number of pixel values in a single line is equal to the number of light-emitting elements in the axial direction, only effective pixel values are illustrated here for the axial direction to simplify the descriptions.

In a first line period $t_0$ of the image formation, the light emission control unit 705 reads out the pixel values of the four lines from the top of the input image data IM1, and outputs a subset for every 2,992 (=748×4) of the read-out pixel values to the light-emitting chip 400-*n* through the signal line DATAn. Focusing on the light-emitting chip 400-1 illustrated on the right in FIG. 12A, image data in a readout range RD, which includes pixel values from (0,−3) to (748,0), is input through the signal line DATA1 during the line period $t_0$. The light-emitting chip 400-1 subjects the input image data to a serial-parallel conversion, and supplies drive signals based on those pixel values to the corresponding 2,992 light-emitting elements. For example, drive signals based on the pixel values (0,−3), (0,−2), (0,−1), (0,0), and (1,−3) are supplied to the light–emitting elements $R_{0\_0}$, $R_{0\_1}$, $R_{0\_2}$, $R_{0\_3}$, and $R_{1\_0}$. In particular, as indicated by the broken lines in FIG. 12A, drive signals based on the effective pixel values of a line $DL_0$ having an index i=0 in the input image data IM1 are supplied to the light-emitting elements in the fourth row, including the light-emitting element $R_{0\_3}$. As a result, a line $L_0$ on the surface of the photosensitive member 102 is exposed in accordance with the pixel value set for the line $DL_0$ in the input image data IM1. However, at this point in time, multiple exposure is underway, and thus the formation of the line $L_0$ of the electrostatic latent image is incomplete.

Figure 12A:
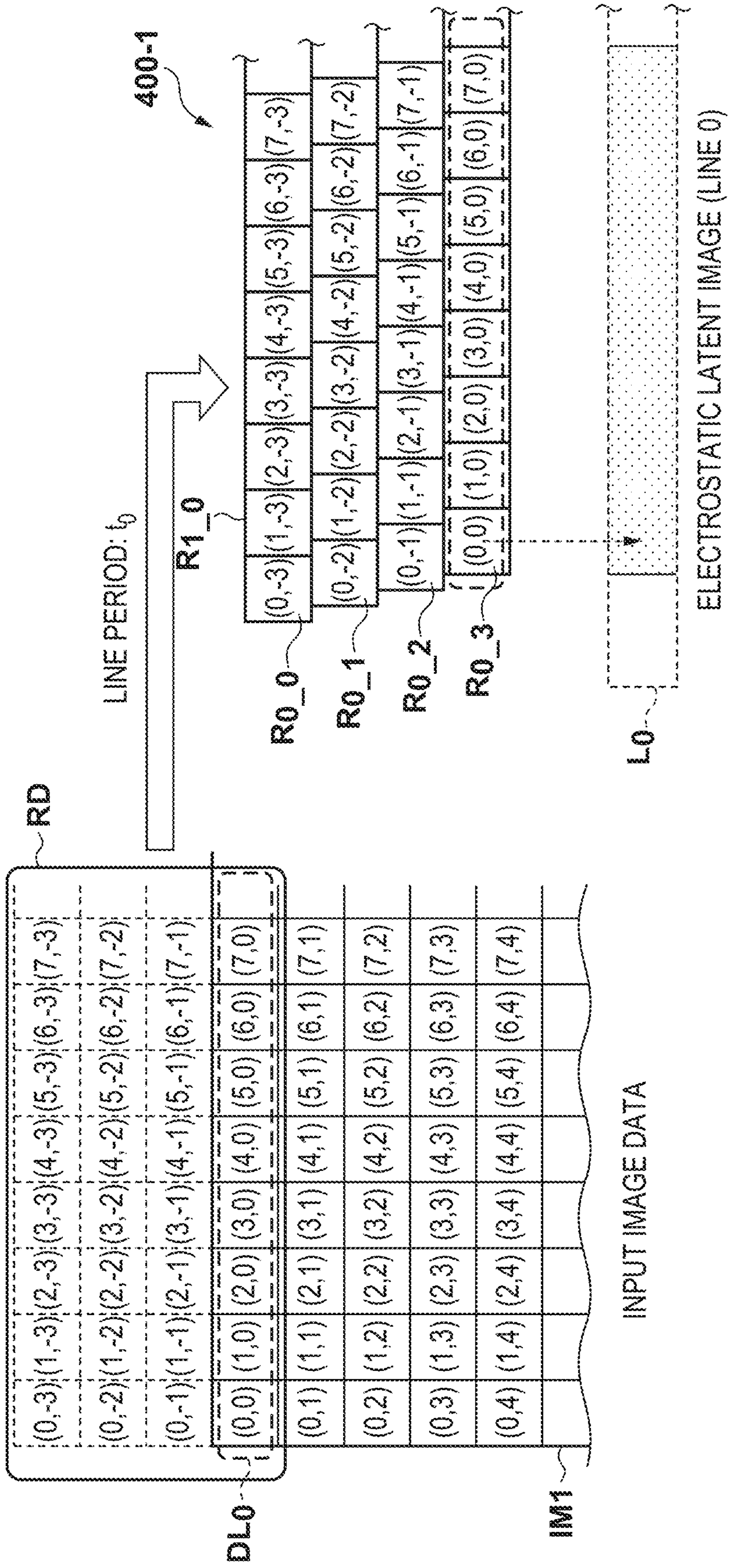
FIG. 12A is an explanatory diagram illustrating a light emission control sequence based on input image data.
Figure 12B:
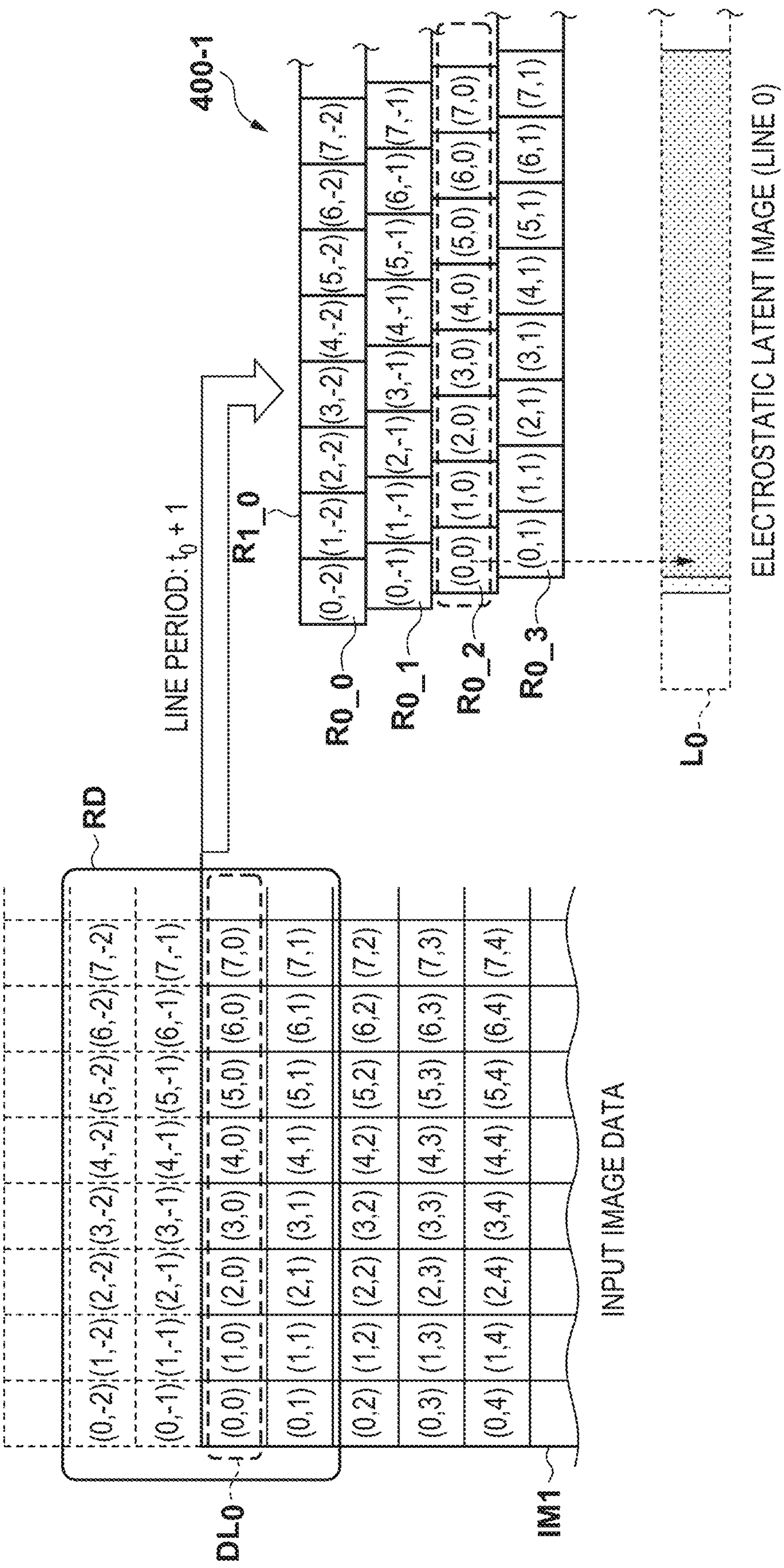
FIG. 12B is an explanatory diagram illustrating a light emission control sequence based on input image data.

FIG. 12B illustrates driving of the light-emitting chip 400-1 during the next line period $t_0+1$. In the line period $t_0+1$, the light emission control unit 705 moves the readout range RD of the input image data IM1 down one line, reads out pixel values from (0,−2) to (748,1), and outputs those values to the light-emitting chip 400-1 through the signal line DATA1. The light-emitting chip 400-1 supplies drive signals based on the input pixel values to the 2,992 light-emitting elements. For example, drive signals based on the pixel values (0,−2), (0,−1), (0,0), (0,1), and (1,−2) are supplied to the light–emitting elements $R_{0\_0}$, $R_{0\_1}$, $R_{0\_2}$, $R_{0\_3}$, and $R_{1\_0}$. In the line period $t_0+1$, drive signals based on the effective pixel value of the line $DL_0$ in the input image data IM1 are supplied to the light-emitting elements in the third row, including the light-emitting element $R_{0\_2}$. At this time, the photosensitive member 102 is rotating in the circumferential direction, and thus the line $L_0$ on the surface of the photosensitive member 102 is facing the light-emitting elements in the third row of the light-emitting chip 400-1. As a result, the line $L_0$ on the surface of the photosensitive member 102 is exposed again in accordance with the pixel value set for the line $DL_0$ in the input image data IM1.

FIG. 12C illustrates driving of the light-emitting chip 400-1 during the next line period $t_0+2$. In the line period $t_0+2$, the light emission control unit 705 moves the readout range RD of the input image data IM1 down one more line, reads out pixel values from (0,−1) to (748,2), and outputs those values to the light-emitting chip 400-1 through the signal line DATA1. The light-emitting chip 400-1 supplies drive signals based on the input pixel values to the 2,992 light-emitting elements. In the line period $t_0+2$, drive signals based on the effective pixel value of the line $DL_0$ in the input image data IM1 are supplied to the light-emitting elements in the second row, including the light-emitting element $R_{0\_1}$. At this time, the line $L_0$ on the surface of the photosensitive member 102 faces the light-emitting elements in the second row of the light-emitting chip 400-1. As a result, the line $L_0$ on the surface of the photosensitive member 102 is exposed a third time in accordance with the pixel value set for the line $DL_0$ in the input image data IM1.

Figure 12D:
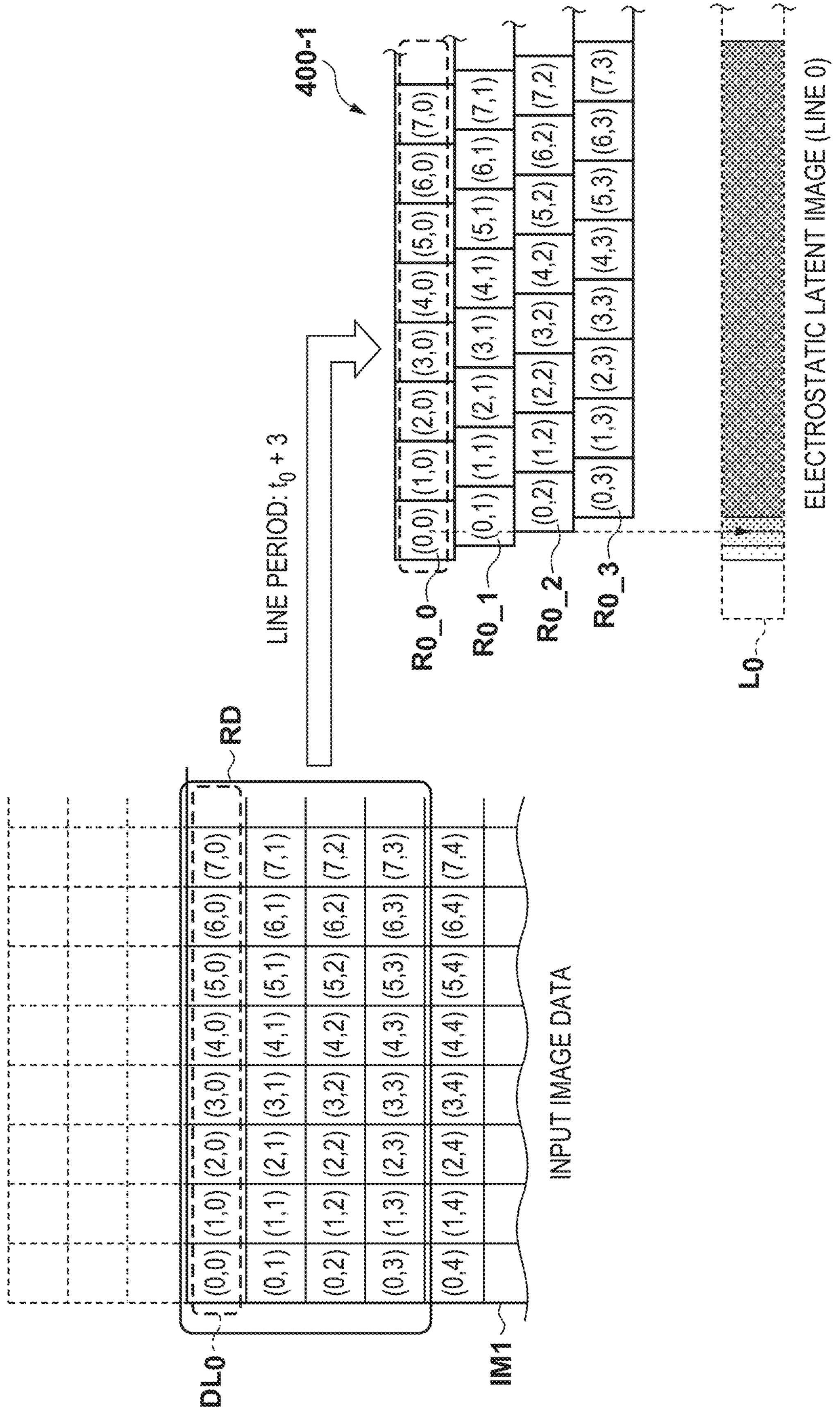
FIG. 12D is an explanatory diagram illustrating a light emission control sequence based on input image data.

FIG. 12D illustrates driving of the light-emitting chip 400-1 during the next line period $t_0+3$. In the line period $t_0+3$, the light emission control unit 705 moves the readout range RD of the input image data IM1 down one more line, reads out pixel values from (0,0) to (748,3), and outputs those values to the light-emitting chip 400-1 through the signal line DATA1. The light-emitting chip 400-1 supplies drive signals based on the input pixel values to the 2,992 light-emitting elements. In the line period $t_0+3$, drive signals based on the effective pixel value of the line $DL_0$ in the input image data IM1 are supplied to the light-emitting elements in the first row, including the light-emitting element $R_{0\_0}$. At this time, the line $L_0$ on the surface of the photosensitive member 102 faces the light-emitting elements in the first row of the light-emitting chip 400-1. As a result, the line $L_0$ on the surface of the photosensitive member 102 is exposed a fourth time in accordance with the pixel value set for the line $DL_0$ in the input image data IM1. At this point in time, multiple exposure using the four light-emitting elements in each column of the light-emitting chip 400 has been performed, and thus the formation of the line $L_0$ of the electrostatic latent image is complete. The lines that follow the line $L_0$ of the electrostatic latent image can be formed in the same manner on the surface of the photosensitive member 102 by repeating these line periods.

In this manner, according to the present embodiment, a drive signal based on the pixel value at each pixel position is input to four light-emitting elements in corresponding columns of the light-emitting element array. Specifically, for example, a drive signal based on the pixel value (0,0) is input to the four light-emitting elements $R_{0\_3}$, $R_{0\_2}$, $R_{0\_1}$, and $R_{0\_0}$. When these four light-emitting elements emit light in accordance with the drive signal, a spot corresponding to the pixel value (0,0) is formed on the surface of the photosensitive member 102. Similarly, a drive signal based on the pixel value (1,0) is input to the four light-emitting elements $R_{1\_3}$, $R_{1\_2}$, $R_{1\_1}$, and $R_{1\_0}$. When these four light-emitting elements emit light in accordance with the drive signal, a spot corresponding to the pixel value (1,0) is formed on the surface of the photosensitive member 102. In this manner, in the present embodiment, multiple light-emitting portions (for example, light-emitting elements) are driven with a pixel value (pixel data) to form a pixel of an image. For example, when an image with an output resolution of 1200 dpi in the axial direction is formed, each pixel is usually formed using four light-emitting portions that are arranged at a pitch $P_A$ of 4800 dpi in the axial direction. The number of light-emitting portions used for forming a pixel may be equal to the number M of light-emitting portions of each column, and the pitch of the M light-emitting portions in the axial direction is a pitch corresponding to the output resolution divided by M. In other words, at least two light-emitting portions of the M light-emitting portions used to form one pixel overlap by $$\frac{M-1}{M}\cdot P$$

in the axial direction, where P is the length in the axial direction of one pixel corresponding to the output resolution. It should be noted that the length of the overlap is not limited to the above example.

As can be understood from the descriptions in this section, the light emission control unit 705 causes the plurality of light-emitting elements 602 to emit light based on pixel values read out from a readout range spanning M lines of the input image data IM1. The readout range moves one line at a time for each line period. Such control of the readout range is performed in the same manner when compensating for errors in the image forming range, which will be described next.

4. COMPENSATION FOR ERROR IN IMAGE FORMING RANGE

As described above, it is difficult to avoid the occurrence of some errors in the arrangement of components when manufacturing an exposure apparatus or an image forming apparatus. Even after manufacture, environmental factors such as temperature changes, or physical forces during transport, installation, or use, can cause misalignment in the components within an apparatus. Such errors or misalignment in the arrangement in the image forming units 101 result in errors in the image forming range. Errors in the image forming range can typically include one or both of a positional misalignment component and a scaling error component. The positional misalignment component represents displacement in the image forming position. Relative misalignment among the images of the plurality of color components, and an overall misalignment of the image forming position relative to the sheet, are examples of the positional misalignment component. The scaling error component represents an expansion or reduction of the image forming range. Expansion of the image forming range caused by thermal expansion in the exposure head 106 is an example of the scaling error component.

In order to determine whether it is necessary to compensate for error in the image forming range, the CPU 701 of the image forming apparatus 1 periodically executes calibration in response to an instruction from a user or when some kind of trigger condition is satisfied. Specifically, the CPU 701 controls the image forming units 101 to form a test chart on the transfer belt 111. Here, the test chart may be an image having a known pattern. When forming the test chart too, multiple exposure is performed using the above-described light-emitting element array of the exposure head 106. The CPU 701 also controls the optical sensor 113 to optically read the test chart formed on the transfer belt 111. The optical sensor 113 outputs read image data representing the result of reading the test chart to the CPU 701. The CPU 701 then detects an error in the image forming range of the image formed through multiple exposure by comparing the read image data with the known pattern. Accordingly, the CPU 701 according to the present embodiment can function as a detection unit that detects an error (positional misalignment or scaling error) in the image forming range. If an error in the circumferential direction is detected as a result of the calibration, the CPU 701 can compensate for the error in the circumferential direction by adjusting the relative timing between the rotation of the photosensitive member 102 and the emission of light from the light-emitting chips 400. On the other hand, if an error in the axial direction is detected, the CPU 701 notifies the light emission control unit 705 of a detected positional misalignment amount X in the axial direction and/or an error scale Y by outputting or transmitting correction data that indicates the detected error(s) to the light emission control unit 705. The positional misalignment amount X can be either a positive or a negative value. The error scale Y indicates that there is no scaling error when Y=1, indicates that expansion of the image forming range has been detected when Y>1, and indicates that reduction in the image forming range has been detected when Y<1.

4-1. Compensation for Positional Misalignment

When positional misalignment in the axial direction is detected, in the above-described multiple exposure light emission control sequence, the light emission control unit 705 causes the pixel value set of the input image data corresponding to at least one row of the plurality of light-emitting elements 602 in the exposure head 106 to shift so as to compensate for the positional misalignment. Herein, the light emission control unit 705 may shift the pixel value set of the input image data based on the positional misalignment amount X and/or the error scale Y input from the CPU 701. The CPU 701 may transmit, to the light emission control unit 705, correction data for correction of positional misalignment based on the positional misalignment amount X and/or the error scale Y, and the light emission control unit 705 may shift the pixel value set of the input image data based on the correction data. For example, assuming that the width $W_0$ in FIG. 3B indicates a normal effective image forming position in the axial direction D1, if the positional misalignment in the image is a misalignment to the left, the positional misalignment can be canceled out by shifting the image forming position to the right. Similarly, if the positional misalignment in the image is a misalignment to the right, the positional misalignment can be canceled out by shifting the image forming position to the left. The direction of the shift in the image forming position (or of the pixel value set) for canceling out positional misalignment in this manner will be called a "cancellation direction" in the following descriptions. Examples of light emission control for compensating for positional misalignment in the axial direction will be described hereinafter for several scenarios in which the positional misalignment amount X is different.

(1) First Scenario

In a first scenario, the positional misalignment amount X is equal to the pitch $P_A$ in the axial direction ($X=P_A$). The pitch $P_A$ is the smallest unit of positional misalignment which can be compensated for. It is assumed here that the cancellation direction is the right direction. FIGS. 13A to 13D are explanatory diagrams illustrating a light emission control sequence that includes positional misalignment compensation in the first scenario.

Figure 13A:
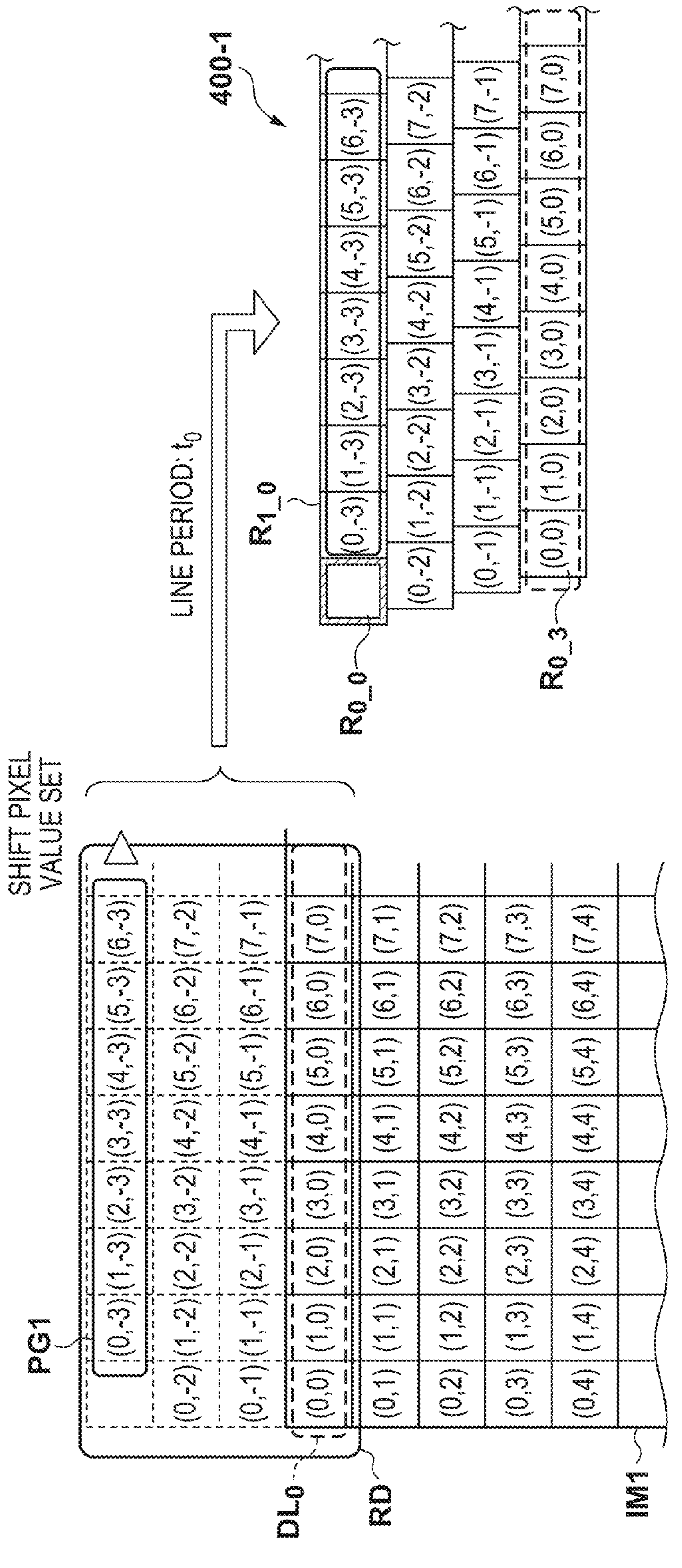
FIG. 13A is an explanatory diagram illustrating a light emission control sequence that includes positional misalignment compensation in a first scenario.

The input image data IM1, in which three lines of dummy pixel values have been added to the beginning, is again illustrated on the left in FIG. 13A. Because the positional misalignment amount $X=P_A$, the light emission control unit 705 selects a pixel value set PG1 in the first row of the readout range RD (a row having an index i=−3) as the pixel value set to be shifted. The light emission control unit 705 then shifts the selected pixel value set PG1 by one pixel in the cancellation direction, reads out a subset of every 2,992 pixel values from the input image data IM1, and outputs each subset to a corresponding light-emitting chip 400-*n*. In the light-emitting chip 400-1 illustrated on the right in FIG. 13A, the pixel value set PG1 corresponds to the light-emitting elements in the first row of the light-emitting element array. However, as a result of the shift, the drive signal based on the pixel value (0,−3) at the left end of the pixel value set PG1 is supplied to the light-emitting element $R_{1\_0}$, rather than to the light-emitting element $R_{0\_0}$. The light-emitting element $R_{0\_0}$ corresponding to the position which is blank due to the shift may be supplied with a drive signal indicating that light emission is turned off, and thus the light-emitting element $R_{0\_0}$ does not emit light. As indicated by the broken lines in FIG. 13A, drive signals based on the effective pixel values of the line $DL_0$ in the input image data IM1 are supplied to the light-emitting elements in the fourth row, including the light-emitting element $R_{0\_3}$, in the same manner as the example illustrated in FIG. 12A.

Figure 13B:
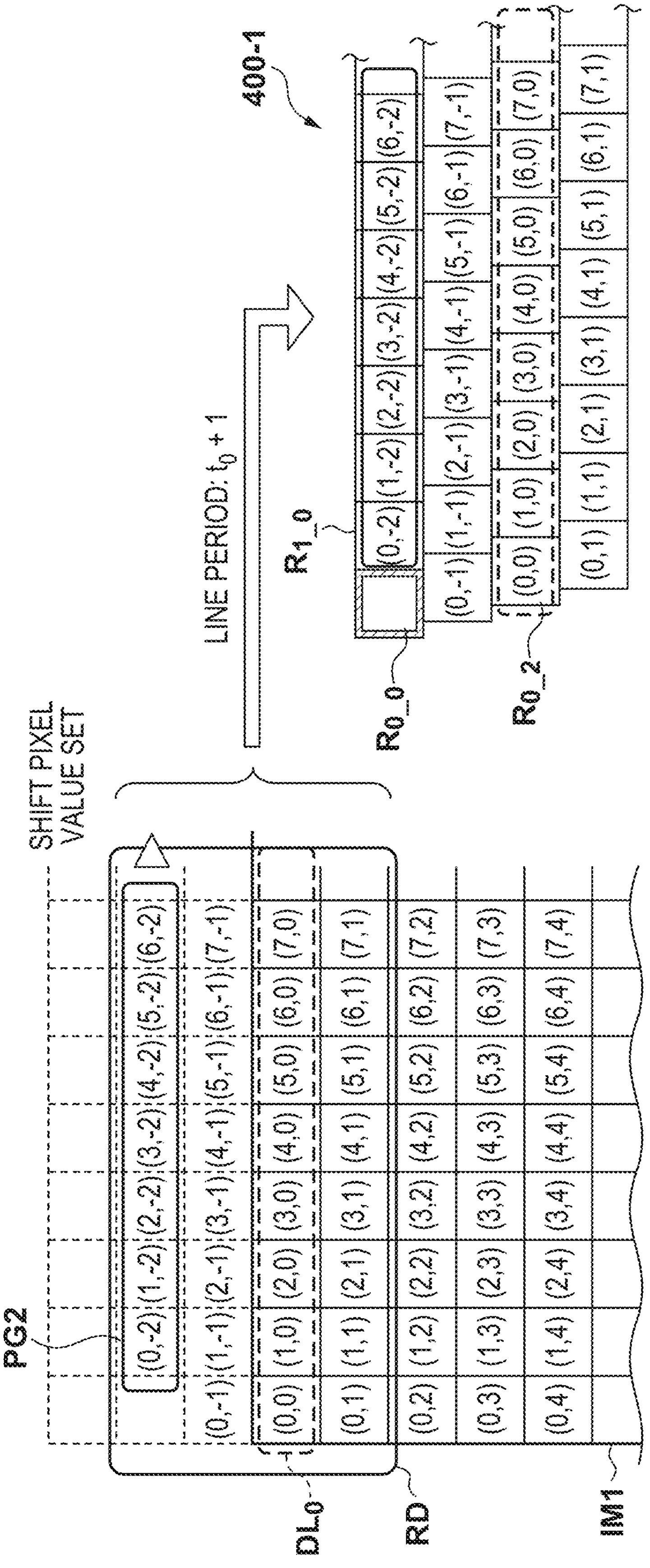
FIG. 13B is an explanatory diagram illustrating a light emission control sequence that includes positional misalignment compensation in a first scenario.

Moving to FIG. 13B, in the next line period $t_0+1$, the readout range RD for the pixel values from the input image data IM1 moves down one line. The light emission control unit 705 selects a pixel value set PG2 in the first row of the readout range RD (a row having an index i=−2) as the pixel value set to be shifted. The light emission control unit 705 then outputs a subset of every 2,992 pixel values to each light-emitting chip 400-*n* after shifting the selected pixel value set PG2 by one pixel in the cancellation direction. In the light-emitting chip 400-1 illustrated on the right in FIG. 13B, the pixel value set PG2 corresponds to the light-emitting elements in the first row of the light-emitting element array. However, as a result of the shift, the drive signal based on the pixel value (0,−2) at the left end of the pixel value set PG2 is supplied to the light-emitting element $R_{1\_0}$, rather than to the light-emitting element $R_{0\_0}$. A drive signal indicating that light emission is turned off can also be supplied to the light-emitting element $R_{0\_0}$ corresponding to the position which is blank due to the shift. As indicated by the broken lines in FIG. 13B, drive signals based on the effective pixel values of the line $DL_0$ in the input image data IM1 are supplied to the light-emitting elements in the third row, including the light-emitting element $R_{0\_2}$, in the same manner as the example illustrated in FIG. 12B.

Figure 13C:
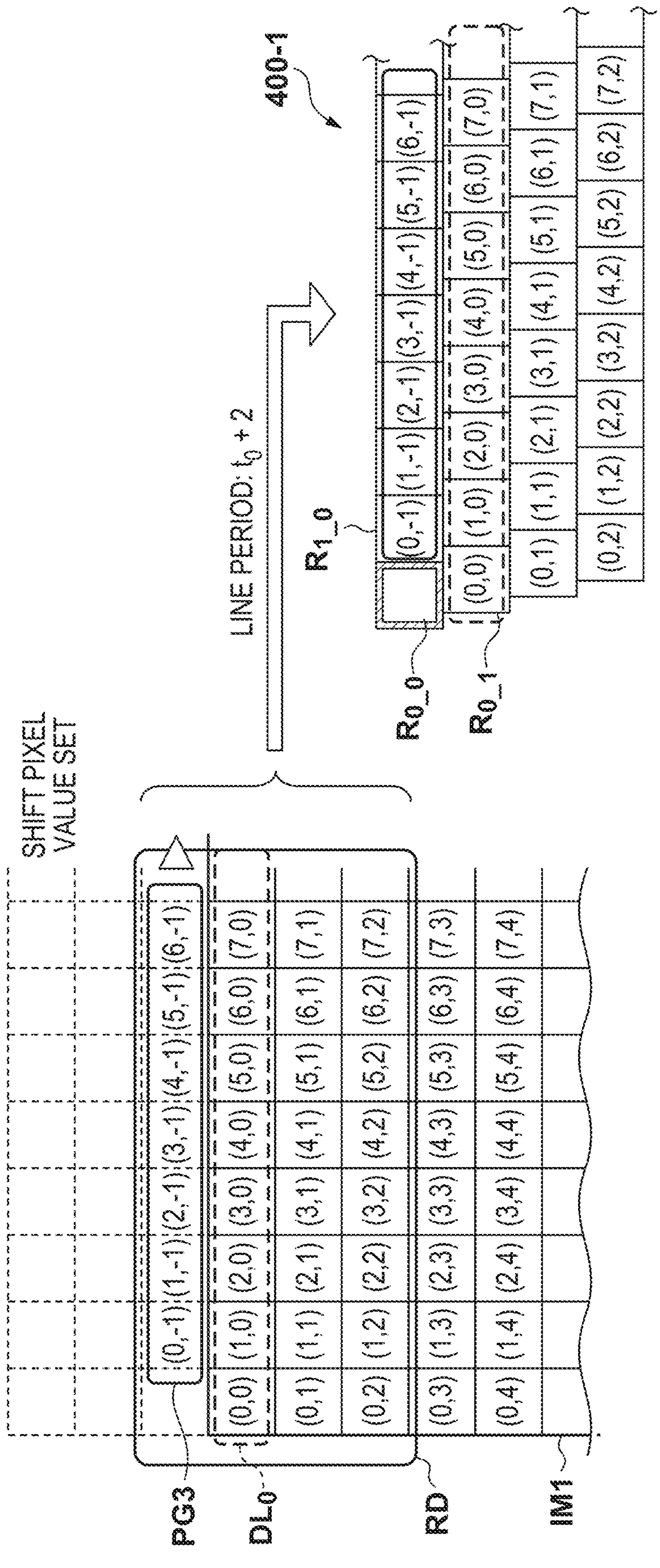
FIG. 13C is an explanatory diagram illustrating a light emission control sequence that includes positional misalignment compensation in a first scenario.

Moving to FIG. 13C, in the next line period $t_0+2$, the readout range RD for the pixel values from the input image data IM1 moves down one more line. The light emission control unit 705 selects a pixel value set PG3 in the first row of the readout range RD (a row having an index i=−1) as the pixel value set to be shifted. The light emission control unit 705 then outputs a subset of every 2,992 pixel values to each light-emitting chip 400-*n* after shifting the selected pixel value set PG3 by one pixel in the cancellation direction. In the light-emitting chip 400-1 illustrated on the right in FIG. 13C, the pixel value set PG3 corresponds to the light-emitting elements in the first row of the light-emitting element array. However, as a result of the shift, the drive signal based on the pixel value (0,−1) at the left end of the pixel value set PG3 is supplied to the light-emitting element $R_{1\_0}$, rather than to the light-emitting element $R_{0\_0}$. A drive signal indicating that light emission is turned off can also be supplied to the light-emitting element $R_{0\_0}$ corresponding to the position which is blank due to the shift. As indicated by the broken lines in FIG. 13C, drive signals based on the effective pixel values of the line $DL_0$ in the input image data IM1 are supplied to the light-emitting elements in the second row, including the light-emitting element $R_{0\_1}$, in the same manner as the example illustrated in FIG. 12C.

Figure 13D:
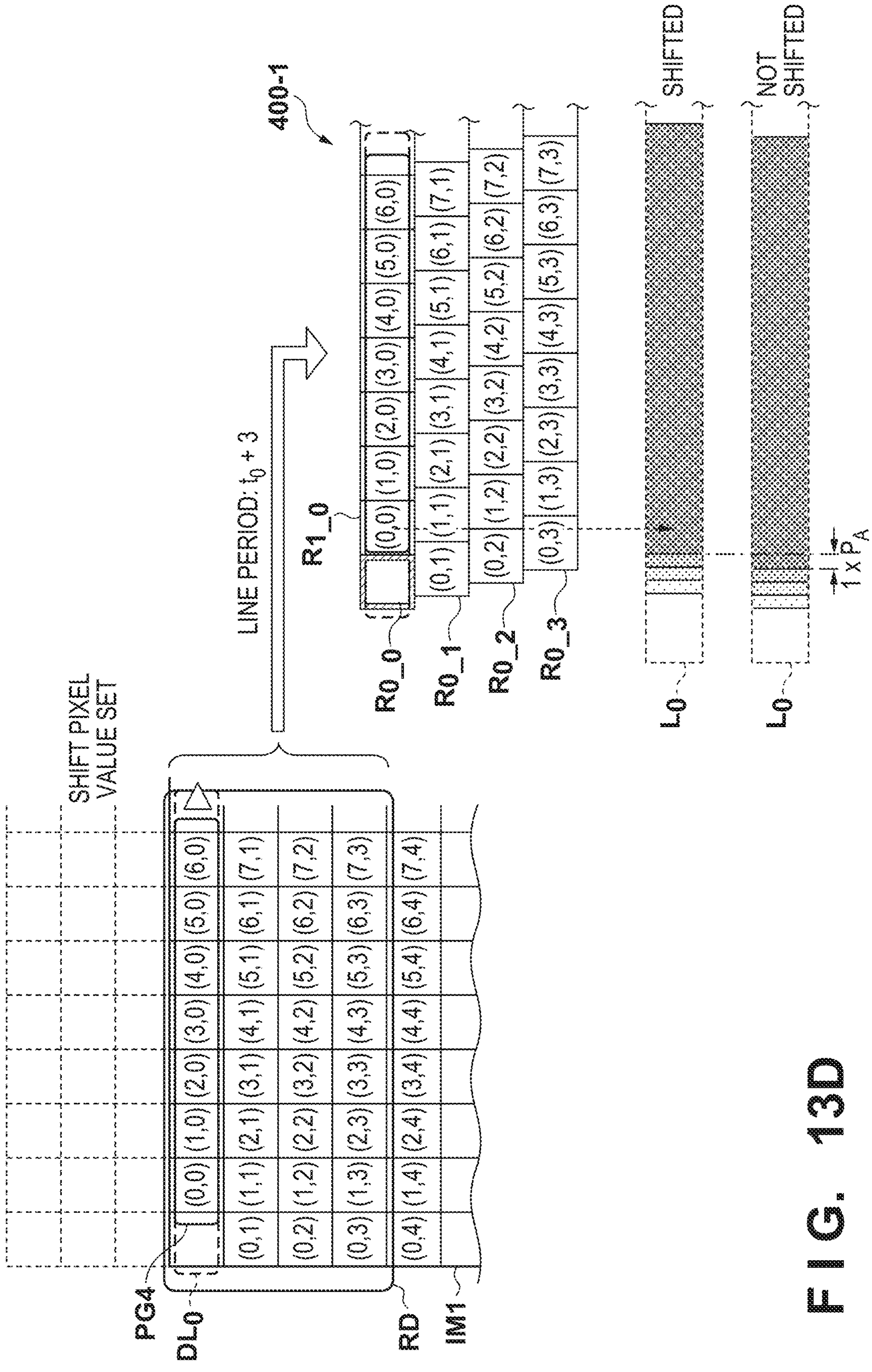
FIG. 13D is an explanatory diagram illustrating a light emission control sequence that includes positional misalignment compensation in a first scenario.

Moving to FIG. 13D, in the next line period $t_0+3$, the readout range RD for the pixel values from the input image data IM1 moves down one more line. The light emission control unit 705 selects a pixel value set PG4 in the first row of the readout range RD as the pixel value set to be shifted. The pixel value set PG4 includes the effective pixel values of the line $DL_0$ in the input image data IM1. The light emission control unit 705 then outputs a subset of every 2,992 pixel values to each light-emitting chip 400-*n* after shifting the selected pixel value set PG4 by one pixel in the cancellation direction. In the light-emitting chip 400-1 illustrated on the right in FIG. 13D, the pixel value set PG4 corresponds to the light-emitting elements in the first row of the light-emitting element array. However, as a result of the shift, the drive signal based on the pixel value (0,0) at the left end of the pixel value set PG4 is supplied to the light-emitting element $R_{1\_0}$, rather than to the light-emitting element $R_{0\_0}$. A drive signal indicating that light emission is turned off can also be supplied to the light-emitting element $R_{0\_0}$ corresponding to the position which is blank due to the shift.

As a result of the light emission control in the line periods $t_0$ to $t_0+3$, the effective image forming position of the line $L_0$ on the surface of the photosensitive member 102 moves to the right by an amount equal to the pitch $P_A$ in the axial direction, as compared to normal times when the pixel value set is not shifted. For example, the spot corresponding to the pixel value (0,0) at the left end of the line $DL_0$ in the input image data IM1 is formed by emitting light from the light-emitting elements $R_{0\_3}$, $R_{0\_2}$, $R_{0\_1}$, and $R_{1\_0}$. However, because the arrangement of the components, such as the exposure head 106, is shifted to the left by an amount equivalent to the pitch $P_A$, the final image forming position on the photosensitive member 102, the transfer belt 111, or the sheet is substantially equal to that during normal times, due to the positional misalignment being canceled out.

In this scenario, in which positional misalignment compensation equivalent to one unit of pitch is performed, a drive signal based on the pixel value (0,0) is input to the four light-emitting elements $R_{0\_3}$, $R_{0\_2}$, $R_{0\_1}$, and $R_{1\_0}$. When these four light-emitting elements emit light in accordance with the drive signal, a spot corresponding to the pixel value (0,0) is formed on the surface of the photosensitive member 102 at a position shifted by one unit of pitch. Similarly, a drive signal based on the pixel value (1,0) is input to the four light-emitting elements $R_{1\_3}$, $R_{1\_2}$, $R_{1\_1}$, and $R_{2\_0}$. When these four light-emitting elements emit light in accordance with the drive signal, a spot corresponding to the pixel value (1,0) is formed on the surface of the photosensitive member 102 at a position shifted by one unit of pitch. When this is compared with the case where there is no positional misalignment compensation described with reference to FIGS. 12A to 12D, the combination of light-emitting elements used to form a spot corresponding to the same pixel position changes when positional misalignment compensation is performed. For example, the combination of light-emitting elements for forming a spot corresponding to the pixel value (0,0) is ($R_{0\_3}$, $R_{0\_2}$, $R_{0\_1}$, $R_{0\_0}$) when there is no positional misalignment compensation, but is ($R_{0\_3}$, $R_{0\_2}$, $R_{0\_1}$, $R_{1\_0}$) in this scenario. The same applies to the other pixel positions as well.

As can be understood from the first scenario, the light emission control unit 705 selects, as the pixel value set to be shifted, at least the pixel value set corresponding to the rows having the light-emitting elements at the rear end in the cancellation direction. If the cancellation direction is the right direction, the first row having the light-emitting element $R_{0\_0}$ corresponds to the rear end. If the cancellation direction is the left direction, the fourth row having the light-emitting element $R_{0\_3}$ corresponds to the rear end. The light emission control unit 705 drives the plurality of light-emitting elements 602 by shifting the selected pixel value set while moving the selection position for the pixel value set in the circumferential direction along with movement of the readout range for each line period. Accordingly, an effective image forming position in the axial direction can be maintained while being displaced in the cancellation direction throughout a plurality of line periods.

(2) Second Scenario

In a second scenario, the positional misalignment amount X is twice the pitch $P_A$ in the axial direction ($X=2\times P_A$). It is assumed here, too, that the cancellation direction is the right direction. FIGS. 14A to 14D are explanatory diagrams illustrating a light emission control sequence that includes positional misalignment compensation in the second scenario.

Figure 14A:
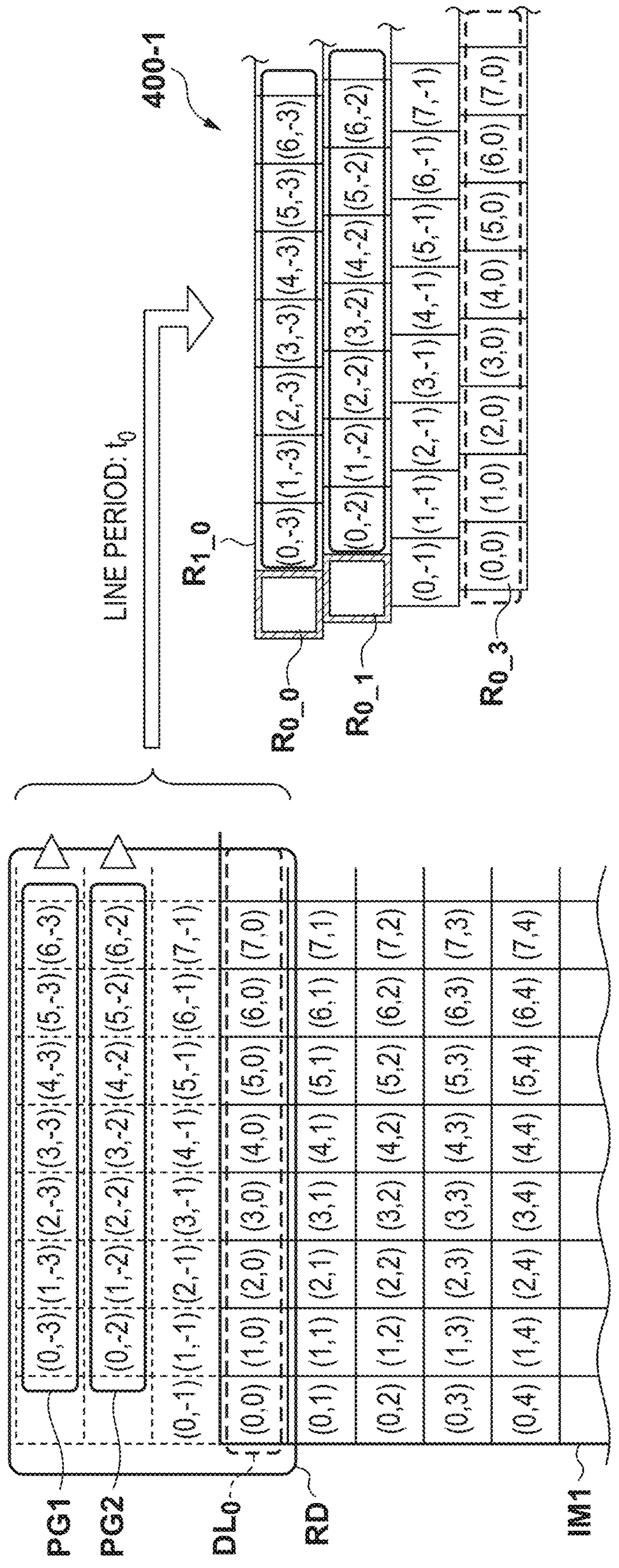
FIG. 14A is an explanatory diagram illustrating a light emission control sequence that includes positional misalignment compensation in a second scenario.

The input image data IM1, in which three lines of dummy pixel values have been added to the beginning, is again illustrated on the left in FIG. 14A. Because the positional misalignment amount $X=2\times P_A$, the light emission control unit 705 selects the pixel value set PG1 in the first row and the pixel value set PG2 in the second row in the readout range RD as the pixel value sets to be shifted. The light emission control unit 705 then shifts the selected pixel value sets PG1 and PG2 by one pixel in the cancellation direction, reads out a subset of every 2,992 pixel values from the input image data IM1, and outputs each subset to a corresponding light-emitting chip 400-*n*. In the light-emitting chip 400-1 illustrated on the right in FIG. 14A, the pixel value sets PG1 and PG2 correspond to the light-emitting elements in the first and second rows of the light-emitting element array. However, as a result of the shift, the drive signals based on the pixel values at the left end of each pixel value set are supplied to the light-emitting elements in the second column from the left. A drive signal indicating that light emission is turned off can also be supplied to the light-emitting elements $R_{0\_0}$ and $R_{0\_1}$ corresponding to the positions which are blank due to the shift. Drive signals based on the effective pixel values of the line $DL_0$ in the input image data IM1 are supplied to the light-emitting elements in the fourth row, including the light-emitting element $R_{0\_3}$, in the same manner as the example illustrated in FIG. 12A.

Figure 14B:
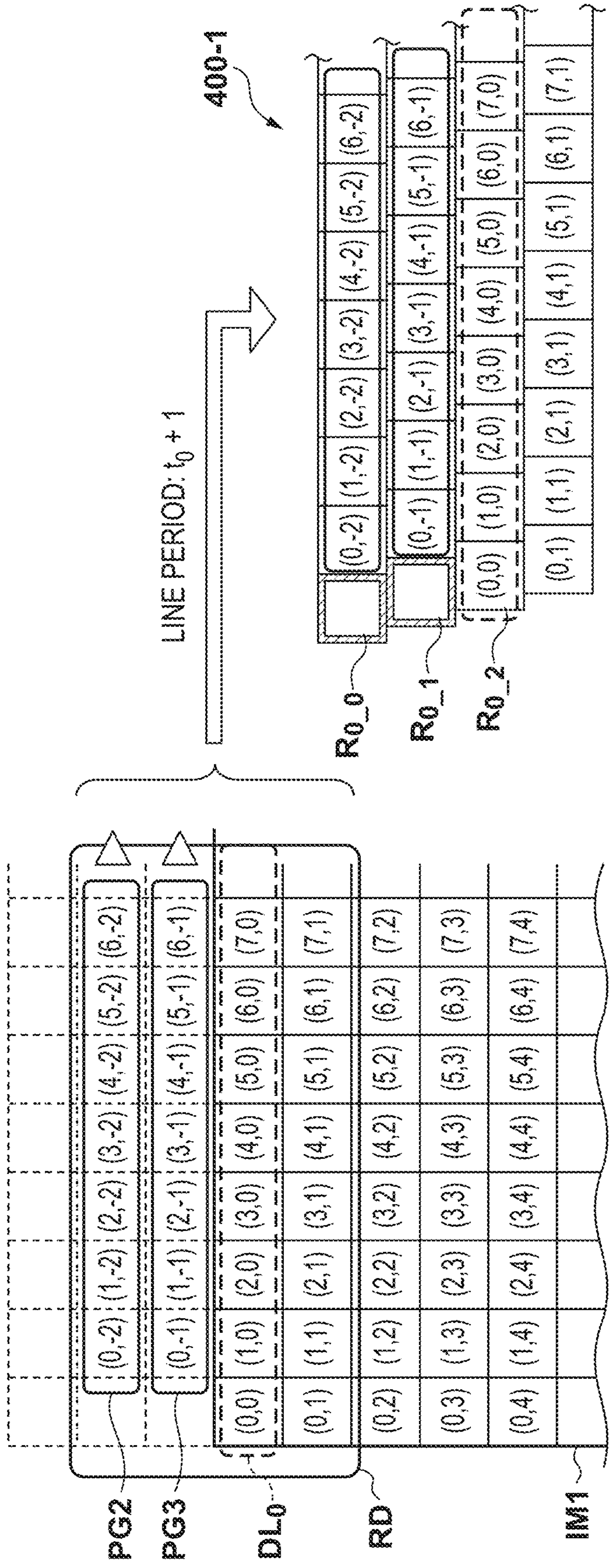
FIG. 14B is an explanatory diagram illustrating a light emission control sequence that includes positional misalignment compensation in a second scenario.

Moving to FIG. 14B, in the next line period $t_0+1$, the readout range RD for the pixel values from the input image data IM1 moves down one line. The light emission control unit 705 selects the pixel value set PG2 in the first row and the pixel value set PG3 in the second row of the readout range RD as the pixel value sets to be shifted. The light emission control unit 705 then outputs a subset of every 2,992 pixel values to each light-emitting chip 400-*n* after shifting the selected pixel value sets PG2 and PG3 by one pixel in the cancellation direction. In the light-emitting chip 400-1 illustrated on the right in FIG. 14B, the pixel value sets PG2 and PG3 correspond to the light-emitting elements in the first and second rows of the light-emitting element array. However, as a result of the shift, the drive signals based on the pixel values at the left end of each pixel value set are supplied to the light-emitting elements in the second column from the left. A drive signal indicating that light emission is turned off can also be supplied to the light-emitting elements $R_{0\_0}$ and $R_{0\_1}$ corresponding to the positions which are blank due to the shift. Drive signals based on the effective pixel values of the line $DL_0$ in the input image data IM1 are supplied to the light-emitting elements in the third row, including the light-emitting element $R_{0\_2}$, in the same manner as the example illustrated in FIG. 12B.

Figure 14C:
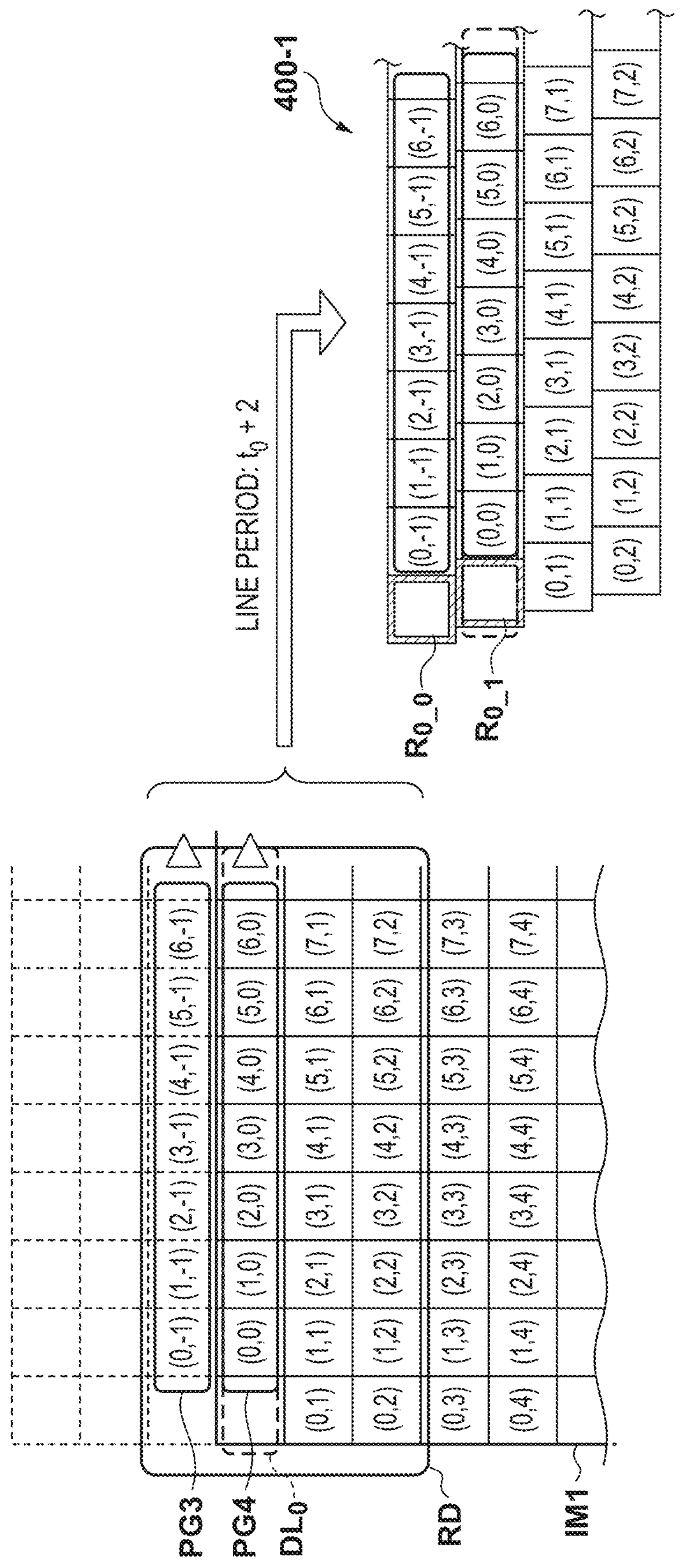
FIG. 14C is an explanatory diagram illustrating a light emission control sequence that includes positional misalignment compensation in a second scenario.

Moving to FIG. 14C, in the next line period $t_0+2$, the readout range RD for the pixel values from the input image data IM1 moves down one more line. The light emission control unit 705 selects the pixel value set PG3 in the first row and the pixel value set PG4 in the second row of the readout range RD as the pixel value sets to be shifted. The pixel value set PG4 includes the effective pixel values of the line $DL_0$ in the input image data IM1. The light emission control unit 705 then outputs a subset of every 2,992 pixel values to each light-emitting chip 400-*n* after shifting the selected pixel value sets PG3 and PG4 by one pixel in the cancellation direction. In the light-emitting chip 400-1 illustrated on the right in FIG. 14C, the pixel value sets PG3 and PG4 correspond to the light-emitting elements in the first and second rows, respectively, of the light-emitting element array. However, as a result of the shift, the drive signals based on the pixel values at the left end of each pixel value set are supplied to the light-emitting elements in the second column from the left. A drive signal indicating that light emission is turned off can also be supplied to the light-emitting elements $R_{0\_0}$ and $R_{0\_1}$ corresponding to the positions which are blank due to the shift.

Figure 14D:
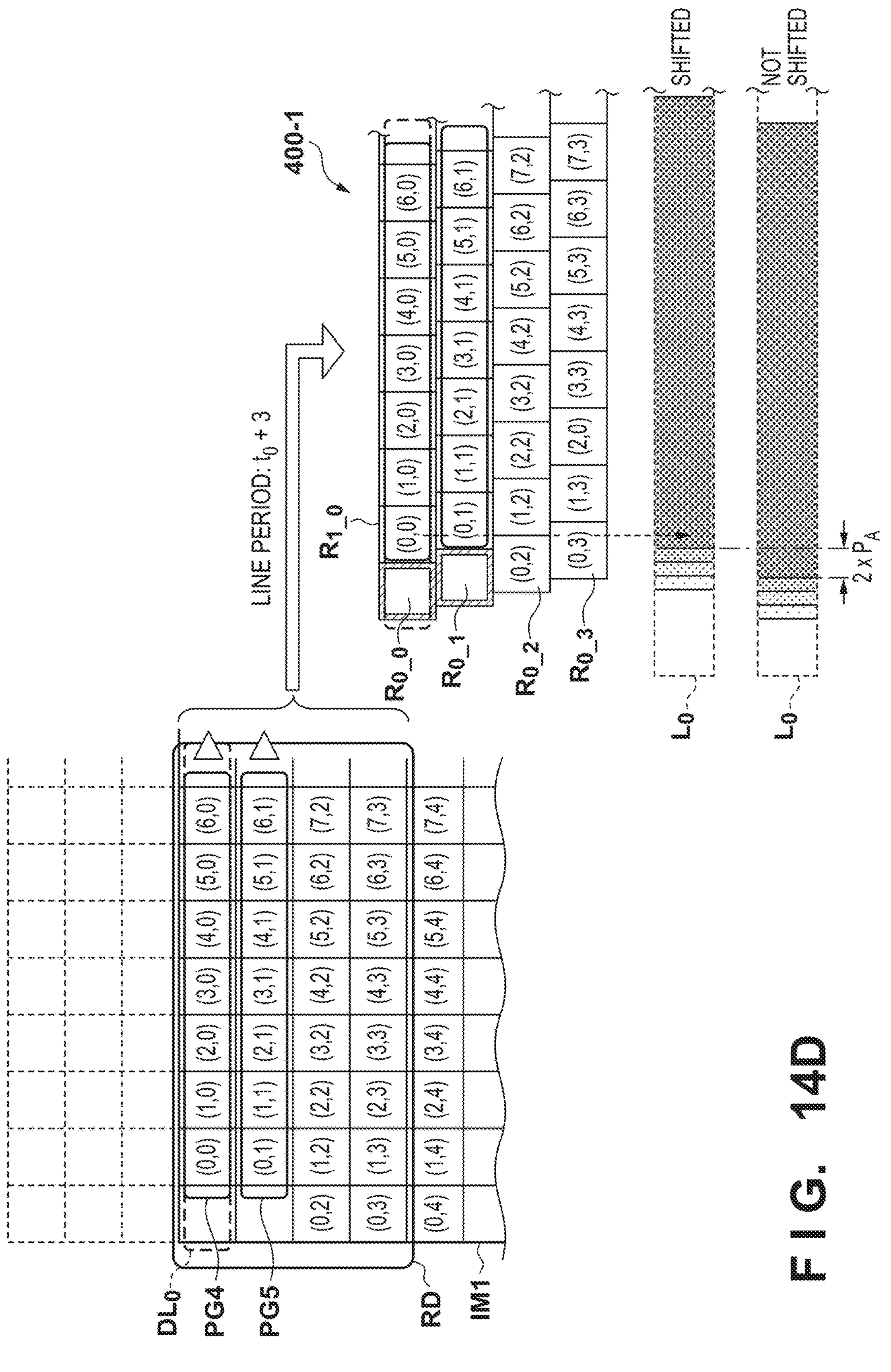
FIG. 14D is an explanatory diagram illustrating a light emission control sequence that includes positional misalignment compensation in a second scenario.

Moving to FIG. 14D, in the next line period $t_0+3$, the readout range RD for the pixel values from the input image data IM1 moves down one more line. The light emission control unit 705 selects the pixel value set PG4 in the first row and a pixel value set PG5 in the second row of the readout range RD as the pixel value sets to be shifted. The pixel value sets PG4 and PG5 include effective pixel values of the input image data IM1. The light emission control unit 705 then outputs a subset of every 2,992 pixel values to each light-emitting chip 400-*n* after shifting the selected pixel value sets PG4 and PG5 by one pixel in the cancellation direction. In the light-emitting chip 400-1 illustrated on the right in FIG. 14D, the pixel value sets PG4 and PG5 correspond to the light-emitting elements in the first and second rows, respectively, of the light-emitting element array. However, as a result of the shift, the drive signals based on the pixel values at the left end of each pixel value set are supplied to the light-emitting elements in the second column from the left. A drive signal indicating that light emission is turned off can also be supplied to the light-emitting elements $R_{0\_0}$ and $R_{0\_1}$ corresponding to the positions which are blank due to the shift.

As a result of the light emission control in the line periods $t_0$ to $t_0+3$, the effective image forming position of the line $L_0$ on the surface of the photosensitive member 102 moves to the right by an amount equal to double the pitch $P_A$ in the axial direction, as compared to normal times when the pixel value set is not shifted. For example, the spot corresponding to the pixel value (0,0) at the left end of the line $DL_0$ in the input image data IM1 is formed by emitting light from the light-emitting elements $R_{0\_3}$, $R_{0\_2}$, $R_{1\_1}$, and $R_{1\_0}$. However, because the arrangement of the components, such as the exposure head 106, is shifted to the left by $2\times P_A$, the final image forming position on the photosensitive member 102, the transfer belt 111, or the sheet is substantially equal to that during normal times, due to the positional misalignment being canceled out.

In this scenario, in which positional misalignment compensation equivalent to two units of pitch is performed, a drive signal based on the pixel value (0,0) is input to the four light-emitting elements $R_{0\_3}$, $R_{0\_2}$, $R_{1\_1}$, and $R_{1\_0}$. Similarly, a drive signal based on the pixel value (1,0) is input to the four light-emitting elements $R_{1\_3}$, $R_{1\_2}$, $R_{2\_1}$, and $R_{2\_0}$. When this is compared with the case where there is no positional misalignment compensation described with reference to FIGS. 12A to 12D, the combination of light-emitting elements used to form a spot corresponding to the same pixel position changes according to the amount of the positional misalignment to be compensated for when the positional misalignment compensation is performed. For example, the combination of light-emitting elements for forming a spot corresponding to the pixel value (0,0) is ($R_{0\_3}$, $R_{0\_2}$, $R_{0\_1}$, $R_{0\_0}$) when there is no positional misalignment compensation, but is ($R_{0\_3}$, $R_{0\_2}$, $R_{1\_1}$, $R_{1\_0}$) in this scenario. The same applies to the other pixel positions as well.

As can be understood from the first and second scenarios, the light emission control unit 705 selects the pixel value set to be shifted, corresponding to a row among the M rows of light-emitting elements 602, based on the magnitude of the positional misalignment (an absolute value of X) and the pitch $P_A$ in the axial direction of the light-emitting elements 602. For example, if the cancellation direction is the right direction, the rows selected may be as follows:

$|X|=P_A$→first row $|X|=2\times P_A$→first row, second row $|X|=3\times P_A$→first row, second row, third row $|X|=4\times P_A$→first row, second row, third row, fourth row If the cancellation direction is the left direction, the rows selected may be as follows:

$|X|=P_A$→fourth row $|X|=2\times P_A$→fourth row, third row $|X|=3\times P_A$→fourth row, third row, second row $|X|=4\times P_A$→fourth row, third row, second row, first row (3) Third Scenario In a third scenario, the positional misalignment amount X is five times the pitch $P_A$ in the axial direction ($X=5\times P_A$). It is assumed here, too, that the cancellation direction is the right direction. FIGS. 15A to 15D are explanatory diagrams illustrating a light emission control sequence that includes positional misalignment compensation in the third scenario.

Figure 15A:
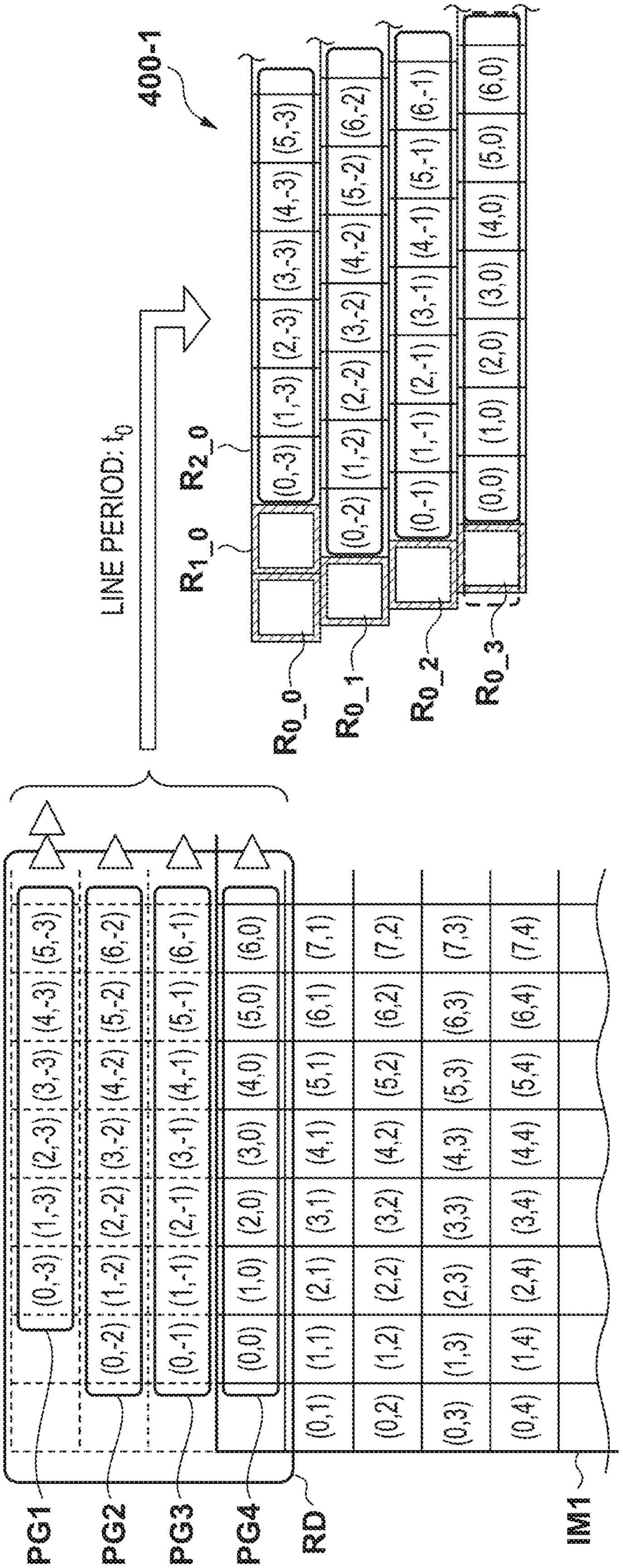
FIG. 15A is an explanatory diagram illustrating a light emission control sequence that includes positional misalignment compensation in a third scenario.

The input image data IM1, in which three lines of dummy pixel values have been added to the beginning, is again illustrated on the left in FIG. 15A. Because the positional misalignment amount $X=5\times P_A$, the light emission control unit 705 selects the pixel value sets PG1, PG2, PG3, and PG4 in the first, second, third, and fourth rows in the readout range RD as the pixel value sets to be shifted. The light emission control unit 705 then shifts the pixel value set PG1 to the right by two pixels, and shifts the pixel value sets PG2 to PG4 to the right by one pixel. In the light-emitting chip 400-1 illustrated on the right in FIG. 15A, the pixel value sets PG1 to PG4 correspond to the light-emitting elements in the first to fourth rows, respectively, of the light-emitting element array. However, as a result of the shift, the drive signal based on the pixel value (0,−3) at the left end of the pixel value set PG1 is supplied to the light-emitting element $R_{2\_0}$ in the third column from the left. The drive signals based on the pixel values at the left ends of the pixel value sets PG2 to PG4 are supplied to the light-emitting elements in the second column from the left, respectively. A drive signal indicating that light emission is turned off can also be supplied to the light-emitting elements $R_{0\_0}$, $R_{0\_1}$, $R_{0\_2}$, $R_{0\_3}$, and $R_{1\_0}$ corresponding to the positions which are blank due to the shift.

Figure 15B:
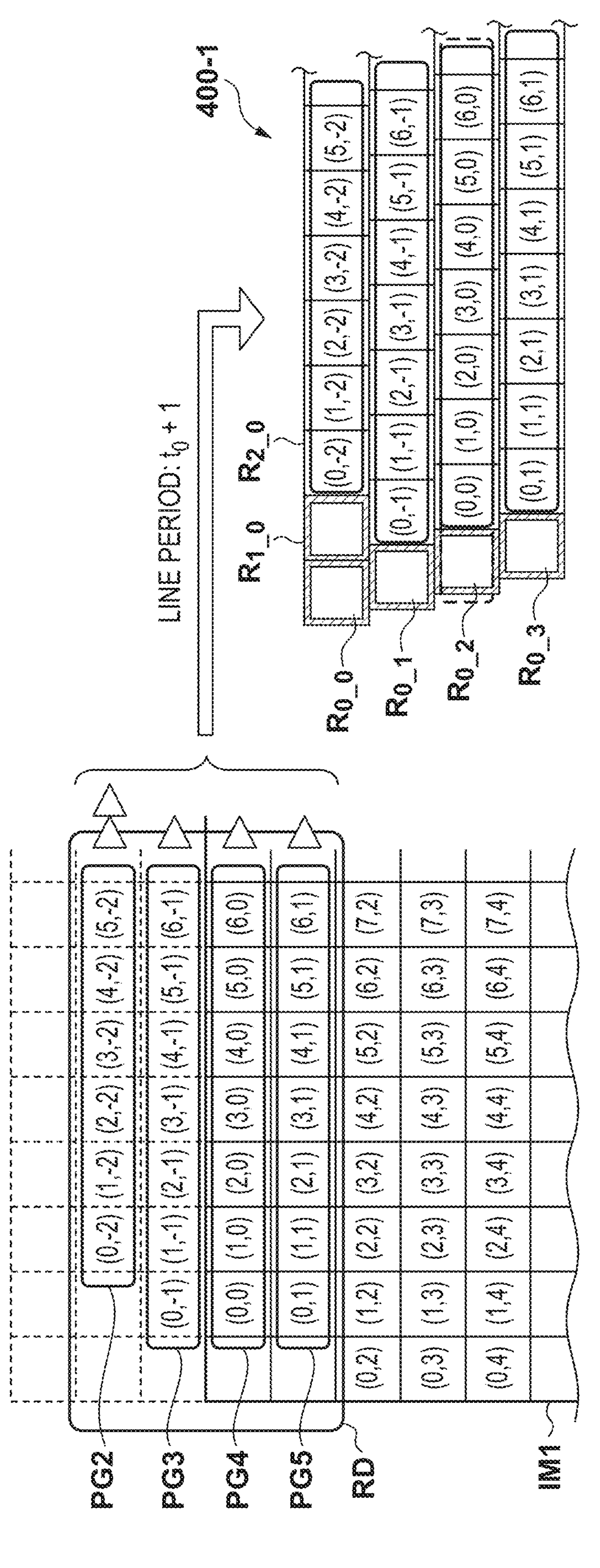
FIG. 15B is an explanatory diagram illustrating a light emission control sequence that includes positional misalignment compensation in a third scenario.

Moving to FIG. 15B, in the next line period $t_0+1$, the readout range RD for the pixel values from the input image data IM1 moves down one line. The light emission control unit 705 selects the pixel value sets PG2, PG3, PG4, and PG5 in the first, second, third, and fourth rows in the readout range RD as the pixel value sets to be shifted. The light emission control unit 705 then shifts the pixel value set PG2 to the right by two pixels, and shifts the pixel value sets PG3 to PG5 to the right by one pixel. In the light-emitting chip 400-1 illustrated on the right in FIG. 15B, the pixel value sets PG2 to PG5 correspond to the light-emitting elements in the first to fourth rows, respectively, of the light-emitting element array. However, as a result of the shift, the drive signal based on the pixel value (0,−2) at the left end of the pixel value set PG2 is supplied to the light-emitting element $R_{2\_0}$ in the third column from the left. The drive signals based on the pixel values at the left ends of the pixel value sets PG3 to PG5 are supplied to the light-emitting elements in the second column from the left, respectively. A drive signal indicating that light emission is turned off can also be supplied to the light-emitting elements $R_{0\_0}$, $R_{0\_1}$, $R_{0\_2}$, $R_{0\_3}$, and $R_{1\_0}$ corresponding to the positions which are blank due to the shift.

Figure 15C:
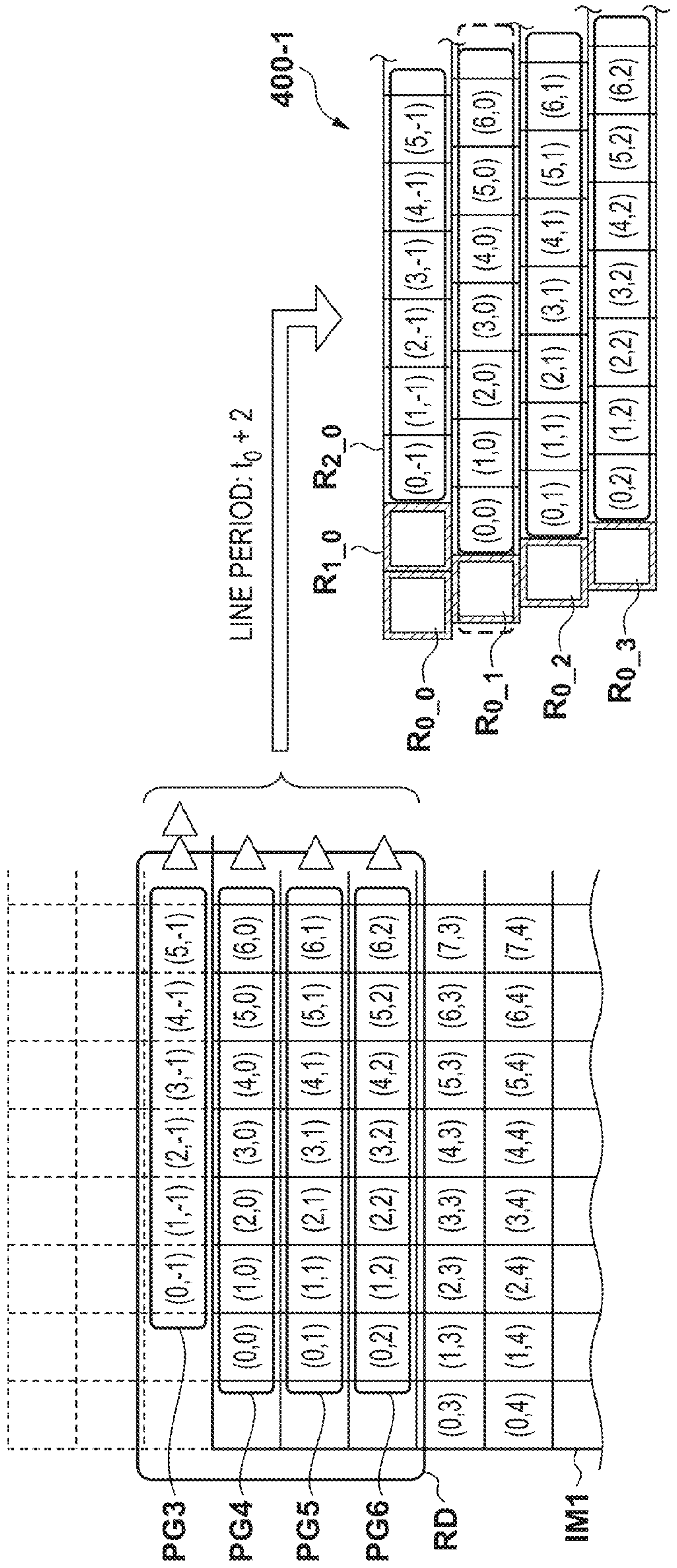
FIG. 15C is an explanatory diagram illustrating a light emission control sequence that includes positional misalignment compensation in a third scenario.

Moving to FIG. 15C, in the next line period $t_0+2$, the readout range RD for the pixel values from the input image data IM1 moves down one more line. The light emission control unit 705 selects the pixel value sets PG3, PG4, PG5, and PG6 of the first, second, third, and fourth rows in the readout range RD as the pixel value sets to be shifted. The light emission control unit 705 then shifts the pixel value set PG3 to the right by two pixels, and shifts the pixel value sets PG4 to PG6 to the right by one pixel. In the light-emitting chip 400-1 illustrated on the right in FIG. 15C, the pixel value sets PG3 to PG6 correspond to the light-emitting elements in the first to fourth rows, respectively, of the light-emitting element array. However, as a result of the shift, the drive signal based on the pixel value (0,−1) at the left end of the pixel value set PG3 is supplied to the light-emitting element $R_{2\_0}$ in the third column from the left. The drive signals based on the pixel values at the left ends of the pixel value sets PG4 to PG6 are supplied to the light-emitting elements in the second column from the left, respectively. A drive signal indicating that light emission is turned off can also be supplied to the light-emitting elements $R_{0\_0}$, $R_{0\_1}$, $R_{0\_2}$, $R_{0\_3}$, and $R_{1\_0}$ corresponding to the positions which are blank due to the shift.

Figure 15D:
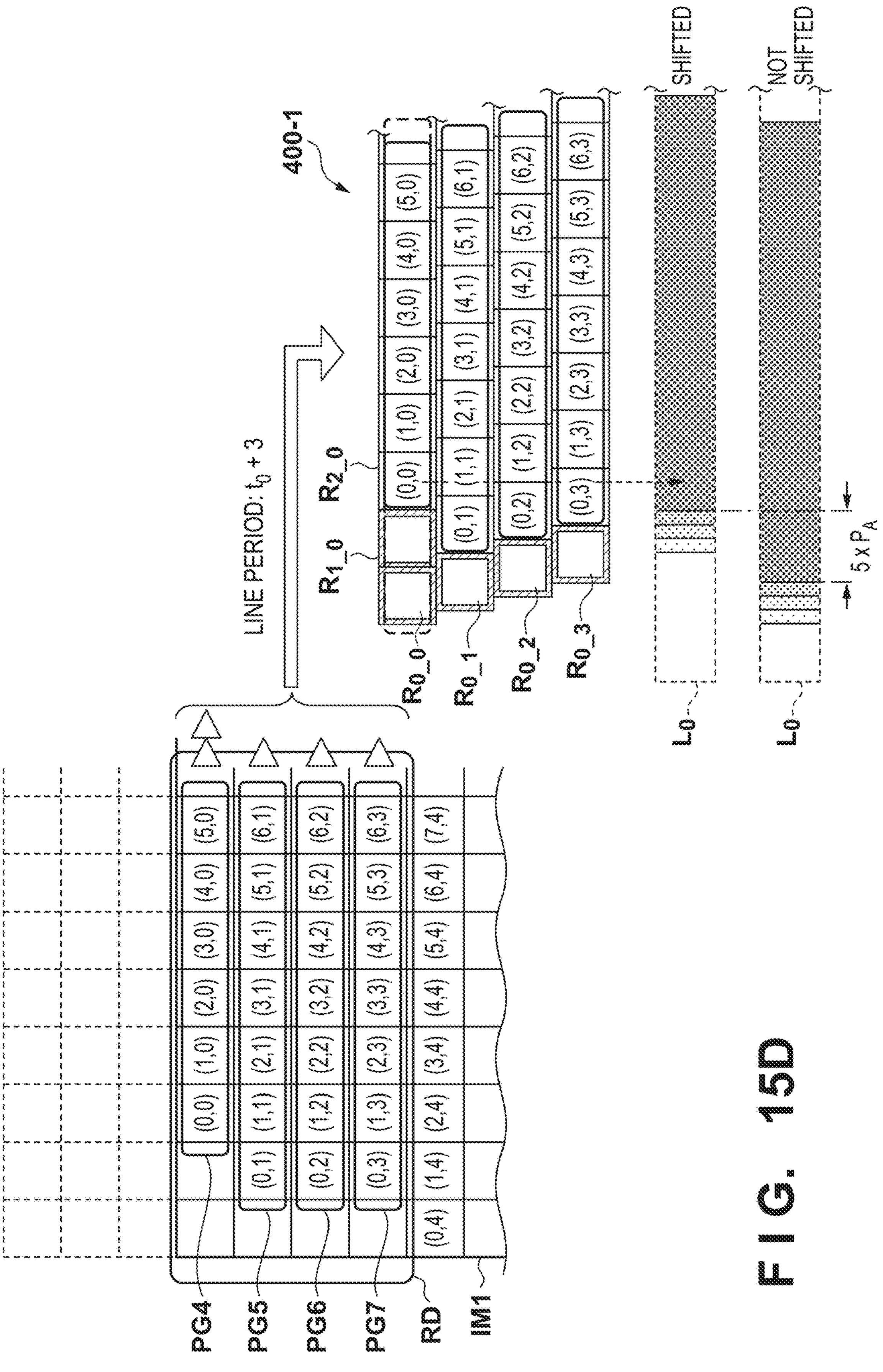
FIG. 15D is an explanatory diagram illustrating a light emission control sequence that includes positional misalignment compensation in a third scenario.

Moving to FIG. 15D, in the next line period $t_0+3$, the readout range RD for the pixel values from the input image data IM1 moves down one more line. The light emission control unit 705 selects pixel value sets PG4, PG5, PG6, and PG7 of the first, second, third, and fourth rows in the readout range RD as the pixel value sets to be shifted. The light emission control unit 705 then shifts the pixel value set PG4 to the right by two pixels, and shifts the pixel value sets PG5 to PG7 to the right by one pixel. In the light-emitting chip 400-1 illustrated on the right in FIG. 15D, the pixel value sets PG4 to PG7 correspond to the light-emitting elements in the first to fourth rows, respectively, of the light-emitting element array. However, as a result of the shift, the drive signal based on the pixel value (0,0) at the left end of the pixel value set PG4 is supplied to the light-emitting element $R_{2\_0}$ in the third column from the left. The drive signals based on the pixel values at the left ends of the pixel value sets PG5 to PG7 are supplied to the light-emitting elements in the second column from the left, respectively. A drive signal indicating that light emission is turned off can also be supplied to the light-emitting elements $R_{0\_0}$, $R_{0\_1}$, $R_{0\_2}$, $R_{0\_3}$, and $R_{1\_0}$ corresponding to the positions which are blank due to the shift.

As a result of the light emission control in the line periods $t_0$ to $t_0+3$, the effective image forming position of the line $L_0$ on the surface of the photosensitive member 102 moves to the right by an amount equal to five times the pitch $P_A$ in the axial direction, as compared to normal times when the pixel value set is not shifted. For example, the spot corresponding to the pixel value (0,0) at the left end of the line $DL_0$ in the input image data IM1 is formed by emitting light from the light-emitting elements $R_{1\_3}$, $R_{1\_2}$, $R_{1\_1}$, and $R_{2\_0}$. However, because the arrangement of the components, such as the exposure head 106, is shifted to the left by $5\times P_A$, the final image forming position on the photosensitive member 102, the transfer belt 111, or the sheet is substantially equal to that during normal times, due to the positional misalignment being canceled out.

As can be understood from the first to third scenarios, the light emission control unit 705 determines how many columns of the pixel value sets corresponding to each of the at least one selected row are to be shifted, based on the magnitude of the positional misalignment (an absolute value of X) and the pitch $P_A$ of the light-emitting elements 602 in the axial direction. For example, assume that the magnitude $|X|$ of the positional misalignment is x times the pitch $P_A$ in the axial direction (where x is a natural number). In this case, the light emission control unit 705 distributes, in a round-robin manner, a shift amount equivalent to x pixels in order, from the row having the light-emitting element that corresponds to the rear end to the row having the light-emitting element that corresponds to the front end, in the cancellation direction, to the respective rows. As one example, if M=4 and the cancellation direction is the right direction, the rear end in the cancellation direction is located in the first row and the front end is located in the fourth row. Accordingly, the light emission control unit 705 distributes the shift amount to the four rows, one pixel at a time, until the total shift amount reaches x, in the order of first row→second row→third row→fourth row→first row→second row→and so on. As another example, if M=4 and the cancellation direction is the left direction, the rear end in the cancellation direction is located in the fourth row and the front end is located in the first row. Accordingly, the light emission control unit 705 distributes the shift amount to the four rows, one pixel at a time, until the total shift amount reaches x, in the order of fourth row→third row→second row→first row→fourth row→third row→and so on. By shifting at least one of the pixel value sets in the input image data in the cancellation direction in accordance with the shift amount distributed in this manner, and causing the plurality of light-emitting elements 602 to emit light, positional misalignment in the of the image forming position in the axial direction can be compensated for flexibly at the level of the pitch $P_A$.

4-2. Compensation for Scaling Error

If scaling error in the axial direction has been detected, the light emission control unit 705 selects at least one pixel position among the pixel positions constituting the input image data in accordance with the error scale Y in the above-described multiple exposure light emission control sequence. The light emission control unit 705 then causes the plurality of light-emitting elements 602 to emit light by inserting or thinning out the pixel values at each of the pixel positions in the pixel value sets in the rows belonging to each of the selected pixel positions. Whether to insert or thin out the pixel values at each pixel position depends on the error scale Y, where when $Y<1$ (i.e., when the image forming range is reduced), pixel values are inserted, and when $Y>1$ (i.e., when the image forming range is expanded), the pixel values are thinned out. The light emission control unit 705 can determine the number of pixel positions to be selected for inserting or thinning out the pixel values based on the error scale Y and the pitch $P_A$ of the light-emitting elements 602 in the axial direction. Compensating for reduction of the image forming range and compensating for expansion of the image forming range will be described in detail hereinafter separately.

4-2-1. Compensating for Reduction of Image Forming Range

When scaling error has been detected, and the error scale Y is less than 1, the light emission control unit 705 inserts a pixel value, into a pixel value set of a row to which each selected pixel positions belong, at the pixel position. Here, inserting a pixel value at a given pixel position includes shifting pixel values on one side in the axial direction, relative to that pixel position, in a direction that expands the pixel value set, as well as adding a copy of a pre-shift pixel value of that pixel position to that pixel position.

FIGS. 16A to 16D are explanatory diagrams illustrating a light emission control sequence that includes compensating for a reduction in the image forming range. Here, the number of pixel positions to be selected is assumed to be 1 (for example, $W_0\times(1-Y)\approx P_A$). Input image data IM2, in which three lines of dummy pixel values have been added to the beginning, is illustrated on the left in FIG. 16A. Because the error scale Y is less than 1, the light emission control unit 705 selects a pixel position at which a pixel value is to be inserted within the readout range RD in each line period. In the example in FIG. 16A, a pixel position $DP_0$ is selected in the line period $t_0$. The selected pixel position $DP_0$ belongs to the first row of the readout range RD (the row having an index i=−3). The light emission control unit 705 inserts the pixel value into the pixel value set PG1 in this row. Specifically, the light emission control unit 705 shifts the pixel values of a partial set PG1*b* on the right side in the axial direction, relative to the pixel position $DP_0$, one pixel to the right, and copies the pixel value (3,−3) at the pixel position $DP_0$ from before the shift to the pixel position $DP_0$. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 16A, the pixel value set PG1 corresponds to the light-emitting elements in the first row of the light-emitting element array. As a result of the insertion of the pixel values, a drive signal based on the pixel value (3,−3) of the selected pixel position $DP_0$ is supplied to the light-emitting element $R_{3\_0}$ and the light-emitting element $R_{4\_0}$, and the range of the effective light-emitting elements in the first row is expanded by an amount equivalent to a single light-emitting element.

Moving to FIG. 16B, in the next line period $t_0+1$, the pixel position $DP_0$ in the readout range RD is selected again. The selected pixel position $DP_0$ belongs to the first row of the readout range RD (the row having an index i=−2). The light emission control unit 705 inserts the pixel value into the pixel value set PG2 in this row. Specifically, the light emission control unit 705 shifts the pixel values of a partial set PG2*b* on the right side in the axial direction, relative to the pixel position $DP_0$, one pixel to the right, and copies the pixel value (3,−2) at the pixel position $DP_0$ from before the shift to the pixel position $DP_0$. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 16B, the pixel value set PG2 corresponds to the light-emitting elements in the first row of the light-emitting element array. As a result of the insertion of the pixel values, a drive signal based on the pixel value (3,−2) of the selected pixel position $DP_0$ is supplied to the light-emitting element $R_{3\_0}$ and the light-emitting element $R_{4\_0}$, and here too, the range of the effective light-emitting elements in the first row is expanded by an amount equivalent to a single light-emitting element.

Figure 16A:
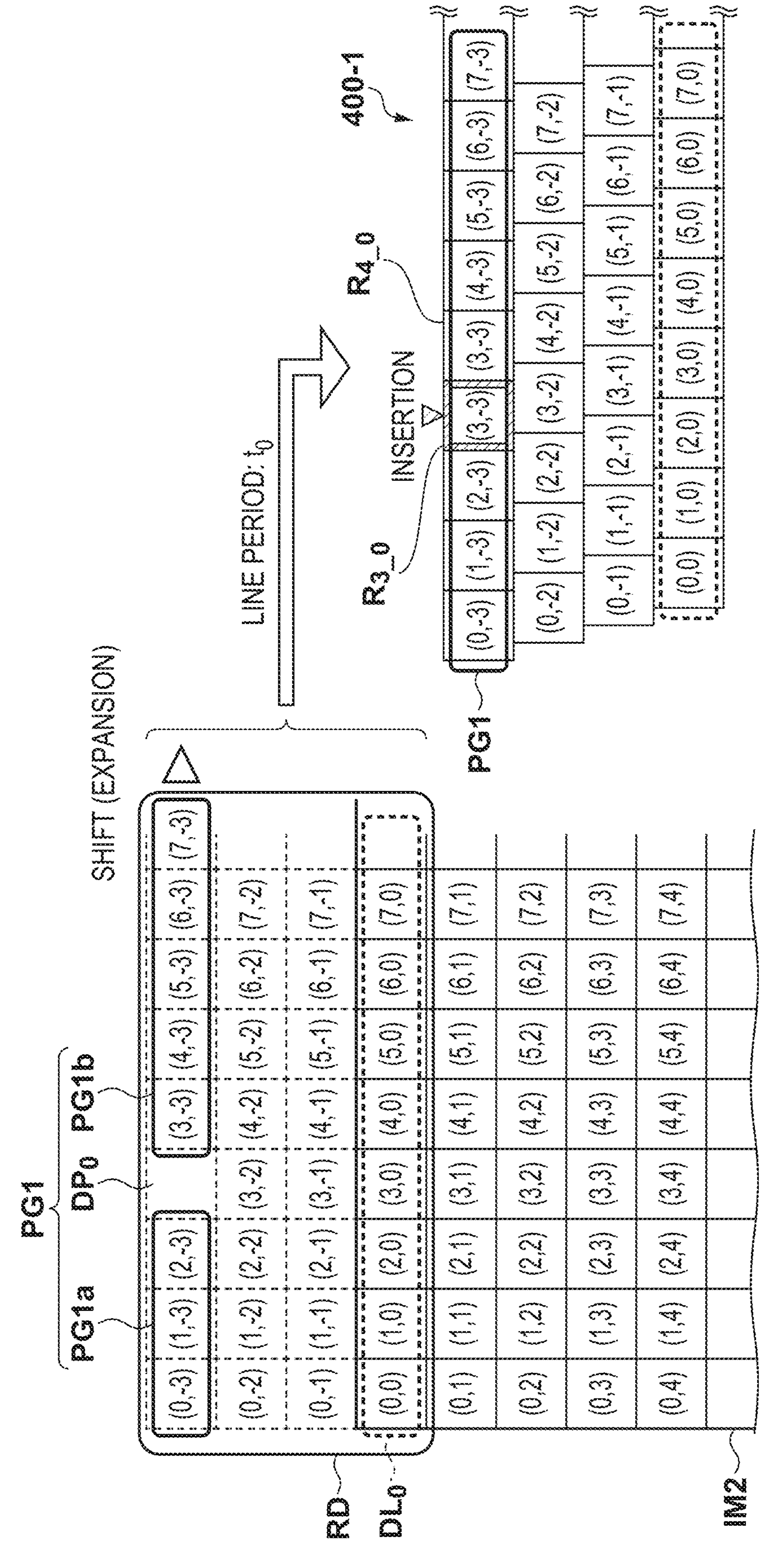
FIG. 16A is an explanatory diagram illustrating a light emission control sequence that includes scaling error compensation (pixel value insertion).
Figure 16C:
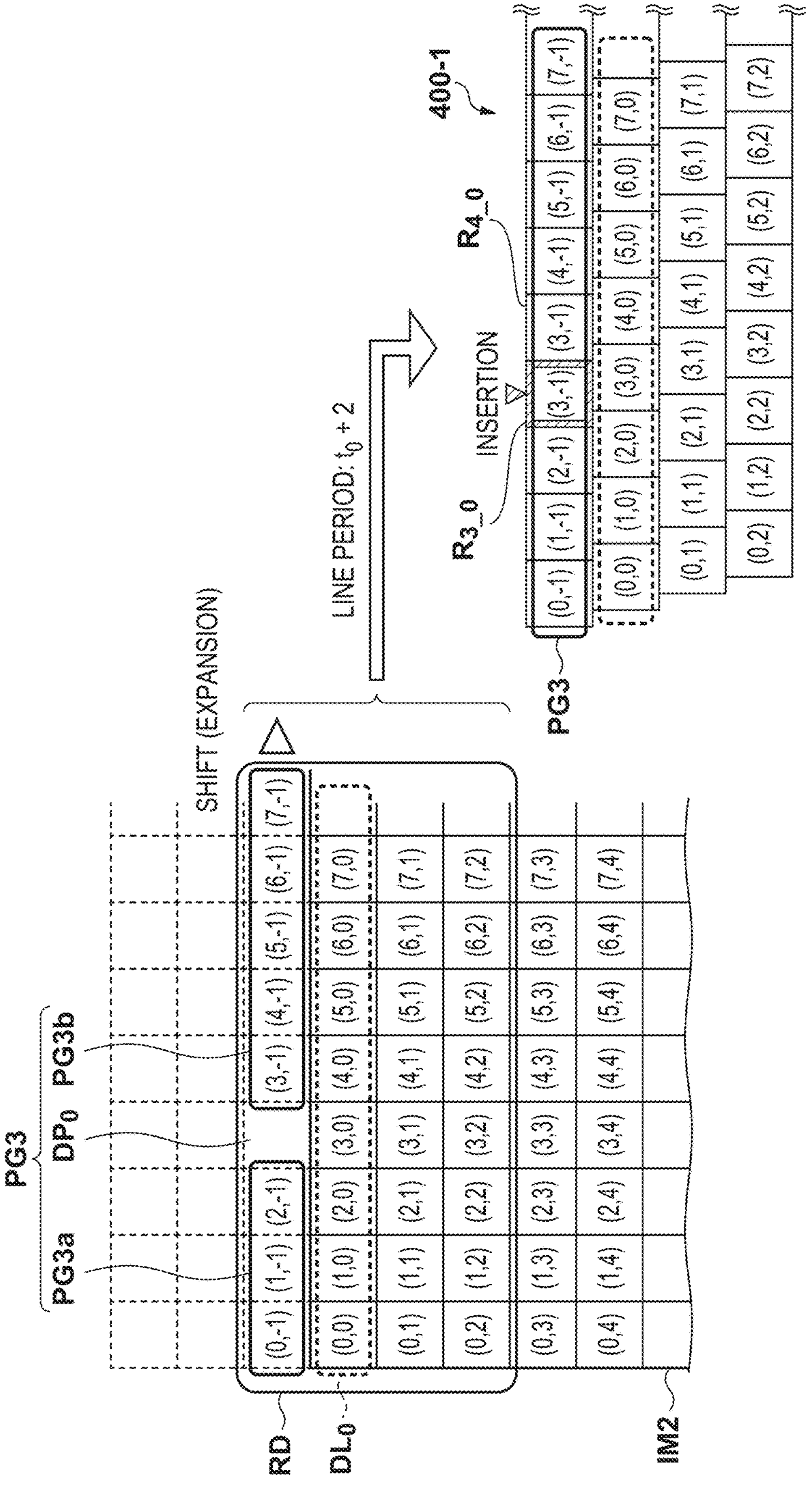
FIG. 16C is an explanatory diagram illustrating a light emission control sequence that includes scaling error compensation (pixel value insertion).

Moving to FIG. 16C, in the next line period $t_0+2$, the pixel position $DP_0$ in the readout range RD is selected a third time. The selected pixel position $DP_0$ belongs to the first row of the readout range RD (the row having an index i=−1). The light emission control unit 705 inserts the pixel value into the pixel value set PG3 in this row. Specifically, the light emission control unit 705 shifts the pixel values of a partial set PG3*b* on the right side in the axial direction, relative to the pixel position $DP_0$, one pixel to the right, and copies the pixel value (3,−1) at the pixel position $DP_0$ from before the shift to the pixel position $DP_0$. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 16C, the pixel value set PG3 corresponds to the light-emitting elements in the first row of the light-emitting element array. As a result of the insertion of the pixel values, a drive signal based on the pixel value (3,−1) of the selected pixel position $DP_0$ is supplied to the light-emitting element $R_{3\_0}$ and the light-emitting element $R_{4\_0}$, and here too, the range of the effective light-emitting elements in the first row is expanded by an amount equivalent to a single light-emitting element.

Figure 16D:
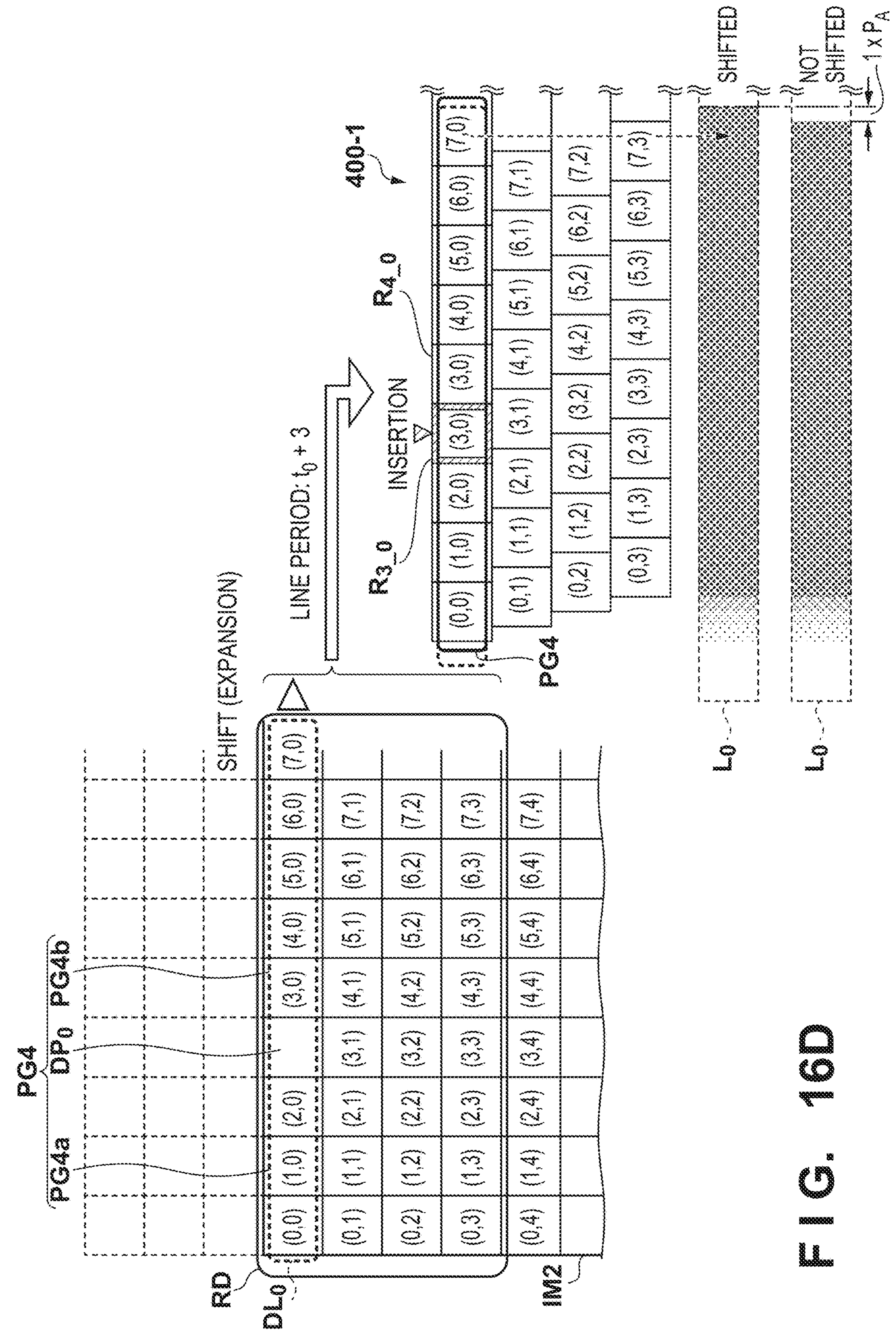
FIG. 16D is an explanatory diagram illustrating a light emission control sequence that includes scaling error compensation (pixel value insertion).

Moving to FIG. 16D, in the next line period $t_0+3$, the pixel position $DP_0$ in the readout range RD is selected a fourth time. The selected pixel position $DP_0$ belongs to the first row of the readout range RD (the row having an index i=0). The light emission control unit 705 inserts the pixel value into the pixel value set PG4 in this row. Specifically, the light emission control unit 705 shifts the pixel values of a partial set PG4*b* on the right side in the axial direction, relative to the pixel position $DP_0$, one pixel to the right, and copies the pixel value (3,0) at the pixel position $DP_0$ from before the shift to the pixel position $DP_0$. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 16D, the pixel value set PG4 corresponds to the light-emitting elements in the first row of the light-emitting element array. As a result of the insertion of the pixel values, a drive signal based on the pixel value (3,0) of the selected pixel position $DP_0$ is supplied to the light-emitting element $R_{3\_0}$ and the light-emitting element $R_{4\_0}$, and here too, the range of the effective light-emitting elements in the first row is expanded by an amount equivalent to a single light-emitting element.

As indicated by the broken lines in FIGS. 16A to 16D, the drive signals based on the effective pixel values of the line $DL_0$ of the input image data IM2 are supplied to the light-emitting elements in the fourth, third, second, and first rows of the light-emitting element array, in order for each line period. Of these, the pixel value set PG4 in the line $DL_0$ is expanded to the right in the line period $t_0+3$, and thus the image forming range is expanded to the right by an amount equivalent to the pitch $P_A$ in the axial direction, as compared to normal times when pixel values are not inserted. However, the exposure head 106 contracts in the axial direction by an amount equivalent to the error scale Y due to temperature changes, for example, and thus the final image forming range on the photosensitive member 102, the transfer belt 111, or the sheet is substantially equal to that in normal times as a result of the scaling error being canceled out.

In this scenario, in which a reduction of the image forming range equivalent to one unit of pitch is compensated for, the drive signal based on the pixel value (3,0) is input to the light-emitting element $R_{4\_0}$ in addition to the four light-emitting elements $R_3$ m having an index j=3. When these five light-emitting elements emit light in accordance with the drive signal, an expanded spot corresponding to the pixel value (3,0) is formed on the surface of the photosensitive member 102. When this is compared with the case where there is no compensation for scaling error described with reference to FIGS. 12A to 12D, the number of light-emitting elements used to form a spot corresponding to the same pixel position changes when the scaling error is compensated for. For example, the number of light-emitting elements for spot formation corresponding to the pixel value (3,0) is four when the scaling error is not compensated for, whereas in this scenario, the number is five. The same applies to the other pixel positions as well.

It should be noted that the CPU 701 may transmit, to the light emission control unit 705, correction data for cancelation of scaling error, and the light emission control unit 705 may control the number of light-emitting portions to be driven to form each of the pixels of an image based on the correction data. That is, the correction data may be data for correcting an image width of an image in the axial direction.

In a practical example, the number of light-emitting portions (for example, light-emitting elements) that are used for forming a spot corresponding to a pixel value (or pixel position) of input image data may vary depending on the correction data. In other words, the number of light-emitting portions to be driven to form a pixel of an image may vary depending on the correction data. The light emission control unit 705 may correct an image width of the image based on the correction data by controlling a plurality of light-emitting portions of the exposure head such that:

- a first number of light-emitting portions are driven to form a first pixel of the image with first pixel data, and
- a second number of light-emitting portions are driven to form a second pixel of the image with second pixel data, the second number being different from the first number.

In a case where an image width of an image is not to be corrected, the light emission control unit 705 may control the plurality of light-emitting portions of the exposure head such that the first number of light-emitting portions are driven to form each pixel of that image. In a case where the image width is to be expanded, at least one pixel is formed using the second number of light-emitting portions, which is larger than the first number. As the light-emitting portions are arranged at the pitch $P_A$ in the axial direction, it can be said that they are arranged at different positions in the axial direction.

4-2-2. Compensation for Expansion of Image Forming Range

When scaling error has been detected, and the error scale Y is greater than 1, the light emission control unit 705 thins out a pixel value, from a pixel value set of a row to which each selected pixel position belong, at the pixel position. Here, thinning out pixel values at a given pixel position includes deleting the pixel value from that pixel position from before the thinning out, and shifting pixel values on one side in the axial direction, relative to that pixel position, in a direction that reduces the pixel value set.

FIGS. 17A to 17D are explanatory diagrams illustrating a light emission control sequence that includes compensating for expansion of the image forming range. Here, the number of pixel positions to be selected is assumed to be 1 (for example, $W_0 \leq (Y-1)-P_A$). Input image data IM2, in which three lines of dummy pixel values have been added to the beginning, is illustrated on the left in FIG. 17A. Because the error scale Y is greater than 1, the light emission control unit 705 selects a pixel position at which pixel values are to be thinned out within the readout range RD in each line period. In the example in FIG. 17A, the pixel position $DP_0$ is selected in the line period $t_0$. The selected pixel position $DP_0$ belongs to the first row of the readout range RD (the row having an index i=−3). The light emission control unit 705 thins out the pixel values at the pixel position $DP_0$ from the pixel value set PG1 in this row. Specifically, the light emission control unit 705 deletes the pixel value (3,−3) at the pixel position $DP_0$ from before the shift, and shifts the pixel values of a partial set PG1*a* on the left side in the axial direction, relative to the pixel position $DP_0$, one pixel to the right. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 17A, the pixel value set PG1 corresponds to the light-emitting elements in the first row of the light-emitting element array. As a result of the thinning out of the pixel values, the drive signal based on the pixel value (3,−3) at the selected pixel position $DP_0$ is not supplied to any of the light-emitting elements, and the range of the effective light-emitting elements in the first row is reduced by a single light-emitting element.

Figure 17A:
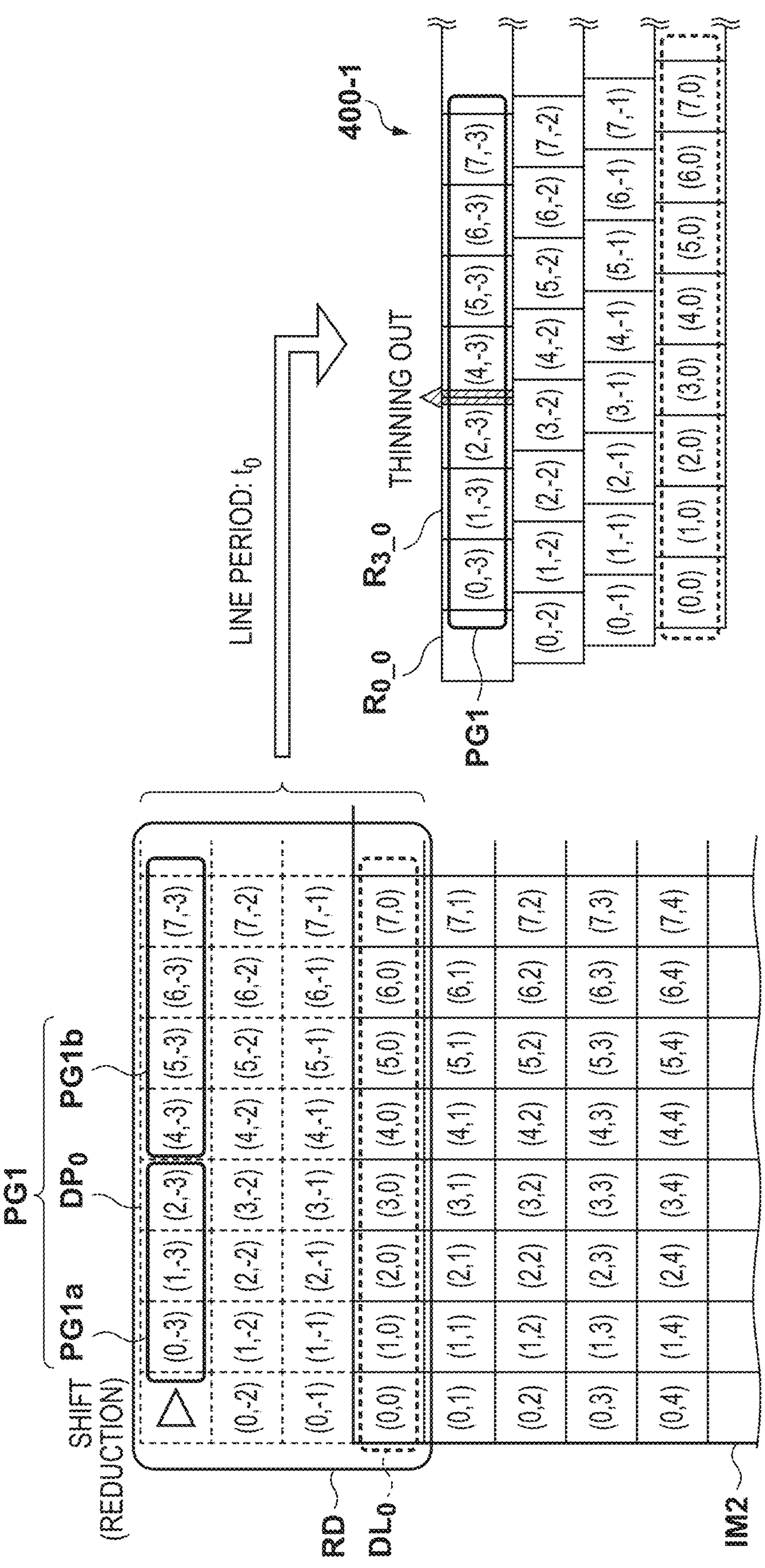
FIG. 17A is an explanatory diagram illustrating a light emission control sequence that includes scaling error compensation (thinning out pixel values).
Figure 17B:
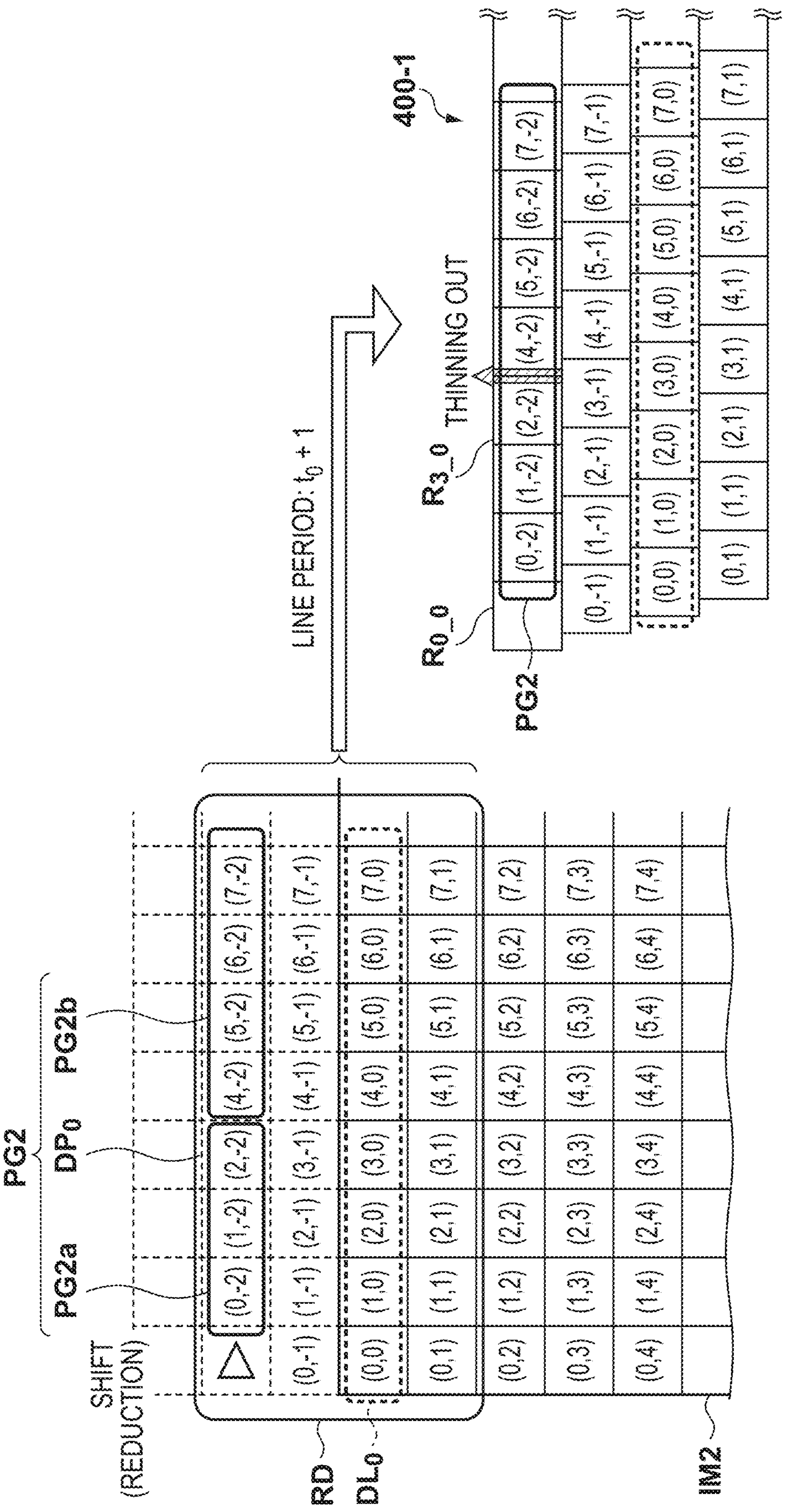
FIG. 17B is an explanatory diagram illustrating a light emission control sequence that includes scaling error compensation (thinning out pixel values).

Moving to FIG. 17B, in the next line period $t_0+1$, the pixel position $DP_0$ in the readout range RD is selected again. The selected pixel position $DP_0$ belongs to the first row of the readout range RD (the row having an index i=−2). The light emission control unit 705 thins out the pixel values at the pixel position $DP_0$ from the pixel value set PG2 in this row. Specifically, the light emission control unit 705 deletes the pixel value (3,−2) at the pixel position $DP_0$ from before the shift, and shifts the pixel values of a partial set PG2*a* on the left side in the axial direction, relative to the pixel position $DP_0$, one pixel to the right. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 17B, the pixel value set PG2 corresponds to the light-emitting elements in the first row of the light-emitting element array. As a result of the thinning out of the pixel values, the drive signal based on the pixel value (3,−2) at the selected pixel position $DP_0$ is not supplied to any of the light-emitting elements, and the range of the effective light-emitting elements in the first row is reduced by a single light-emitting element.

Figure 17C:
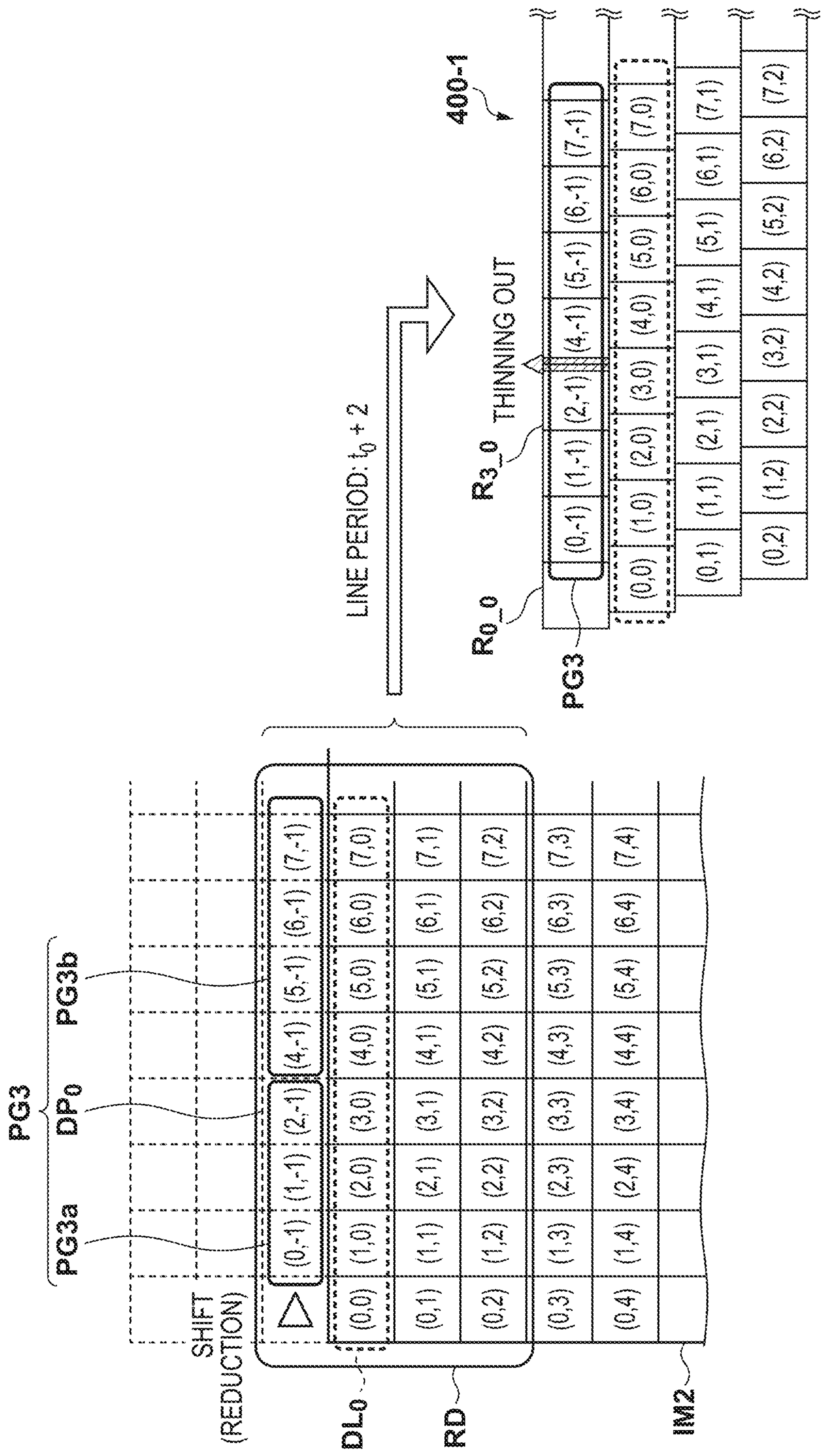
FIG. 17C is an explanatory diagram illustrating a light emission control sequence that includes scaling error compensation (thinning out pixel values).

Moving to FIG. 17C, in the next line period $t_0+2$, the pixel position $DP_0$ in the readout range RD is selected a third time. The selected pixel position $DP_0$ belongs to the first row of the readout range RD (the row having an index i=−1). The light emission control unit 705 thins out the pixel values at the pixel position $DP_0$ from the pixel value set PG3 in this row. Specifically, the light emission control unit 705 deletes the pixel value (3,−1) at the pixel position $DP_0$ from before the shift, and shifts the pixel values of a partial set PG3*a* on the left side in the axial direction, relative to the pixel position $DP_0$, one pixel to the right. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 17C, the pixel value set PG3 corresponds to the light-emitting elements in the first row of the light-emitting element array. As a result of the thinning out of the pixel values, the drive signal based on the pixel value (3,−1) at the selected pixel position $DP_0$ is not supplied to any of the light-emitting elements, and the range of the effective light-emitting elements in the first row is reduced by a single light-emitting element.

Figure 17D:
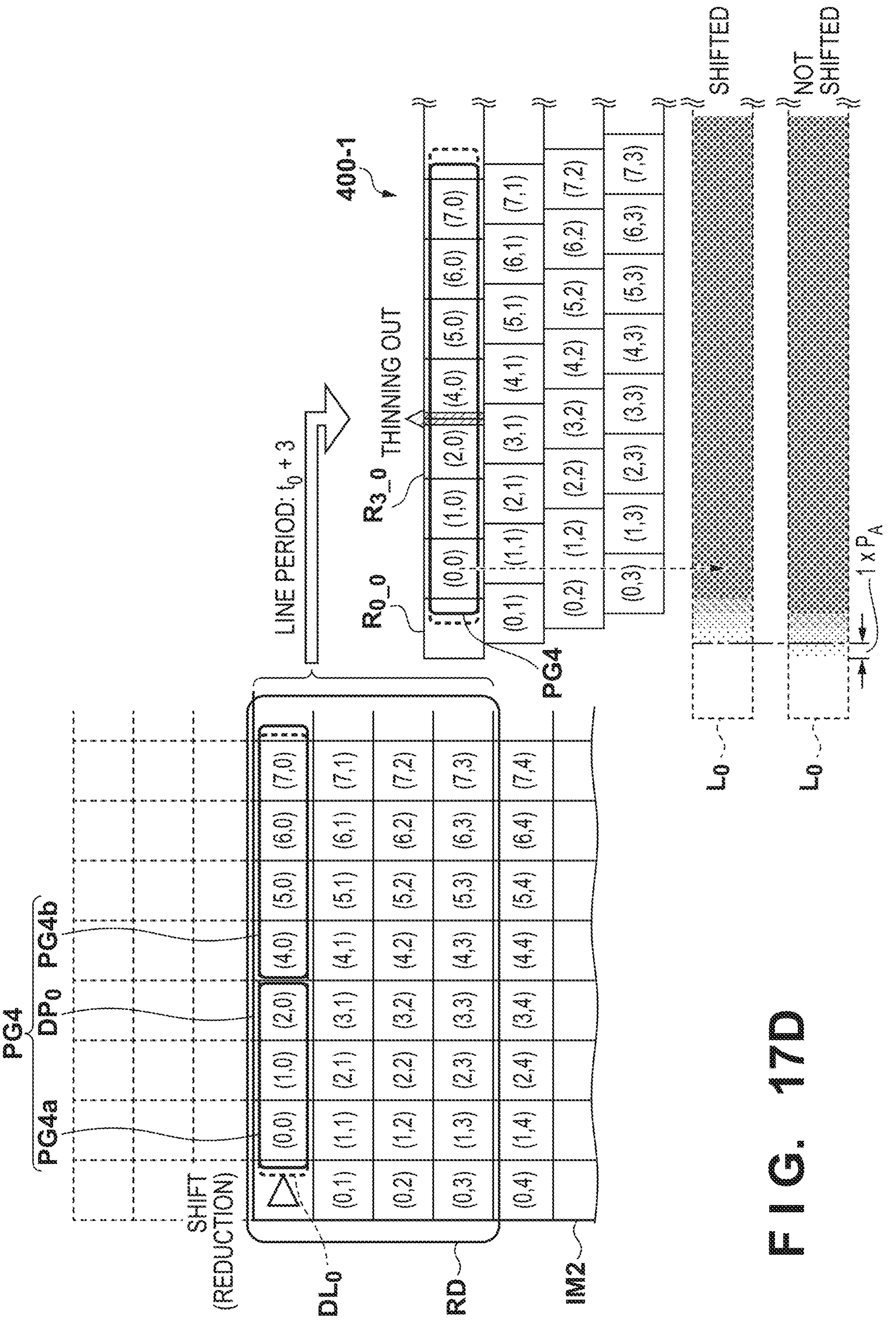
FIG. 17D is an explanatory diagram illustrating a light emission control sequence that includes scaling error compensation (thinning out pixel values).

Moving to FIG. 17D, in the next line period $t_0+3$, the pixel position $DP_0$ in the readout range RD is selected a fourth time. The selected pixel position $DP_0$ belongs to the first row of the readout range RD (the row having an index i=0). The light emission control unit 705 thins out the pixel values at the pixel position $DP_0$ from the pixel value set PG4 in this row. Specifically, the light emission control unit 705 deletes the pixel value (3,0) at the pixel position $DP_0$ from before the shift, and shifts the pixel values of a partial set PG4*a* on the left side in the axial direction, relative to the pixel position $DP_0$, one pixel to the right. The light emission control unit 705 then reads out a subset of every 2,992 pixel values from the input image data IM2, and outputs each subset to the corresponding light-emitting chip 400-*n*. In the light-emitting chip 400-1 illustrated on the right in FIG. 17D, the pixel value set PG4 corresponds to the light-emitting elements in the first row of the light-emitting element array. As a result of the thinning out of the pixel values, the drive signal based on the pixel value (3,0) at the selected pixel position $DP_0$ is not supplied to any of the light-emitting elements, and the range of the effective light-emitting elements in the first row is reduced by a single light-emitting element.

As indicated by the broken lines in FIGS. 17A to 17D, the drive signals based on the effective pixel values of the line $DL_0$ of the input image data IM2 are supplied to the light-emitting elements in the fourth, third, second, and first rows of the light-emitting element array, in order for each line period. Of these, the pixel value set PG4 in the line $DL_0$ is reduced in the line period $t_0+3$, and thus the image forming range is reduced by an amount equivalent to the pitch $P_A$ in the axial direction, as compared to normal times when pixel values are not thinned out. However, the exposure head 106 expands in the axial direction by an amount equivalent to the error scale Y due to temperature changes, for example, and thus the final image forming range on the photosensitive member 102, the transfer belt 111, or the sheet is substantially equal to that in normal times as a result of the scaling error being canceled out.

In this scenario, in which an expansion of the image forming range equivalent to one unit of pitch is compensated for, the drive signal based on the pixel value (3,0) is input to three of the four light-emitting elements $R_3$ m having an index j=3, with the exception of the light-emitting element $R_{3\_0}$, for example. When these three light-emitting elements emit light in accordance with the drive signal, a reduced spot corresponding to the pixel value (3,0) is formed on the surface of the photosensitive member 102. When this is compared with the case where there is no compensation for scaling error described with reference to FIGS. 12A to 12D, the number of light-emitting elements used to form a spot corresponding to the same pixel position changes when the scaling error is compensated for. For example, the number of light-emitting elements for spot formation corresponding to the pixel value (3,0) is four when the scaling error is not compensated for, whereas in this scenario, the number is three. The same applies to the other pixel positions as well.

The light emission control unit 705 may determine pixel position(s) into which pixel value(s) are inserted or from which pixel value(s) are thinned out based on the correction data received from the CPU 701. In other words, the light emission control unit 705 may control an image width of a formed image in the axial direction by inserting or thinning out pixel value(s) based on the correction data. That is, the correction data is data for correcting the image width in the axial direction.

In a practical example, the number of light-emitting portions (for example, light-emitting elements) that are used for forming a spot corresponding to a pixel value (or pixel position) of input image data may vary depending on the correction data. In other words, the number of light-emitting portions to be driven based on a driving signal based on a pixel value of an image may vary depending on the correction data. In a case where there is no scaling error to be compensated for, a first number of light-emitting portions are driven to form each pixel of the image based on a corresponding pixel value of that pixel. In a case where there is a scaling error to be compensated for, at least one pixel of the image is formed by a second number of light-emitting portions being driven based on a corresponding pixel value of that pixel.

In a case where the image width is to be reduced, at least one pixel is formed using the second number of light-emitting portions, which is smaller than the first number. As the light-emitting portions are arranged at the pitch $P_A$ in the axial direction, it can be said that they are arranged at different positions in the axial direction.

4-2-3. Selection of Inserted Pixel Positions and Thinned-Out Pixel Positions

As described above, the light emission control unit 705 can determine the number of pixel positions to be selected for inserting or thinning out pixel values based on the error scale Y and the pitch $P_A$ of the light-emitting elements 602 in the axial direction. For example, a number z of pixel positions to be selected can be determined according to the following formula using the error scale Y, the pitch $P_A$, and the width $W_0$ of the normal image forming range:

$$z = \text{round}\,(W_0 \times |1 - Y| / P_A)$$

Here, "round" is a function that returns a value in which the argument has been rounded off.

The light emission control unit 705 can select the number of pixel positions determined, randomly in the axial direction and non-randomly in the circumferential direction. Incorporating randomness in the selection of the insertion position or thinning position in the axial direction makes it possible to reduce the likelihood of subjective image quality drops such as streaks or moiré arising in the image as a result of the compensation. The light emission control unit 705 may randomly select the number of pixel positions determined, in units of pixel blocks in the axial direction. For example, when two pixel positions are selected, the pixels in N columns arranged in the axial direction are divided into a left-half pixel block and a right-half pixel block, and a single pixel position may be randomly selected from each of the left-half pixel block and the right-half pixel block. This makes it possible to reduce the likelihood of distortion arising in the image due to unevenness in the selected pixel positions.

Figure 18:
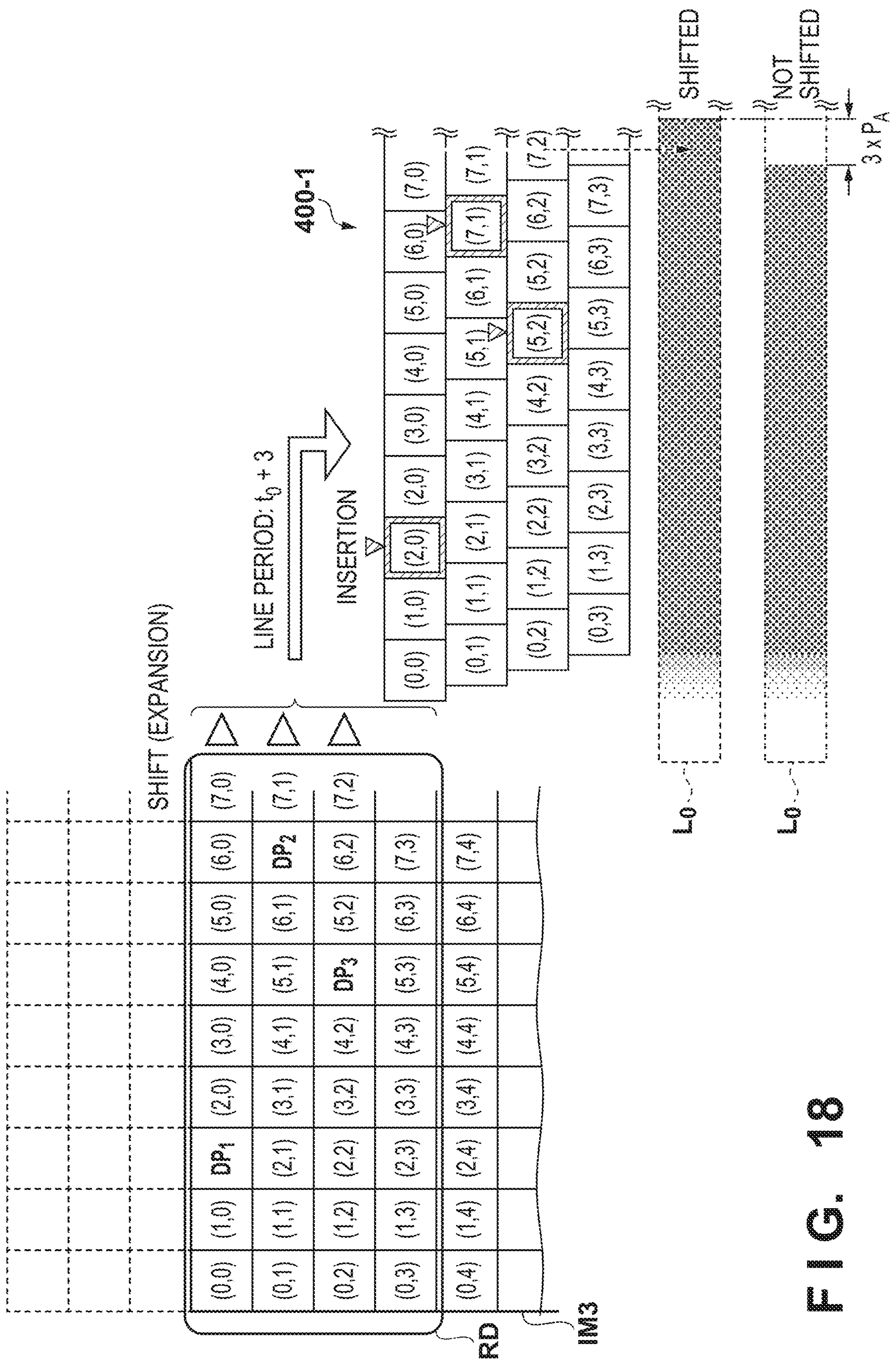
FIG. 18 is an explanatory diagram illustrating a light emission control sequence that includes scaling error compensation (multiple pixel value insertions).

The selection of the insertion position or the thinning position in the circumferential direction may be made according to the same rules as when distributing the shift amount in the positional misalignment compensation described above. For example, when a pixel value set is shifted to the right by inserting z pixel values, the rear end in the shift direction is located in the first row, and the front end is located in the fourth row. Accordingly, the light emission control unit 705 selects the pixel positions in the circumferential direction in the order of first row→second row→third row→fourth row→first row→second row→and so on, until the selected number of the pixel position reaches z. When the pixel value set is shifted to the left, the order in which the rows are selected is reversed. FIG. 18 illustrates an example of selecting a pixel position when the image forming range is expanded by an amount equivalent to $3 \times P_A$ by selecting three pixel positions and inserting pixel values. In the example in FIG. 18, a pixel position $DP_1$ is selected from the first row, a pixel position $DP_2$ is selected from the second row, and a pixel position $DP_3$ is selected from the third row, in the readout range RD set in input image data IM3. The pixel values to the right of the selected pixel positions $DP_1$, $DP_2$, and $DP_3$ are then shifted to the right. To simplify the descriptions, an example in which the selected pixel positions are biased to the pixel positions corresponding to the light-emitting elements of the light-emitting chip 400-1 is given here, but in reality, the selected pixel positions may be widely dispersed throughout the axial direction.

4-2-4. Scaling Error Compensation Involving Positional Misalignment Compensation When the image forming range has been expanded or reduced by inserting or thinning out the pixel values as described thus far, the image forming position displaces in the axial direction as a result. The light emission control unit 705 shifts the pixel value set for each line of the image data such that the post-compensation image forming position matches the correct position, through a concept similar to that of the compensation for positional misalignment described in the preceding section. As long as the position and scale of the image forming range are ultimately appropriate, the light emission control unit 705 may perform either of insertion or thinning out of the pixel values first in order to compensate for the shift in the pixel value set to compensate for the positional misalignment and to compensate for the scaling error. These points also apply to the working example described in the following sections.

5. WORKING EXAMPLE USING AUXILIARY PIXEL ARRAY

As described in the preceding section, the light emission control unit 705 outputs a subset of every J×M pixel values of M lines of the input image data (e.g., J=748, M=4) to the light-emitting chip 400-*n*. The image controller 700 may be provided with an image memory including an auxiliary pixel array for temporarily storing pixel values for such pixel value output control. This section will describe a working example of pixel value output control using such an auxiliary pixel array.

(1) Basic Output Control

Figure 19:
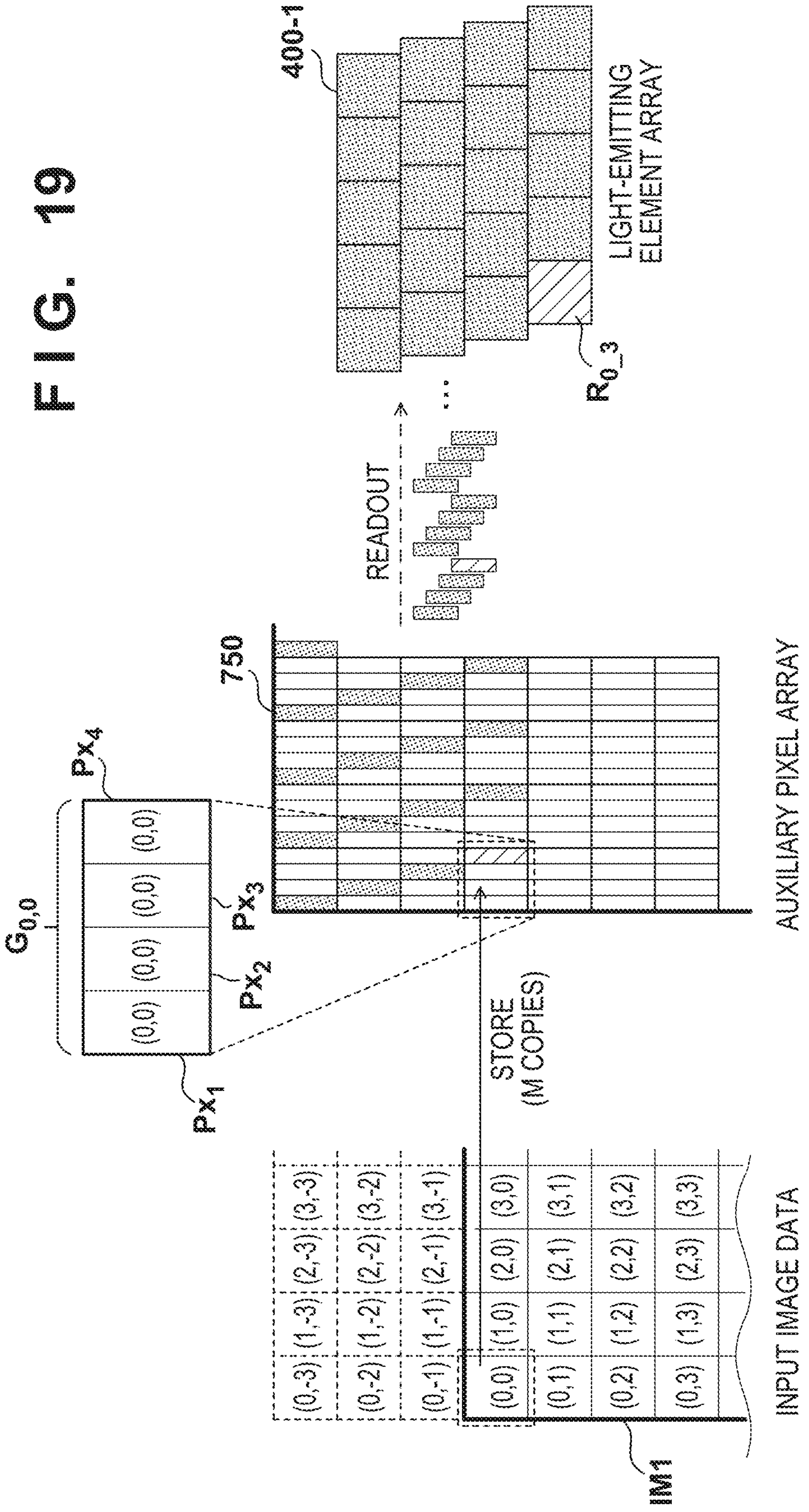
FIG. 19 is an explanatory diagram illustrating a working example of pixel value output control using an auxiliary pixel array.
Figure 20A:
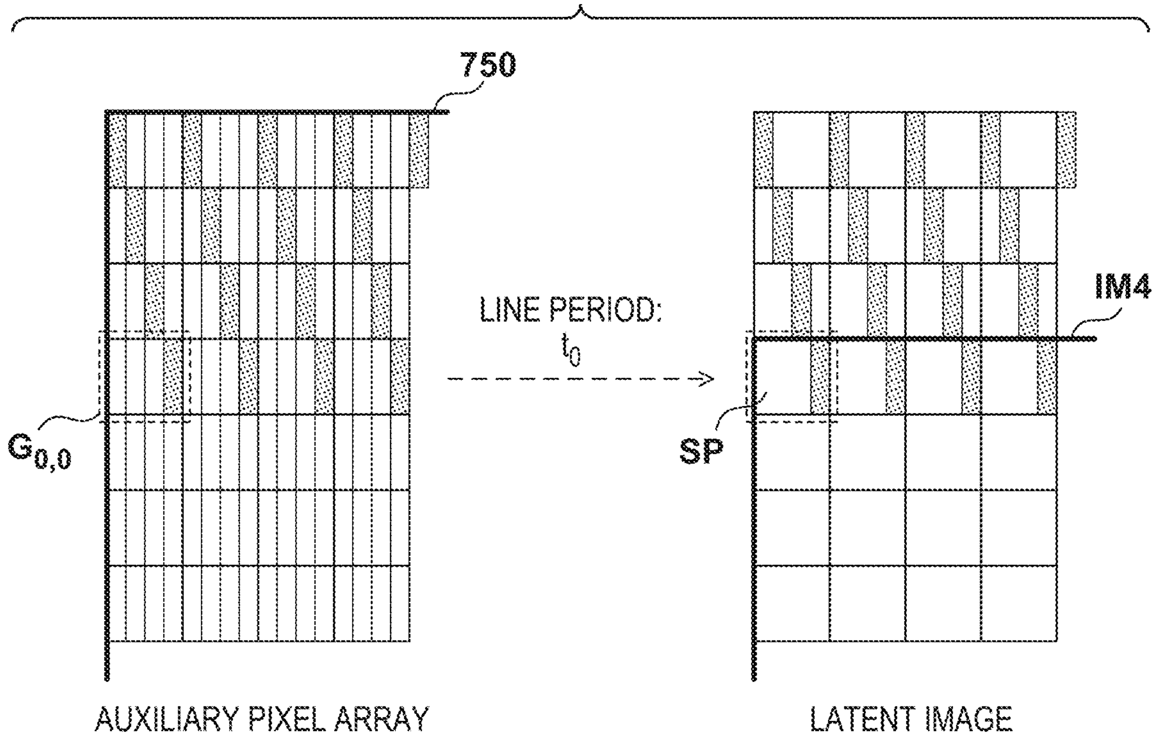
FIG. 20A is an explanatory diagram illustrating auxiliary pixels from which pixel values are read out in a first line period.
Figure 20B:
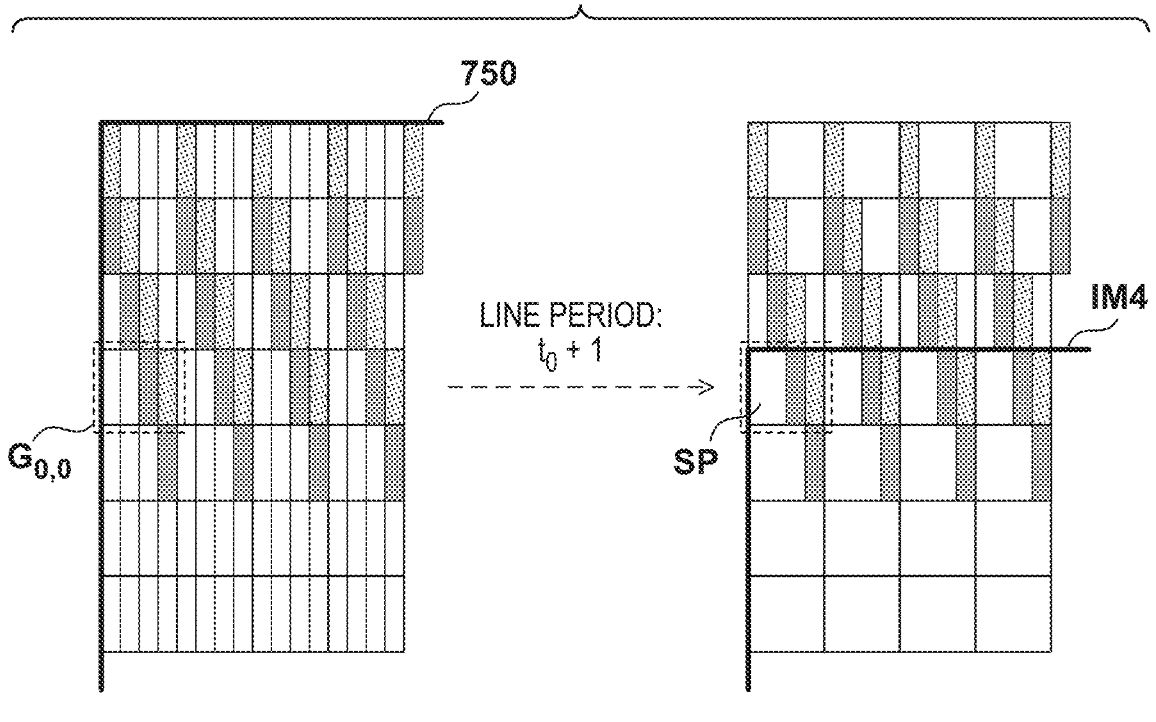
FIG. 20B is an explanatory diagram illustrating auxiliary pixels from which pixel values are read out in a second line period.

FIG. 19 is an explanatory diagram illustrating a working example of pixel value output control using an auxiliary pixel array. The input image data IM1 received by the light emission control unit 705 from the image data processing unit 703 is again partially illustrated on the left in FIG. 19. Three lines' worth of dummy pixel values are added to the input image data IM1.

An auxiliary pixel array 750, which can be included in the image memory (e.g., a frame memory), is partially illustrated in the center of FIG. 19. Each row of the auxiliary pixel array 750 is constituted by a number of auxiliary pixels M times the number of pixels in each row of the input image data IM1. In the example in FIG. 19, M=4. The light emission control unit 705 stores M copies of the pixel values at each pixel position in each row of the input image data in the M auxiliary pixels in the corresponding rows of the auxiliary pixel array 750. For example, referring to FIG. 19, four copies of the pixel value (0,0) of the input image data IM1 are stored in auxiliary pixels Px1, Px2, Px3, and Px4 of the auxiliary pixel array 750, respectively.

The light-emitting element array of the light-emitting chip 400-1 is illustrated on the right side of FIG. 19. To cause the exposure head 106 to form a spot corresponding to each pixel position of the input image data IM1, the light emission control unit 705 successively reads out the pixel values from the auxiliary pixels of a corresponding auxiliary pixel set in the auxiliary pixel array 750, and outputs the read-out pixel values to the light-emitting element array. In the example in FIG. 19, the auxiliary pixels in the auxiliary pixel array 750, from which the pixel values are read out in a given line period, are indicated by shading. In particular, in this line period, the light emission control unit 705 reads out the pixel value from the auxiliary pixel Px4, among the four auxiliary pixels in which the pixel value (0,0) has been stored, and outputs the read-out pixel value to the light-emitting element $R_{0\_3}$.

The auxiliary pixels in the auxiliary pixel array 750, from which the pixel values are to be read out throughout the line periods $t_0$ to $t_0$+3, are indicated by different darknesses of shading on the left side of FIGS. 20A to 20D. Focusing on the four auxiliary pixels in which the pixel value (0,0) are stored, in the line period $t_0$, the pixel value read out from the auxiliary pixel Px4 is used to form a spot SP at the upper-left corner in an electrostatic latent image IM4 (see FIG. 20A). In the line period $t_0$+1, the pixel value read out from the auxiliary pixel Px3 is used to form the spot SP of the electrostatic latent image IM4 (see FIG. 20B). In the line period $t_0$+2, the pixel value read out from the auxiliary pixel Px2 is used to form the spot SP of the electrostatic latent image IM4 (see FIG. 20C). In the line period $t_0$+3, the pixel value read out from the auxiliary pixel Px1 is used to form the spot SP of the electrostatic latent image IM4 (see FIG. 20D).

The control of the output of pixel values from the auxiliary pixel array described here is an example of basic control for when no error is detected in the image forming range. In this case, all of the spots in the electrostatic latent image are formed as a result of emitting light based on the pixel values read out from the set of M auxiliary pixels to which the same pixel values from the corresponding pixel positions in the input image data have been copied (i.e., the auxiliary pixel set). For example, an auxiliary pixel set $G_{0,0}$, which is constituted by the auxiliary pixels Px1, Px2, Px3, and Px4, is involved in forming a single spot SP in the electrostatic latent image IM4. On the other hand, if an error has been detected in the image forming range, (the auxiliary pixels that constitute) the auxiliary pixel set involved in forming the corresponding spots will differ for at least one of the pixel positions, due to pixel values being shifted, inserted, or thinned out. In other words, a first auxiliary pixel set corresponding to at least one pixel position from a case where no error is detected in the image forming range is different from a second auxiliary pixel set corresponding to that at least one pixel position from a case where error is detected in the image forming range. As a consequence, the number of light-emitting elements in an auxiliary pixel set may vary, resulting in that a different number of light-emitting elements are involved in spot formation corresponding to at least one pixel position. The kinds of differences that can arise in the auxiliary pixel set when positional misalignment is detected, when scaling error at a scale of less than 1 is detected, and when scaling error at a scale of greater than 1 is detected as errors in the image forming range, will be described in that order hereinafter.

(2) Compensating for Positional Misalignment

When positional misalignment in the axial direction is detected as an error in the image forming range, the light emission control unit 705 shifts the pixel values of at least one row of the auxiliary pixel array in the direction which cancels out the detected positional misalignment. The shift amount can be determined depending on the magnitude of the detected positional misalignment.

Figure 21:
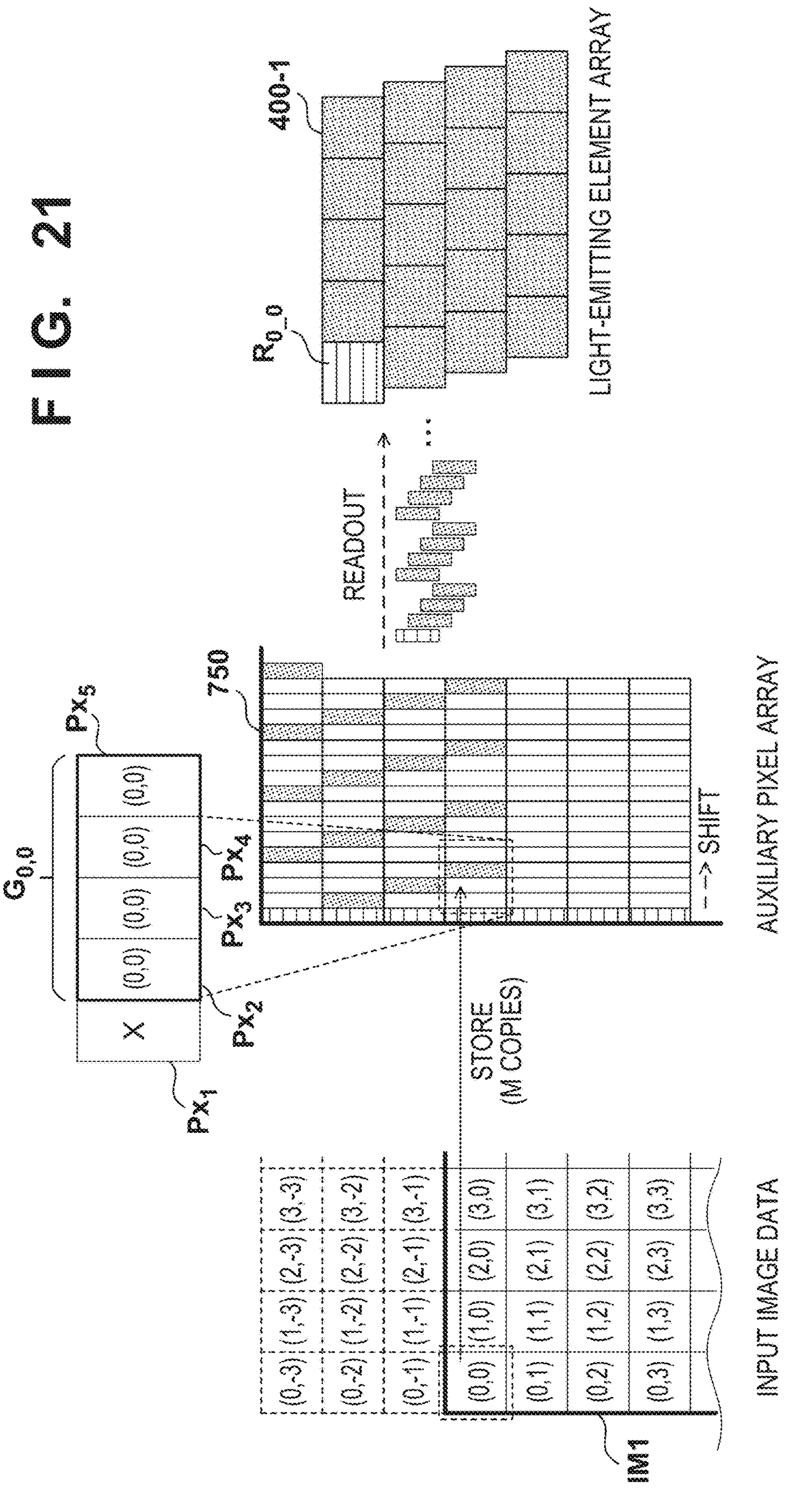
FIG. 21 is an explanatory diagram illustrating a shift in pixel values in an auxiliary pixel array when positional misalignment has been detected.
Figure 22C:
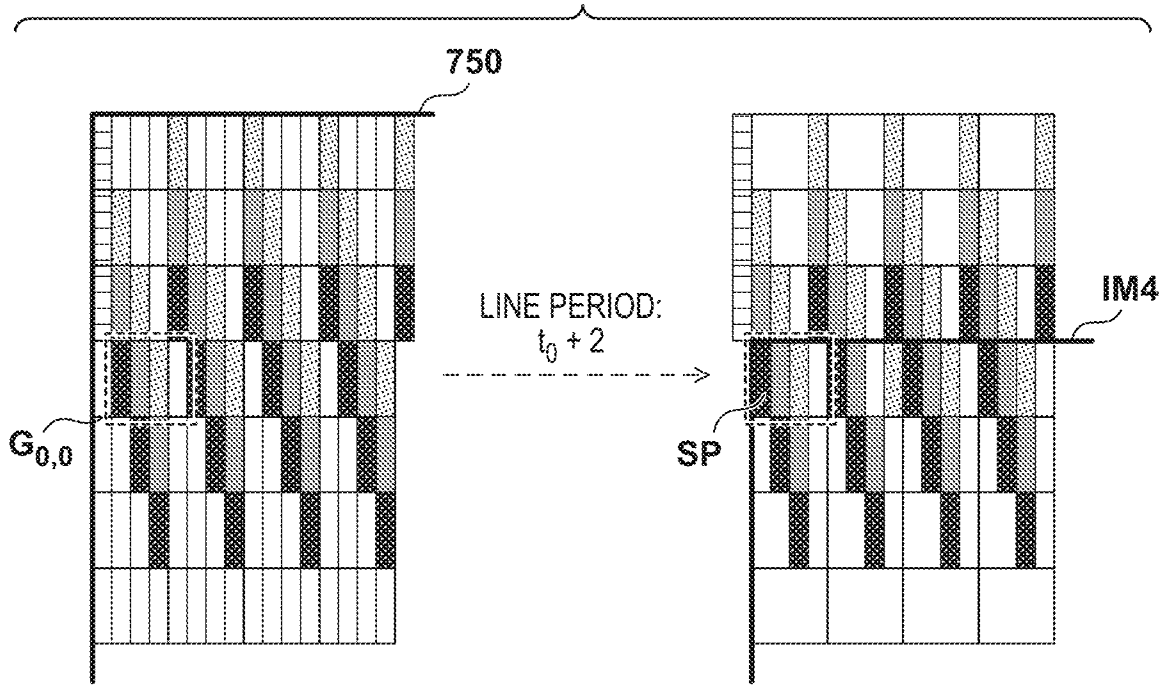
FIG. 22C is an explanatory diagram illustrating auxiliary pixels from which pixel values are read out in a third line period, when performing positional misalignment compensation.
Figure 22D:
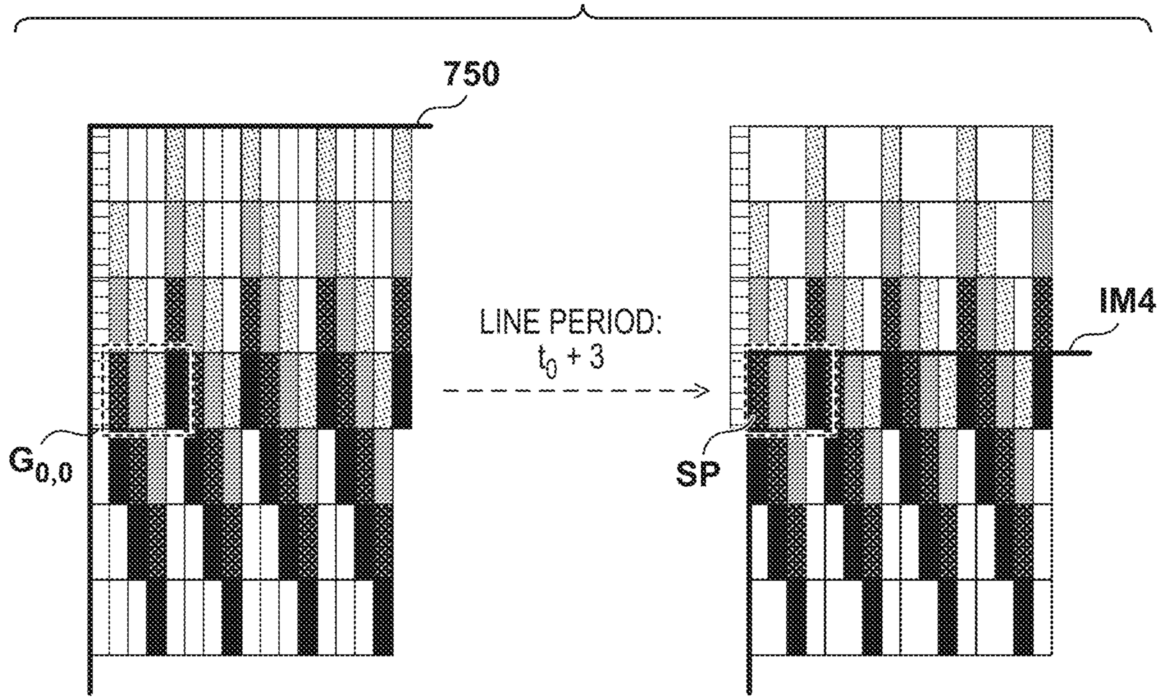
FIG. 22D is an explanatory diagram illustrating auxiliary pixels from which pixel values are read out in a fourth line period, when performing positional misalignment compensation.

FIG. 21 is an explanatory diagram illustrating a shift in the pixel values in the auxiliary pixel array when positional misalignment has been detected. Similar to FIG. 19, the input image data IM1 is partially illustrated on the left of FIG. 21, and the auxiliary pixel array 750 is partially illustrated in the center. In the example in FIG. 21, it is assumed that positional misalignment in the axial direction (the left direction, in FIG. 21) corresponding to ¼ of a pixel (e.g., 4,800 dpi) has been detected. In this case, the light emission control unit 705 stores M copies of the pixel values at each pixel position in each row of the input image data in the M auxiliary pixels in the corresponding rows of the auxiliary pixel array 750, shifted to the right by an amount equivalent to one auxiliary pixel. For example, referring to FIG. 21, four copies of the pixel value (0,0) of the input image data IM1 are stored in auxiliary pixels Px2, Px3, Px4, and Px5 of the auxiliary pixel array 750, respectively. The pixel value of the auxiliary pixel Px1 neighboring the auxiliary pixel Px2 on the left may be set to a dummy value indicating, for example, non-light emission. In the example in FIG. 21, the auxiliary pixels set to dummy values indicating non-light emission in response to the shift of the pixel values are indicated by horizontal stripes.

The light-emitting element array of the light-emitting chip 400-1 is illustrated on the right side of FIG. 21. To cause the exposure head 106 to form a spot corresponding to each pixel position of the input image data IM1, the light emission control unit 705 successively reads out the pixel values from the auxiliary pixels of a corresponding auxiliary pixel set in the auxiliary pixel array 750, and outputs the read-out pixel values to the light-emitting element array. In the example in FIG. 21, the pixel values of the auxiliary pixels set to the dummy values in accordance with the shift in the pixel values are output to the light-emitting element $R_{0\_0}$.

The auxiliary pixels in the auxiliary pixel array 750, from which the pixel values are to be read out throughout the line periods $t_0$ to $t_0$+3 when positional misalignment compensation is performed, are indicated by different darknesses of shading in FIGS. 22A to 22D. However, the auxiliary pixels set to dummy values in accordance with the shift in the pixel values are indicated by horizontal stripes. Focusing on the four auxiliary pixels in which the pixel value (0,0) are stored, in the line period $t_0$, the pixel value read out from the auxiliary pixel Px4 is used to form a spot SP at the upper-left corner in an electrostatic latent image IM4 (see FIG. 22A). In the line period $t_0$+1, the pixel value read out from the auxiliary pixel Px3 is used to form the spot SP of the electrostatic latent image IM4 (see FIG. 22B). In the line period $t_0$+2, the pixel value read out from the auxiliary pixel Px2 is used to form the spot SP of the electrostatic latent image IM4 (see FIG. 22C). In the line period $t_0$+3, the pixel value read out from the auxiliary pixel Px5 is used to form the spot SP of the electrostatic latent image IM4 (see FIG. 22D). The pixel values from the auxiliary pixels set to dummy values are output to the light-emitting element $R_{0\_0}$, which exposes a position outside the original image forming range due to the positional misalignment. However, the dummy values indicate non-light emission, and thus the light-emitting element $R_{0\_0}$ does not emit light.

As can be understood from FIGS. 22A to 22D, the auxiliary pixel set corresponding to each spot in the electrostatic latent image when positional misalignment is detected (the second auxiliary pixel set) includes auxiliary pixels not included in the corresponding auxiliary pixel set from when positional misalignment is not detected (the first auxiliary pixel set). For example, the auxiliary pixel set $G_{0,0}$ corresponding to the spot SP is constituted by the auxiliary pixels Px1, Px2, Px3, and Px4 when positional misalignment is not detected, but is constituted by the auxiliary pixels Px2, Px3, Px4, and Px5 in the example illustrated in FIGS. 22A to 22D.

(3) Compensating for Scaling Error (Error Scale <1)

When scaling error in the axial direction is detected as error in the image forming range, and the error scale is less than 1, the light emission control unit 705 inserts a pixel value at a selected auxiliary pixel position in at least one row of the auxiliary pixel array. The number of pixel values to be inserted can be determined according to the magnitude of the error scale. The magnitude of the error scale may be indicated by correction data that is input from the CPU 701 to the light emission control unit 705. The light emission control unit 705 may determine pixel position(s) at which pixel value(s) are inserted based on the correction data. As described above, inserting a pixel value can include shifting pixel values on one side in the axial direction, relative to the selected auxiliary pixel position, in a direction that expands the pixel value set, as well as adding a copy of a pre-shift pixel value of that auxiliary pixel position to that auxiliary pixel position. The light emission control unit 705 may select the number of auxiliary pixel positions (insertion positions) determined based on the magnitude of the error scale at random, or at random in units of pixel blocks, in the axial direction.

Figure 23:
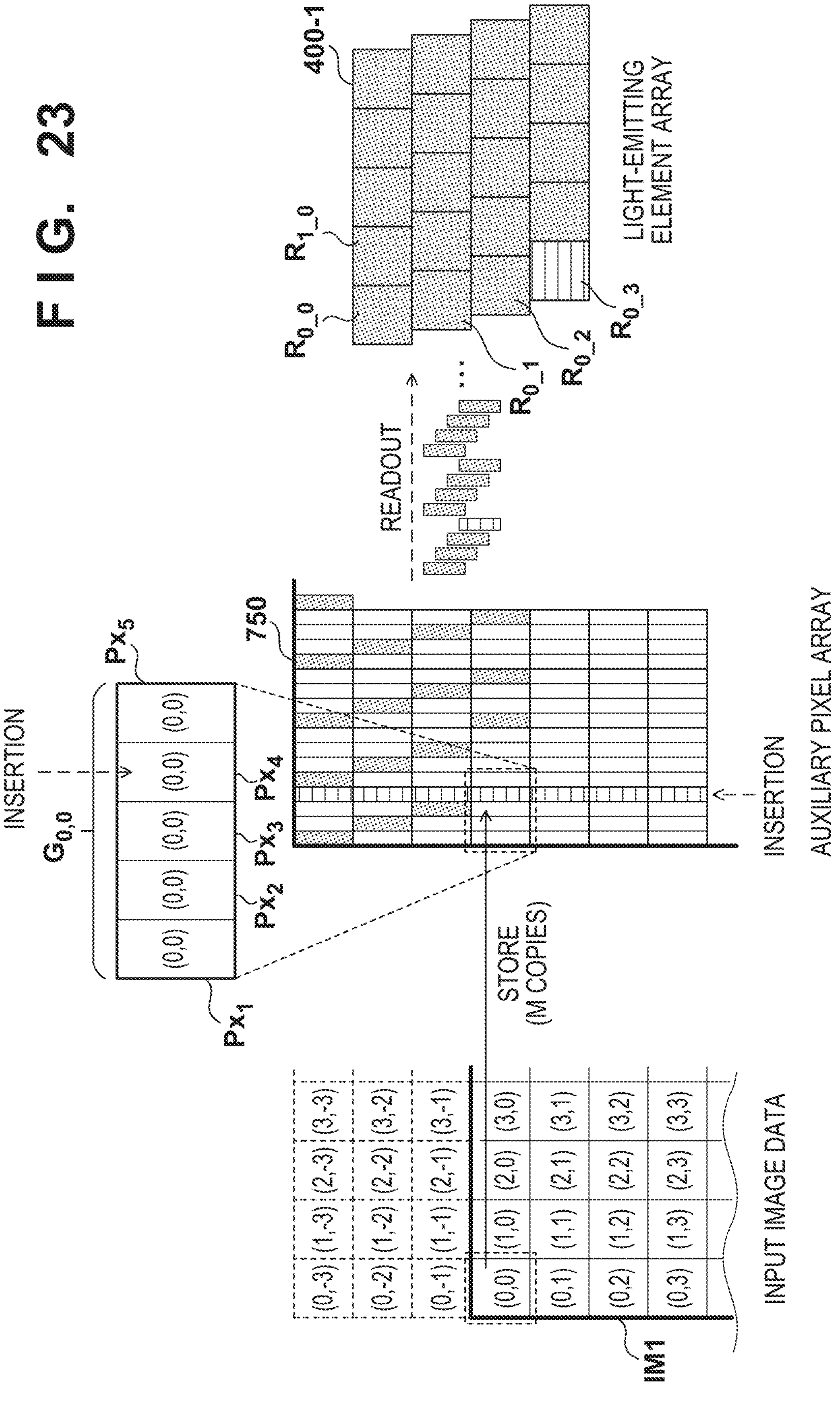
FIG. 23 is an explanatory diagram illustrating pixel value insertion in an auxiliary pixel array when scaling error has been detected.
Figure 24A:
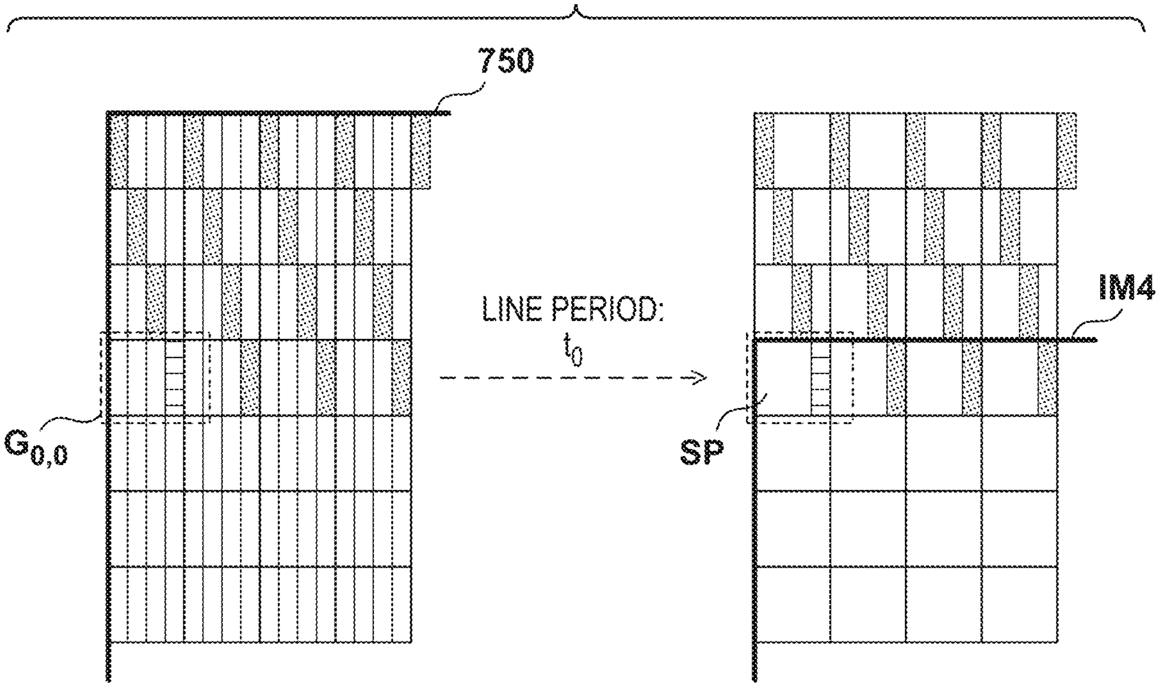
FIG. 24A is an explanatory diagram illustrating auxiliary pixels from which pixel values are read out in a first line period, when performing scaling error compensation (error scale <1).
Figure 24B:
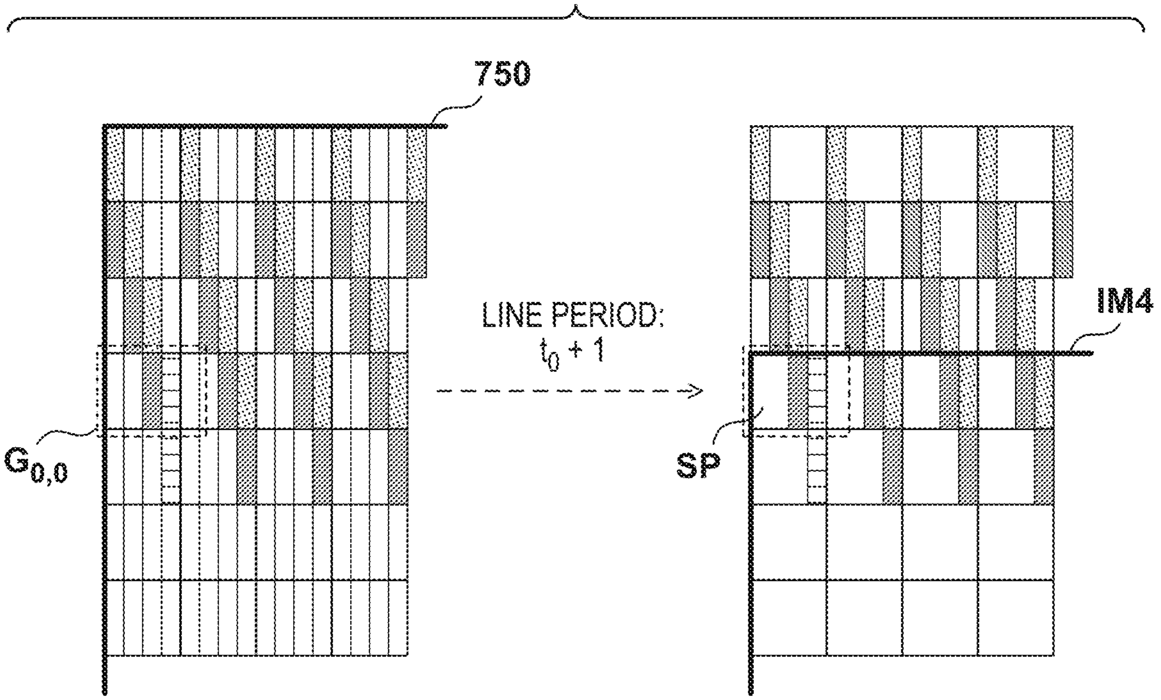
FIG. 24B is an explanatory diagram illustrating auxiliary pixels from which pixel values are read out in a second line period, when performing scaling error compensation (error scale <1).
Figure 24C:
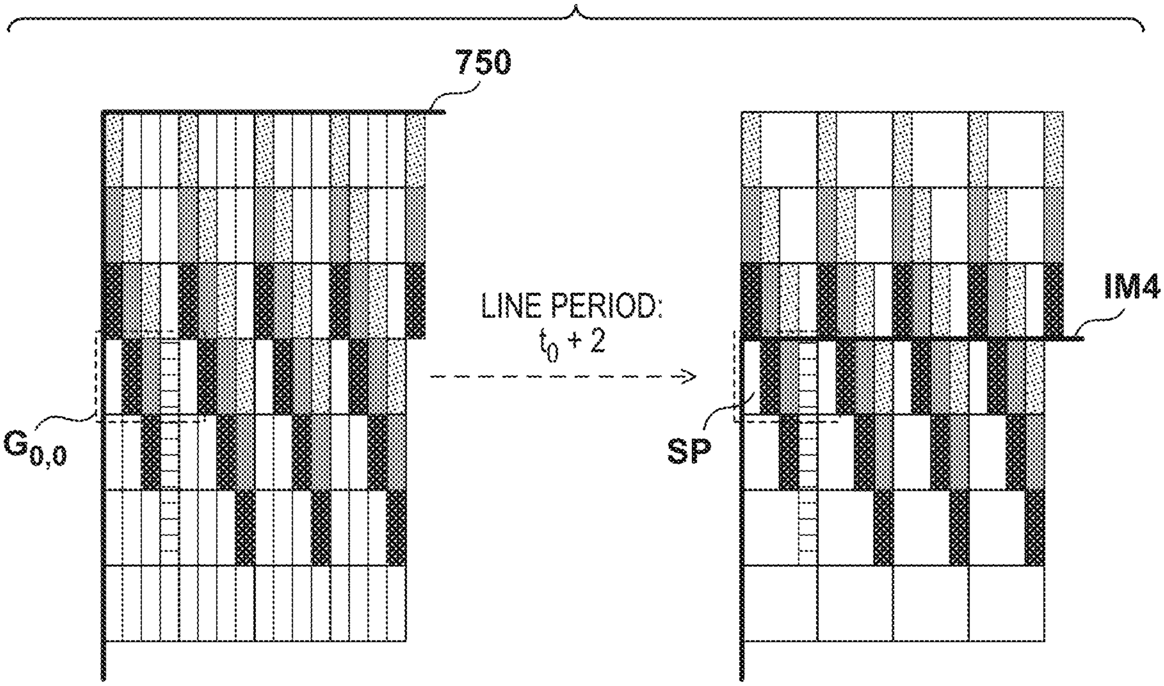
FIG. 24C is an explanatory diagram illustrating auxiliary pixels from which pixel values are read out in a third line period, when performing scaling error compensation (error scale <1).
Figure 24D:
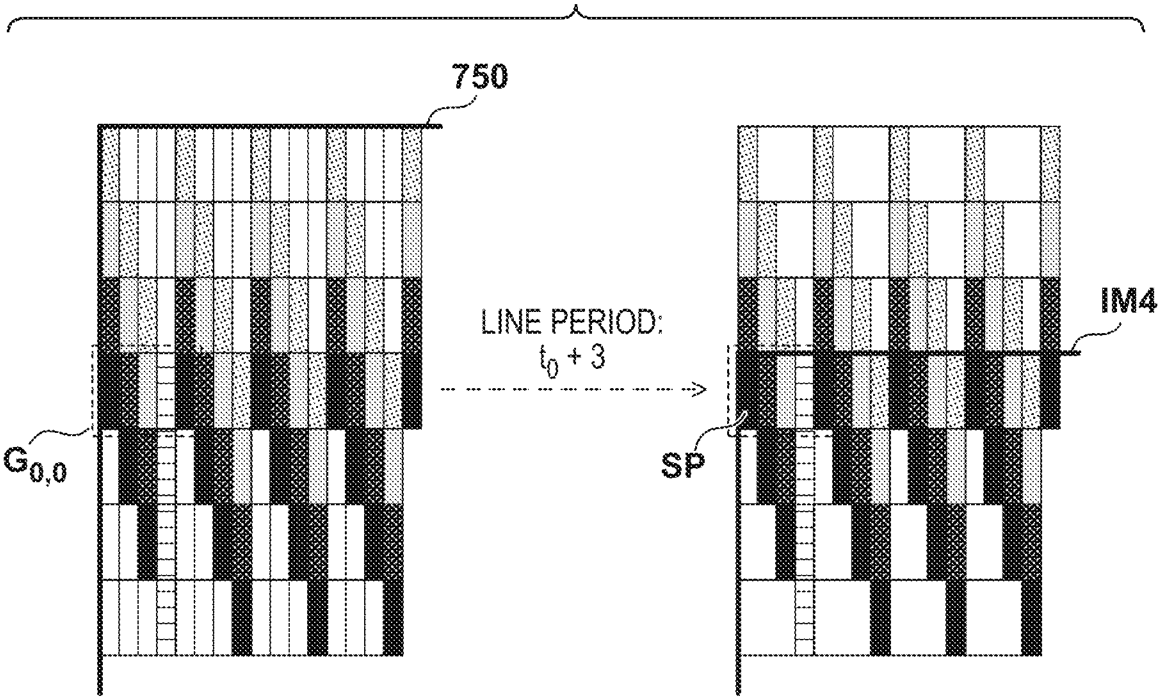
FIG. 24D is an explanatory diagram illustrating auxiliary pixels from which pixel values are read out in a fourth line period, when performing scaling error compensation (error scale <1).

FIG. 23 is an explanatory diagram illustrating pixel value insertion in the auxiliary pixel array when scaling error has been detected. Similar to FIG. 19, the input image data IM1 is partially illustrated on the left of FIG. 23, and the auxiliary pixel array 750 is partially illustrated in the center. In the example in FIG. 23, the error scale is less than 1.0 by an amount equivalent to ¼ of one pixel, and it is therefore assumed that a pixel value equivalent to one auxiliary pixel is inserted. It is also assumed that the fourth auxiliary pixel position from the left has been selected as the insertion position. In this case, the light emission control unit 705 stores M copies of the pixel values at each pixel position in each row of the input image data in the M auxiliary pixels in the corresponding rows of the auxiliary pixel array 750. However, the light emission control unit 705 shifts the pixel values of auxiliary pixel positions which are further to the left than the fourth auxiliary pixel position by one auxiliary pixel to the right, and inserts a copy of the pre-shift pixel value at the fourth auxiliary pixel position from the left. In the example in FIG. 23, the auxiliary pixels in the selected insertion positions are indicated by horizontal stripes. As a result of such pixel value insertion, five copies of the pixel value (0,0) of the input image data IM1 are stored in the auxiliary pixels Px1, Px2, Px3, Px4, and Px5 of the auxiliary pixel array 750, respectively.

The light-emitting element array of the light-emitting chip 400-1 is illustrated on the right side of FIG. 23. To cause the exposure head 106 to form a spot corresponding to each pixel position of the input image data IM1, the light emission control unit 705 successively reads out the pixel values from the auxiliary pixels of a corresponding auxiliary pixel set in the auxiliary pixel array 750, and outputs the read-out pixel values to the light-emitting element array. In the example in FIG. 23, the pixel value of the auxiliary pixel in the selected insertion position is output to the light-emitting element $R_{0\_3}$.

The auxiliary pixels in the auxiliary pixel array 750, from which the pixel values are to be read out throughout the line periods $t_0$ to $t_0+3$ when scaling error compensation is performed (error scale <1), are indicated by different darknesses of shading in FIGS. 24A to 24D. However, the auxiliary pixels in the selected insertion positions are indicated by horizontal stripes. Focusing on the five auxiliary pixels in which the pixel value (0,0) are stored, in the line period $t_0$, the pixel value read out from the auxiliary pixel Px4 (the inserted pixel value) is used to form a spot SP at the upper-left corner in an electrostatic latent image IM4 (see FIG. 24A). In the line period $t_0+1$, the pixel value read out from the auxiliary pixel Px3 is used to form the spot SP of the electrostatic latent image IM4 (see FIG. 24B). In the line period $t_0+2$, the pixel value read out from the auxiliary pixel Px2 is used to form the spot SP of the electrostatic latent image IM4 (see FIG. 24C). In the line period $t_0+3$, the pixel values read out from the auxiliary pixels Px1 and Px5 are used to form the spot SP of the electrostatic latent image IM4 (see FIG. 24D). In this case, light-emitting elements corresponding to the five auxiliary pixels are involved in the formation of the spot SP, but the size of the spot SP is actually reduced due to the scaling error. This contributes to the compensation for the scaling error.

As can be understood from FIGS. 24A to 24D, the auxiliary pixel set corresponding to at least one spot in the electrostatic latent image in a case where scaling error is detected (the second auxiliary pixel set) includes more auxiliary pixels than the corresponding auxiliary pixel set in a case where no scaling error is detected (the first auxiliary pixel set). For example, the auxiliary pixel set $G_{0,0}$ corresponding to the spot SP is constituted by four auxiliary pixels Px1 to Px4 in a case where no scaling error is detected, but is constituted by five auxiliary pixels Px1 to Px5 in the examples in FIGS. 24A to 24D.

In a practical example, the number of light-emitting portions (for example, light-emitting elements) that are involved in formation of a spot SP varies as the number of auxiliary pixels that constitute the corresponding auxiliary pixel set varies. That is, the number of light-emitting portions that are involved in formation of a spot SP is controlled based on the correction data indicative of an error scale. In other words, the light emission control unit 705 may control an image width of a formed image in the axial direction by inserting or thinning out pixel value(s) based on the correction data. That is, the correction data is data for correcting the image width in the axial direction.

In a practical example, the light emission control unit 705 successively reads out pixel values of an auxiliary pixel set for each pixel from the auxiliary pixel array 750 to output them to the light-emitting element array so as to form a corresponding spot of that pixel. That is, one pixel is formed using the same number of light-emitting elements as the number of auxiliary pixels corresponding to the pixel position of the pixel in input image data. The light emission control unit 705 controls an image width in the axial direction of a formed image by inserting an auxiliary pixel into an auxiliary pixel set at a certain pixel position based on the correction data. When some auxiliary pixels are inserted into an auxiliary pixel set, the image width is increased by the number of auxiliary pixels being inserted, and the number of light-emitting elements that are driven based on pixel data related to the auxiliary pixel set is also increased, accordingly.

(4) Compensating for Scaling Error (Error Scale >1)

When scaling error in the axial direction is detected as error in the image forming range, and the error scale is greater than 1, the light emission control unit 705 thins out pixel values at a selected auxiliary pixel position in at least one row of the auxiliary pixel array. The number of pixel values to be thinned out can be determined according to the magnitude of the error scale. As described above, thinning out pixel values includes deleting the pixel value from the selected auxiliary pixel position from before the thinning out, and shifting pixel values on one side in the axial direction, relative to that auxiliary pixel position, in a direction that reduces the pixel value set. The light emission control unit 705 may select the number of auxiliary pixel positions (thinning position) determined based on the magnitude of the error scale at random, or at random in units of pixel blocks, in the axial direction.

Figure 25:
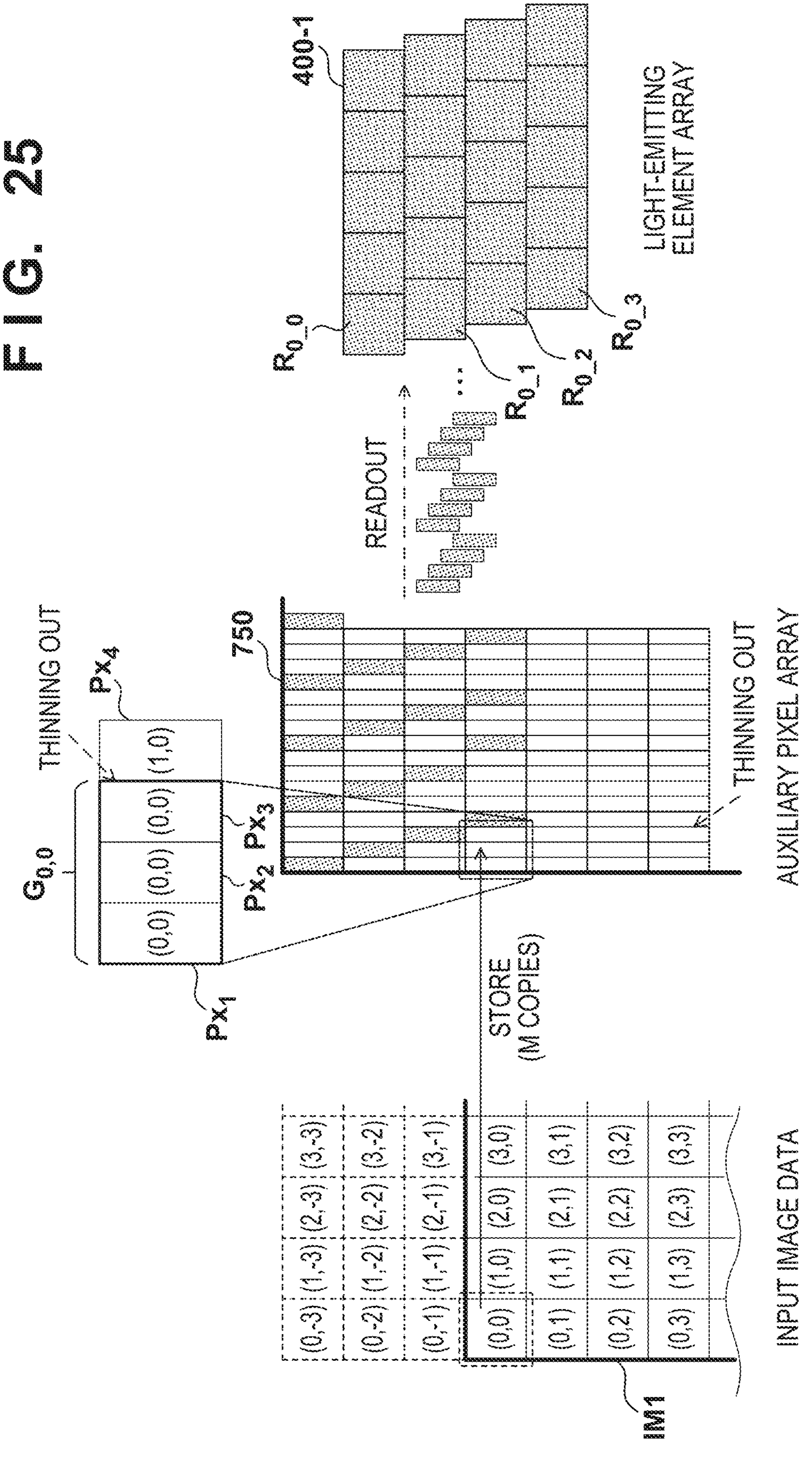
FIG. 25 is an explanatory diagram illustrating the thinning out of pixel values in an auxiliary pixel array when scaling error has been detected.

FIG. 25 is an explanatory diagram illustrating the thinning out of pixel values in the auxiliary pixel array when scaling error has been detected. Similar to FIG. 19, the input image data IM1 is partially illustrated on the left of FIG. 25, and the auxiliary pixel array 750 is partially illustrated in the center. In the example in FIG. 25, the error scale is greater than 1.0 by an amount equivalent to ¼ of one pixel, and it is therefore assumed that a pixel value equivalent to one auxiliary pixel is thinned out. It is also assumed that the fourth auxiliary pixel position from the left has been selected as the thinning position. In this case, the light emission control unit 705 stores M copies of the pixel values at each pixel position in each row of the input image data in the M auxiliary pixels in the corresponding rows of the auxiliary pixel array 750. However, the light emission control unit 705 deletes the pixel value at the fourth auxiliary pixel position from the left, and shifts the pixel values in the fifth and subsequent auxiliary pixel positions from the left, to the left by one auxiliary pixel. As a result of such pixel value thinning out, three copies of the pixel value (0,0) of the input image data IM are stored in the auxiliary pixels Px1, Px2, and Px3 of the auxiliary pixel array 750, respectively.

Accordingly, the auxiliary pixel set corresponding to at least one spot in the electrostatic latent image (the second auxiliary pixel set) includes fewer auxiliary pixels than the corresponding auxiliary pixel set in a case where no scaling error is detected (the first auxiliary pixel set). For example, when no scaling error is detected, the auxiliary pixel set $G_{0,0}$ corresponding to the spot in the upper-left corner of the electrostatic latent image is constituted by four auxiliary pixels Px1 to Px4, whereas the auxiliary pixel set $G_{0,0}$ is constituted by three auxiliary pixels Px1 to Px3 in the example in FIG. 25. The auxiliary pixel Px4 stores a copy of the pixel value (1,0) rather than a copy of the pixel value (0,0). Although only the light-emitting elements corresponding to the three auxiliary pixels are involved in forming this spot, the size of the spot actually expands due to the scaling error. This contributes to the compensation for the scaling error.

In a practical example, the number of light-emitting portions (for example, light-emitting elements) that are involved in formation of a spot SP varies as the number of auxiliary pixels that constitute the corresponding auxiliary pixel set varies. That is, the number of light-emitting portions that are involved in formation of a spot SP is controlled based on the correction data indicative of an error scale. In other words, the light emission control unit 705 may control an image width of a formed image in the axial direction by inserting or thinning out pixel value(s) based on the correction data. That is, the correction data is data for correcting the image width in the axial direction.

In a practical example, the light emission control unit 705 successively reads out pixel values of an auxiliary pixel set for each pixel from the auxiliary pixel array 750 to output them to the light-emitting element array so as to form a corresponding spot of that pixel. That is, one pixel is formed using the same number of light-emitting elements as the number of auxiliary pixels corresponding to the pixel position of the pixel in input image data. The light emission control unit 705 controls an image width in the axial direction of a formed image by thinning out an auxiliary pixel from an auxiliary pixel set at a certain pixel position based on the correction data. When some auxiliary pixels are thinned out from an auxiliary pixel set, the image width is reduced by the number of auxiliary pixels being thinned out, and the number of light-emitting elements that are driven based on pixel data related to the auxiliary pixel set is also reduced, accordingly.

According to the working example using the auxiliary pixel array described in this section, a variety of errors in the image forming range can be compensated for through an algorithm having relatively low complexity, such as manipulating the arrangements of discrete bits.

6. CONCLUSION

Various embodiments have been described in detail thus far with reference to FIGS. 1 to 25. According to an aspect of the foregoing embodiments, in an exposure apparatus that performs multiple exposure of a rotating photosensitive member by successively emitting light from M rows of light-emitting elements arranged in a circumferential direction, if positional misalignment of an image in an axial direction is detected, light emission control is performed to compensate for the detected positional misalignment. The light emission control includes shifting a pixel value set in input image data corresponding to at least one row of light-emitting elements arranged two-dimensionally in a direction that cancels out the detected positional misalignment, and then supplying drive signals based on the input image data to the light-emitting elements. A drive signal indicating that light emission is turned off can also be supplied to the light-emitting elements corresponding to the positions which are blank due to the shift. According to this configuration, positional misalignment in an image can be compensated for simply by controlling the readout order of the data on which the drive signals are based, without the need for high-load processing such as resolution conversion or weighting operations. For example, when a relative misalignment between images of a plurality of color components or misalignment of the image forming position relative to a sheet is detected as a result of calibration, the effects of the positional misalignment can be canceled out by the light emission control described above, and the quality of the image formed can be kept high. Additionally, according to the foregoing embodiments, the positional misalignment can be compensated for by adjusting the image forming position without increasing the circuit scale, which makes it possible to reduce the size and cost of the exposure apparatus. In this manner, an improved system for compensating for positional misalignment of an image is provided.

Additionally, in the foregoing embodiments, the M light-emitting elements in each column are arranged in a stepped form at a constant pitch. Then, a pixel value set corresponding to a row having at least a light-emitting element corresponding to a rear end in the cancellation direction can be shifted in the cancellation direction. Accordingly, the pixel value set can be appropriately selected and shifted in accordance with the side in the axial direction of the photosensitive member to which the detected positional misalignment corresponds.

Additionally, in the foregoing embodiment, for which rows the corresponding pixel value set are to be shifted, and by how many columns the pixel value set corresponding to each row should be shifted, can be determined based on the magnitude of the detected positional misalignment and the pitch of the light-emitting elements in the axial direction. Accordingly, positional misalignment of an image can be compensated for at a fine level which takes the pitch of the light-emitting elements in the axial direction, which is smaller than a spot corresponding to a single pixel, as the smallest unit.

Additionally, in the foregoing embodiments, the exposure head has a plurality of light-emitting chips each including a subset of the plurality of light-emitting elements. The range occupied by all the light-emitting elements of the plurality of light-emitting chips in the axial direction is broader than the range occupied by the maximum width of the input image data. According to this configuration, parts on the outer sides of the maximum width of the input image data can be used as a margin for positional misalignment compensation, and the positional misalignment can be compensated for without missing the edges of the image.

According to another aspect of the foregoing embodiments, in an exposure apparatus that performs multiple exposure of a rotating photosensitive member by successively emitting light from M rows of light-emitting elements arranged in a circumferential direction, if scaling error in an image in an axial direction is detected, light emission control is performed to compensate for the detected scaling error. This light emission control includes supplying drive signals based on input image data to the light-emitting elements after inserting or thinning out pixel values, at each of one or more pixel positions selected from pixel positions constituting the input image data depending on an error scale, into or from a pixel value set of a row to which each of the pixel positions belong. According to this configuration, the scaling error can be compensated for simply by inserting or thinning out pixel values into or from the data on which the drive signals are based, without the need for high-load processing such as resolution conversion or weighting operations. For example, if, as a result of calibration, expansion of the image forming range due to thermal expansion in the exposure head is detected, the effects of the expansion of the image forming range can be canceled out by thinning out the pixel values as described above, and the quality of the image formed can be kept high. Additionally, according to the foregoing embodiments, the scaling error can be compensated for by adjusting the image forming range without increasing the circuit scale, which makes it possible to reduce the size and cost of the exposure apparatus. In this manner, an improved system for compensating for scaling error in an image is provided.

Additionally, in the foregoing embodiments, when the error scale is less than 1, pixel values are inserted into the pixel value sets of the rows to which the selected pixel positions belong, at those pixel positions. On the other hand, when the error scale is greater than 1, a pixel value is thinned out from a pixel value set of a row to which each selected pixel position belong, at the pixel positions. Accordingly, when the image forming range is reduced or expanded due to error in the exposure head, the effects of that reduction or expansion can be canceled out appropriately. Inserting a pixel value includes shifting pixel values on one side in the axial direction, relative to the selected pixel position, in a direction that expands the pixel value set, as well as adding a copy of a pre-shift pixel value of that pixel position to that pixel position. Thinning out pixel values includes deleting the pixel value from the selected pixel position from before the thinning out, and shifting pixel values on one side in the axial direction, relative to that pixel position, in a direction that reduces the pixel value set. According to this configuration, scaling error can be compensated for while minimizing changes in the image formed.

Additionally, in the foregoing embodiments, the number of pixel positions to be selected for inserting or thinning out pixel values can be determined based on the detected error scale and the pitch of the plurality of light-emitting elements of the exposure head in the axial direction. Accordingly, scaling error can be compensated for at a fine level which takes the pitch of the light-emitting elements in the axial direction, which is smaller than a spot corresponding to a single pixel, as the smallest unit.

Although the present specification mainly describes the expansion of the image forming range caused by thermal expansion in the exposure head 106 as an example of the scaling error component, the technique related to the present disclosure is not limited to this example. For example, when an image is formed on a first side of a sheet and then on a second side (the side opposite from the first side) of that sheet, the sheet may shrink due to heat used for fixing the toner image onto the first side. Sheet shrinkage causes a difference in the ratio of the image size to the sheet size between the first side and the second side. Such shifting in the image size is another example of the scaling error component. The error scale Y of such a scaling error component can be detected as follows. That is, for example, the CPU 701 of the image forming apparatus 1 executes calibration in response to an instruction from the user. Specifically, the CPU 701 controls the image forming units 101 to form a test chart on the first side and the second side of a sheet. Here, the test chart may be an image having a known pattern. When forming the test chart too, multiple exposure is performed using the above-described light-emitting element array of the exposure head 106. The sheet on which the test chart is formed is placed on the platen of the reading unit 100 by the user, and the test chart is optically read by the reading unit 100. The reading unit 100 outputs read image data representing the results of reading the test charts on the first side and the second side to the CPU 701. The CPU 701 then calculates the error scale Y by comparing the ratio of the image size to the sheet size on the first side with the ratio of the image size to the sheet size on the second side, using the read image data. The CPU 701 notifies the light emission control unit 705 of the calculated error scale Y The insertion or thinning out of pixel values based on the error scale Y can be performed when forming an image onto the second side of the sheet.

In one variation, a reading apparatus that optically reads an image formed on a sheet by the image forming apparatus 1 may be connected to a later stage of the image forming apparatus 1. In this embodiment, the test charts formed on the first side and the second side of the sheet may be automatically read by the reading apparatus at the later stage of the image forming apparatus 1. In this case, the user does not need to perform tasks for placing the sheet on the platen, which reduces the workload for the user.

In another variation, the insertion or thinning out of pixel values described above may be performed according to a scale specified through a user interface by a user who intends to expand or reduce the image to be formed on the sheet.

In the foregoing embodiments, specific numerical values have been used for descriptive purposes, but these specific values are examples, and the present disclosure is not limited to the specific values used in the embodiments. Specifically, the number of light-emitting chips provided on a single printed circuit board is not limited to 20, and can be any number of one or more. The size of the light-emitting element array in each light-emitting chip 400 is not limited to 4 rows and 748 columns, and may be any other desired size. Additionally, the pitch of the light-emitting elements in the circumferential direction and the pitch in the axial direction are not limited to about 21.16 m and m, and may be any other desired values.

7. OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priorities from Japanese Patent Application No. 2022-132721, filed on Aug. 23, 2022, Japanese Patent Application No. 2022-132722, filed on Aug. 23, 2022, and Japanese Patent Application No. 2023-128001, filed on Aug. 4, 2023 which are hereby incorporated by references herein in their entireties.

What is claimed is:

1. An image forming apparatus comprising:

a photosensitive member that is driven to rotate around an axis;

an exposure head that includes a plurality of light-emitting portions arranged at different positions in an axial direction of the photosensitive member, wherein an image is formed by multiple light-emitting portions of the plurality of light-emitting portions; and a control unit configured to control driving of multiple light-emitting portions based on correction data, wherein the image includes at least first pixel and second pixel, and the control unit controls the driving of the multiple light-emitting portions based on the correction data such that a first number of light-emitting portions of the multiple light-emitting portions form the first pixel and a second number of light-emitting portions of the multiple light-emitting portions form the second pixel, the second number being different from the first number, and the control unit controls the driving of the multiple light-emitting portions based on the correction data such that a position of the second pixel is randomly selected in the axial direction.

2. The image forming apparatus according to claim 1, wherein at least two light-emitting portions of the multiple light-emitting portions overlap with each other in the axial direction.

3. The image forming apparatus according to claim 2, wherein the multiple light-emitting portions consists of M light-emitting portions, and the at least two light-emitting portions overlap by $$\frac{M-1}{M}\cdot P$$

in the axial direction, where P is a length in the axial direction of one pixel corresponding to the output resolution.

4. The image forming apparatus according to claim 1, wherein the exposure head includes light-emitting portions arranged in M rows in a circumferential direction of the photosensitive member and N columns in the axial direction, and at least two of the M light-emitting portions of each of the N columns overlap with each other in the axial direction.

5. The image forming apparatus according to claim 4, wherein each of the M light-emitting portions of each of the N columns overlap with an adjacent light-emitting portion by $$\frac{M-1}{M}\cdot P$$

in the axial direction, where P is a length in the axial direction of one pixel corresponding to the output resolution.

6. The image forming apparatus according to claim 1, wherein the correction data is data for correcting an image width in the axial direction.

7. The image forming apparatus according to claim 6, wherein the first number of light-emitting portions are driven to form the first pixel with first pixel data; and the second number of light-emitting portions are driven to form the second pixel with second pixel data.

8. The image forming apparatus according to claim 7, wherein the first pixel data and the second pixel data are binary bit data indicating light emission or non-light emission of corresponding light-emitting portion.

9. The image forming apparatus according to claim 1, wherein each of pixels of the image is constituted by a plurality of auxiliary pixels arranged at a pitch in the axial direction that is smaller than a pitch of the pixels of the image, the control unit is configured to control a number of auxiliary pixels that constitute the first pixel based on the correction data to correct image width, and, the controlled number of auxiliary pixels correspond to the multiple light-emitting portions that are used to form the first pixel.

10. The image forming apparatus according to claim 9, wherein, in a case where the image width is expanded, the number of auxiliary pixels that constitute the first pixel is larger than a number of auxiliary pixels that constitute the first pixel in a case of the image width being not corrected.

11. The image forming apparatus according to claim 9, wherein, in a case where the image width is reduced, the number of auxiliary pixels that constitute the first pixel is smaller than a number of auxiliary pixels that constitute the first pixel in a case of the image width being not corrected.

12. The image forming apparatus according to claim 1, wherein the exposure head includes at least one light-emitting chip that includes:

a data holding unit configured to hold data; and a driving unit configured to drive a corresponding one of the plurality of light-emitting portions to emit light based on the data held by the data holding unit.

13. The image forming apparatus according to claim 12, wherein the light-emitting chip includes an input terminal to which a synchronization signal is input, and the driving unit is configured to drive the corresponding one of the plurality of light-emitting portions to emit light during a period indicated by the synchronization signal.

14. The image forming apparatus according to claim 1, wherein each of the plurality of light-emitting portions is an organic electroluminescent element.

15. The image forming apparatus according to claim 1, wherein the image is divided into a plurality of blocks in the axial direction, and at least one randomly selected pixel among the pixels included in each of the plurality of blocks is formed as the second pixel.

16. The image forming apparatus according to claim 1, wherein at least one pixel among the pixels included in each of the plurality of blocks is formed as the first pixel.

17. The image forming apparatus according to claim 1, wherein the first pixel is formed by multiple exposure of a region corresponding to the same pixel position by the first number of light-emitting portions, and the second pixel is formed by multiple exposure of a region corresponding to the same pixel position by the second number of light-emitting portions.

* * * * *